United States Patent
LeVasseur et al.

(10) Patent No.: US 9,864,865 B2
(45) Date of Patent: *Jan. 9, 2018

(54) SECURE ELECTRONIC MAIL SYSTEM

(71) Applicant: Cirius Messaging Inc., Vancouver (CA)

(72) Inventors: Thierry LeVasseur, Vancouver (CA); Esteban Astudillo, Vancouver (CA); Matt McLean, Vancouver (CA)

(73) Assignee: Cirius Messaging Inc., Vancouver, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 15/415,752

(22) Filed: Jan. 25, 2017

(65) Prior Publication Data

US 2017/0193234 A1 Jul. 6, 2017

Related U.S. Application Data

(63) Continuation of application No. 15/006,028, filed on Jan. 25, 2016, now Pat. No. 9,647,977, which is a
(Continued)

(51) Int. Cl.
*G06F 21/60* (2013.01)
*H04L 12/58* (2006.01)
*H04L 29/06* (2006.01)

(52) U.S. Cl.
CPC ............ *G06F 21/602* (2013.01); *H04L 51/12* (2013.01); *H04L 51/14* (2013.01); *H04L 63/123* (2013.01); *H04L 63/126* (2013.01); *H04L 63/145* (2013.01)

(58) Field of Classification Search
CPC ......... H04L 51/12; H04L 51/02; H04L 51/18; H04L 51/22; H04L 63/12; H04L 63/145; H04L 63/306; G06Q 10/107
See application file for complete search history.

(56) References Cited

U.S. PATENT DOCUMENTS

| 4,799,153 A | 1/1989 | Hann et al. |
| 5,047,918 A | 9/1991 | Schwartz et al. |

(Continued)

FOREIGN PATENT DOCUMENTS

CA 2547480 A1 6/2004

OTHER PUBLICATIONS

Mislove, A. et al., "Security Analysis of POST," Report Based on a Workshop Paper Submitted to the International Workshop on Peer-To-Peer Systems (IPTPS '03), Feb. 2003, 7 pages.
(Continued)

*Primary Examiner* — Backhean Tiv
(74) *Attorney, Agent, or Firm* — Alleman Hall Creasman & Tuttle LLP

(57) ABSTRACT

An e-mail system is disclosed that overcomes many deficiencies of, but is backward compatible with, existing e-mail systems. Embodiments of the system may include various features, including but not limited to: (1) secure transfer of e-mail messages, without the need for users to replace existing e-mail clients or to change e-mail addresses; (2) tracking of all actions performed in connection with an e-mail transmission; (3) the ability for a recipient to view information about an e-mail message, optionally including information about how other addressees have responded to it, before deciding whether to retrieve the e-mail message; (4) the aggregation of entire e-mail conversations into a single threaded view; (5) the ability to include both private and public messages in a single e-mail communication; (6) sender control over downstream actions performed in connection with an e-mail message; (7) flexible control over cryptographic methods used to encrypt emails messages for storage.

21 Claims, 41 Drawing Sheets

Related U.S. Application Data continuation of application No. 14/135,885, filed on Dec. 20, 2013, now Pat. No. 9,497,158, which is a continuation of application No. 11/427,912, filed on Jun. 30, 2006, now Pat. No. 8,682,979.

(60) Provisional application No. 60/696,300, filed on Jul. 1, 2005.

(56) References Cited

U.S. PATENT DOCUMENTS

| | | | |
|---|---|---|---|
| 5,675,507 A | 10/1997 | Bobo, II | |
| 5,790,790 A * | 8/1998 | Smith | G06F 17/3089 |
| | | | 707/E17.116 |
| 5,958,050 A | 9/1999 | Griffin et al. | |
| 6,067,620 A | 5/2000 | Holden et al. | |
| 6,073,242 A | 6/2000 | Hardy et al. | |
| 6,182,059 B1 | 1/2001 | Angotti et al. | |
| 6,182,219 B1 | 1/2001 | Feldbau et al. | |
| 6,230,186 B1 * | 5/2001 | Yaker | G06Q 10/107 |
| | | | 709/206 |
| 6,327,612 B1 | 12/2001 | Watanabe | |
| 6,360,252 B1 | 3/2002 | Rudy et al. | |
| 6,442,600 B1 | 8/2002 | Anderson | |
| 6,442,686 B1 | 8/2002 | McArdle et al. | |
| 6,529,942 B1 | 3/2003 | Gilbert | |
| 6,584,564 B2 | 6/2003 | Olkin et al. | |
| 6,601,088 B1 | 7/2003 | Kelley et al. | |
| 6,609,106 B1 * | 8/2003 | Robertson | G06Q 10/02 |
| | | | 705/14.36 |
| 6,615,241 B1 | 9/2003 | Miller et al. | |
| 6,640,301 B1 | 10/2003 | Ng | |
| 6,684,248 B1 * | 1/2004 | Janacek | H04L 63/12 |
| | | | 709/217 |
| 6,704,772 B1 | 3/2004 | Ahmed et al. | |
| 6,711,594 B2 | 3/2004 | Yano et al. | |
| 6,732,101 B1 | 5/2004 | Cook | |
| 6,807,277 B1 | 10/2004 | Doonan et al. | |
| 6,836,792 B1 | 12/2004 | Chen | |
| 6,847,719 B1 | 1/2005 | Ballard | |
| 6,950,202 B1 | 9/2005 | Kikugawa | |
| 6,957,248 B2 * | 10/2005 | Quine | G06Q 10/107 |
| | | | 709/206 |
| 6,978,378 B1 | 12/2005 | Koretz | |
| 6,985,949 B2 | 1/2006 | Inamori et al. | |
| 6,988,129 B2 * | 1/2006 | Quine | G06Q 10/107 |
| | | | 705/76 |
| 6,988,199 B2 | 1/2006 | Toh et al. | |
| 7,020,688 B2 * | 3/2006 | Sykes, Jr. | G06Q 10/107 |
| | | | 709/206 |
| 7,028,190 B2 | 4/2006 | Burakoff et al. | |
| 7,050,989 B1 | 5/2006 | Hurt et al. | |
| 7,062,488 B1 | 6/2006 | Reisman | |
| 7,117,528 B1 * | 10/2006 | Hyman | G06F 21/45 |
| | | | 709/206 |
| 7,120,927 B1 * | 10/2006 | Beyda | H04L 51/28 |
| | | | 709/206 |
| 7,155,523 B1 * | 12/2006 | Gilbert | G06Q 10/107 |
| | | | 709/206 |
| 7,240,199 B2 | 7/2007 | Tomkow | |
| 7,269,624 B1 * | 9/2007 | Malik | G06Q 10/107 |
| | | | 709/206 |
| 7,328,242 B1 | 2/2008 | McCarthy et al. | |
| 7,333,616 B1 | 2/2008 | Brettle et al. | |
| 7,366,761 B2 | 4/2008 | Murray et al. | |
| 7,421,472 B1 * | 9/2008 | Ross, Jr. | G06F 15/16 |
| | | | 709/206 |
| 7,610,627 B1 * | 10/2009 | McKenna | G06F 21/62 |
| | | | 713/168 |
| 7,640,427 B2 * | 12/2009 | Callas | H04L 63/0442 |
| | | | 380/277 |
| 7,644,126 B2 | 1/2010 | Chmaytelli | |
| 7,730,142 B2 * | 6/2010 | LeVasseur | G06Q 10/107 |
| | | | 709/204 |
| 7,783,711 B2 * | 8/2010 | LeVasseur | G06Q 10/107 |
| | | | 709/205 |
| 7,822,820 B2 * | 10/2010 | LeVasseur | H04L 51/14 |
| | | | 709/205 |
| 7,870,204 B2 * | 1/2011 | LeVasseur | H04L 51/14 |
| | | | 709/204 |
| 7,870,205 B2 * | 1/2011 | LeVasseur | H04L 51/14 |
| | | | 709/204 |
| 7,870,208 B2 | 1/2011 | Halcrow et al. | |
| 7,979,495 B2 | 7/2011 | Radenkovic et al. | |
| 7,992,210 B2 * | 8/2011 | McKenna | G06F 21/62 |
| | | | 713/168 |
| 8,056,010 B2 | 11/2011 | Kieselbach et al. | |
| 8,140,854 B2 * | 3/2012 | Ogawa | G06F 21/31 |
| | | | 713/182 |
| 8,266,230 B2 | 9/2012 | Kritt et al. | |
| 8,682,979 B2 * | 3/2014 | LeVasseur | G06Q 10/107 |
| | | | 709/204 |
| 8,688,790 B2 * | 4/2014 | LeVasseur | H04L 51/12 |
| | | | 709/203 |
| 9,497,158 B2 * | 11/2016 | LeVasseur | G06Q 10/107 |
| 9,647,977 B2 * | 5/2017 | LeVasseur | H04L 51/36 |
| 2002/0007453 A1 * | 1/2002 | Nemovicher | H04L 51/30 |
| | | | 713/155 |
| 2002/0015042 A1 | 2/2002 | Robotham et al. | |
| 2002/0016818 A1 | 2/2002 | Kirani et al. | |
| 2002/0023138 A1 * | 2/2002 | Quine | G06Q 10/107 |
| | | | 709/206 |
| 2002/0059144 A1 * | 5/2002 | Meffert | G06F 21/10 |
| | | | 705/51 |
| 2002/0087892 A1 * | 7/2002 | Imazu | G06F 21/31 |
| | | | 726/6 |
| 2002/0097877 A1 | 7/2002 | Tanimoto | |
| 2002/0107928 A1 * | 8/2002 | Chalon | G06Q 10/107 |
| | | | 709/206 |
| 2002/0112007 A1 * | 8/2002 | Wood | G06Q 10/107 |
| | | | 709/206 |
| 2002/0112015 A1 | 8/2002 | Haynes | |
| 2002/0140987 A1 * | 10/2002 | Ishikawa | H04L 51/30 |
| | | | 358/402 |
| 2002/0143885 A1 * | 10/2002 | Ross, Jr. | G06Q 10/107 |
| | | | 709/207 |
| 2002/0194322 A1 * | 12/2002 | Nagata | H04L 29/06 |
| | | | 709/223 |
| 2002/0199119 A1 * | 12/2002 | Dunnion | H04L 63/0428 |
| | | | 726/4 |
| 2003/0046533 A1 * | 3/2003 | Olkin | H04L 51/30 |
| | | | 713/152 |
| 2003/0126215 A1 | 7/2003 | Udell et al. | |
| 2003/0142364 A1 | 7/2003 | Goldstone | |
| 2003/0147536 A1 | 8/2003 | Andivahis et al. | |
| 2003/0163537 A1 | 8/2003 | Rohall et al. | |
| 2003/0177188 A1 * | 9/2003 | Brubacher | H04L 51/066 |
| | | | 709/206 |
| 2004/0030893 A1 * | 2/2004 | Karamchedu | G06F 21/606 |
| | | | 713/168 |
| 2004/0044735 A1 | 3/2004 | Hoblit | |
| 2004/0054591 A1 | 3/2004 | Spaeth et al. | |
| 2004/0083269 A1 | 4/2004 | Cummins | |
| 2004/0132429 A1 * | 7/2004 | Gill | H04L 51/38 |
| | | | 455/412.1 |
| 2004/0133775 A1 * | 7/2004 | Callas | H04L 63/0823 |
| | | | 713/153 |
| 2004/0186851 A1 | 9/2004 | Jhingan et al. | |
| 2004/0186894 A1 | 9/2004 | Jhingan et al. | |
| 2004/0249892 A1 | 12/2004 | Barriga et al. | |
| 2005/0010801 A1 | 1/2005 | Spies et al. | |
| 2005/0066009 A1 | 3/2005 | Keohane et al. | |
| 2005/0080889 A1 | 4/2005 | Malik et al. | |
| 2005/0117715 A1 | 6/2005 | Bordia | |
| 2005/0182954 A1 | 8/2005 | Decuir | |
| 2005/0210273 A1 * | 9/2005 | Gersten | H04L 63/0442 |
| | | | 713/189 |
| 2005/0289221 A1 * | 12/2005 | Steele | H04L 29/06 |
| | | | 709/206 |
| 2006/0053202 A1 | 3/2006 | Foo et al. | |
| 2006/0053293 A1 | 3/2006 | Zager et al. | |

(56) References Cited

U.S. PATENT DOCUMENTS

| | | | |
|---|---|---|---|
| 2006/0075028 A1 | 4/2006 | Zager et al. | |
| 2006/0075040 A1 | 4/2006 | Chmaytelli | |
| 2006/0085503 A1* | 4/2006 | Stoye | H04L 63/029 709/206 |
| 2006/0149970 A1* | 7/2006 | Imazu | G06F 21/31 713/183 |
| 2006/0155810 A1* | 7/2006 | Butcher | G06Q 10/107 709/206 |
| 2006/0168065 A1 | 7/2006 | Martin | |
| 2006/0184628 A1 | 8/2006 | Coley et al. | |
| 2006/0218232 A1* | 9/2006 | Kubala | G06Q 10/107 709/206 |
| 2006/0223554 A1* | 10/2006 | Fried | H04L 51/34 455/466 |
| 2006/0230459 A1 | 10/2006 | Lam | |
| 2007/0005713 A1* | 1/2007 | LeVasseur | H04L 51/14 709/206 |
| 2007/0005714 A1* | 1/2007 | LeVasseur | H04L 51/14 709/206 |
| 2007/0011252 A1* | 1/2007 | Taylor | H04L 51/12 709/206 |
| 2007/0088687 A1 | 4/2007 | Bromm et al. | |
| 2007/0162867 A1 | 7/2007 | Dobronsky | |
| 2008/0016162 A1 | 1/2008 | Meentzen et al. | |
| 2008/0049937 A1* | 2/2008 | Pauker | H04L 63/0442 380/270 |
| 2008/0052759 A1 | 2/2008 | Kronlund et al. | |
| 2008/0098312 A1 | 4/2008 | Chang et al. | |
| 2008/0114884 A1 | 5/2008 | Hewes et al. | |
| 2009/0044006 A1* | 2/2009 | Shim | H04L 51/12 713/151 |
| 2009/0125990 A1 | 5/2009 | Streefland | |
| 2010/0011205 A1* | 1/2010 | McKenna | G06F 21/62 713/150 |
| 2010/0064047 A1 | 3/2010 | Sullivan | |
| 2010/0262666 A1 | 10/2010 | Kalu | |
| 2011/0099242 A1 | 4/2011 | Madnani | |
| 2011/0113109 A1* | 5/2011 | LeVasseur | H04L 51/12 709/206 |
| 2011/0196933 A1 | 8/2011 | Jackson et al. | |
| 2012/0198017 A1* | 8/2012 | LeVasseur | H04L 51/24 709/206 |
| 2012/0331080 A1* | 12/2012 | Sidman | H04L 29/12386 709/206 |
| 2013/0318347 A1 | 11/2013 | Moffat | |
| 2014/0122883 A1* | 5/2014 | LeVasseur | H04L 51/14 713/170 |
| 2017/0193234 A1* | 7/2017 | LeVasseur | G06F 21/602 |

OTHER PUBLICATIONS

ISA Canadian Intellectual Property Office, International Search Report and Written Opinion Issued in Application No. PCT/IB2006/002830, dated May 1, 2007, WIPO, 13 pages.

Hilton, R., "Secure Messaging" GIAC Directory of Certified Professionals, Nov. 7, 2000, SANS Institute, 7 pages.

* cited by examiner

-----BEGIN E-MAIL2 MESSAGE ACCESS KEY----- hj5lEMgA+9F8r0rC56DX8r5aBC0Bj+hOwQmbbbsyA9SQzBqc
vy2IPxvWMymALTUBQbHOctqHB+BVFLECAwEAAaM1MCMwEwYD
VR0lBAwwCgYIKwYBBQUHAwEwDAYDVR0TAQH/
BAIwADANBgkqhkiG9w0BAQQFAAOBgQCbQ6GR5azwKCSV02zq
qPplm3pN0YbMNBGu6jDd9h8U1OksFvNOckuQgNDJr9UmK/
8r31I+InljF3mcknNA9jkdhur7xxRIz3bSH124P2JTX4LfhC
XUeaGOJHyZGP6zCmCtDcgOlTnkwLT8U701IxweuS8aB3xr

-----END E-MAIL2 MESSAGE ACCESS KEY-----

*FIG. 11*

700128       (Host ID)

e-mail2.homeunix.com:8080/sonoma/      (important part of the
Host URL)

10000058     (e-mail message ID, stored on this Host)

-1    (thread-parent message ID, -1 means none)

A   (Where 'A' in the last line is the message key status
(A=received, N=new, D=rejected or not retrieved, etc.).)

*FIG. 12*

Subject: New messaage from <sender> using <[E2S]>

Body:

You have received a new message from <sender> using <[E2S]>.

90% of viruses are passed through e-mail as a mechanism to spread and infect computers. Using <channel> ensures your security by sending recipients a 'text only' notification first, like this one, without any malicious code or attachments. Upon installation of the free plug-in to work with your existing e-mail program, you will be able to retrieve the electronic messages that you desire and block future notificationds from unwanted senders, and return the favor to everybody you communicate with.

download your free plug-in at <[E2S]_linl> and start using this new electronic way of communicating that respects your friends, family members and business partners!

<channel_signature>

For more information, please visit <[E2S_link>

-----BEGIN EMAIL2 MESSAGE ACCESS KEY----- hj51EMgA+9F8rOrC56DX8r5aBC0Bj+hOwQmbbbsyA9SQzBqCvy2IPxvWMymA
LTUBQbHOctqHB+BVFLECAwEAAaM1MCMwEwYDVR01BAwwCgYIKwYBBQUHAwEw
DAYDVR0TAQH/
BAIwADANBgkqhkiG9w0BAQQFAAOBgQCbQ6GR5azwKCSV0ZzqqPp1m3pN0YbM
NBGu6jDd9h8U10ksFvNOckuQgNDJr9UmK/
8r3lI+InljF3mcknNA9jkdhur7xxRIz3bSH1Z4P2JTX4LfhCXUeaGOJHyZGP
6zCmCtDcgO1TnkwLT8U70lIxweuS8aB3xr

-----END E-MAIL2 MESSAGE ACCESS KEY-----

*FIG. 13*

```
Subject: New message from <sender> using <[E2S]>

Body:

- Sender: <sender>

- Sent to: <recipient>; <recipient>; <recipient>

- Message subject: <message_subject>

- Local scan: <local_scan_results>

- <[E2S1]> scan: <e-mail2_service_scan_results>

- Service: <[E2S]

- Message ID: <[E2K]>

- Message Format: <format>

- Number of characters: <number_characters>

- Attachments: <attachment>; <attachment>; <attacvhment>;
<attachment>

Message summary (text only):

*******************************************************

<suject>

<text_summary>

*******************************************************

You have received a new message from <sender_name> using
<[E2S]>. To retrieve the complete message and its
attachments, click 'Retrieve' in your task bar.

For maximum protection, and to prevent you from receiving
virus-infected messages from your friends and colleagues,
request that they use <channel> when communicating with
you.

<[E2S]_signature>
```

*FIG. 16*

```
┌─────────────────────────────────────────────┐
│ Incoming Messages                           │
│ ┌─────────┐┌──────────┐                     │
│ │ General ││ Security │                     │
│ └─────────┘└──────────┘                     │
│                                             │
│  ☐ Auto retrieve e2AMs                      │
│                                             │
│  ☐ Auto retrieve e2Ms for the following filters: │
│                                             │
│    Services                                 │
│    ○ All Services                           │
│    ○ Trusted Services                       │
│                                             │
│    Members                                  │
│    ○ All Members                            │
│    ○ Trusted Members                        │
│                                             │
│    Message Format                           │
│    ○ All Messages                           │
│    ○ Text-only Messages                     │
│                                             │
│    Attachments                              │
│    ○ All Messages                           │
│    ○ Messages with no attachments           │
│                                             │
│  ☐ Auto activate with:                      │
│    ○ All services                           │
│    ○ Certified services                     │
│    ○ No services                            │
│         ☐ Auto-trust services that I activate with. │
│                                             │
└─────────────────────────────────────────────┘
```

Sys-National

Incident Report

Time of Incident: [23:45 05/25/2006] (hh:mm dd/mm/yyyy)

Location of Incident: [ ]

Employees Involved: [ ] "Last name, first name" separated by semi-colons e.g. Smith, John; Doe, Jane Type of Incident: [ ]

Description of Incident: [ ]

[ ] I verify that, to the best of my knowledge, all information supplied is correct.

| Reply | Reply to All | Forward | Reply |

FROM:     Terry Allwell
TO:       Mike Hunter
CC:
SUBJECT:  RE: Thanks for your time today!

| ✉ eMail2 ▼ | ☐ Speedy Delivery eMail2 Service | ☐ ☐ ☐ |

| ALL | Terry |

3:45PM 05/212006
TO:    mike@sys-national.com
FROM:  terry@sys-national.com

No problem at all Mike.

We were all very interested in your presentation.
We will schedule a follow-up next week.

Terry

---

3:45PM 05/212006
TO:    terry@sys-national.com
FROM:  mike@sys-national.com

Thanks for the meeting today Terry!

I hope I'll be hearing from you soon.

Mike

---

3:45PM 05/212006
TO:    mike@sys-national.com
FROM:  terry@sys-national.com

Great, I'll see you then. :-)

Terry

*FIG. 38*

Security

Sender:
☐ Force activation verification by e-mail
☐ Force registration
☐ Force full registration (with password selection)
☐ Force SSL certificate Recipient:
☐ Force activation verification by e-mail
☐ Force registration
☐ Force full registration (with password selection)
☐ Force SSL certificate

*FIG. 39*

| Option | Default Value | Allow User Override |
|---|---|---|
| Allow replying | ☐ | ☐ |
| Allow forwarding | ☐ | ☐ |
| Enable ratings | ☐ | ☐ |
| Expiry Time | ☐ | ☐ |
| Summary Character Limit | ☐ | ☐ |
| Message Format | ☐ | ☐ |
| Enable Tracking | ☐ | ☐ |
| Share Tracking | ☐ | ☐ |

Conversation Termination

☐ Allow users to terminate conversations after they have begun

FIG. 40

SECURE ELECTRONIC MAIL SYSTEM

CROSS REFERENCE TO RELATED APPLICATIONS

This patent application is a continuation of and claims priority to U.S. patent application Ser. No. 15/006,028, entitled SECURE ELECTRONIC MAIL SYSTEM, and filed Jan. 25, 2016; which is a continuation of and claims priority to U.S. patent application Ser. No. 14/135,885, entitled SECURE ELECTRONIC MAIL SYSTEM, and filed Dec. 20, 2013, which is a continuation of and claims priority to U.S. patent application Ser. No. 11/427,912, entitled SECURE ELECTRONIC MAIL SYSTEM, and filed Jun. 30, 2006; which in turn claims priority to U.S. Provisional Patent Application Ser. No. 60/696,300, entitled SECURE AND TRACKABLE E-MAIL SYSTEM, and filed Jul. 1, 2005, the entire disclosures of each of which are hereby incorporated herein by reference.

BACKGROUND OF THE INVENTION

A. Field of the Invention

The present invention relates to electronic mail systems.

B. Description of the Related Art

E-mail, in its current state, is in dire need of a revisiting. The existing design and architecture allows for virus attacks, "spam" abuse and major security concerns. According to Computer Associates, 90% of viruses are passed through e-mail, which makes users more cautious than ever about what e-mail they open. 51% of corporations have had a virus disaster and six major viruses over the last five years have resulted in $20 B in estimated global costs. In 2005, more than 200 viruses actively spread on the Internet resulting in approximately 0.65% of all e-mail messages carrying a virus.

According to the Meta Group, 75% of all corporate knowledge is communicated via e-mail (2005). The number of corporate e-mail messages sent daily worldwide is expected to double by 2006, from 31 billion messages to 60 billion. The cost of unsolicited e-mail to US and European businesses last year amounted to $11.4 B. For ISPs the cost was $500M. In addition to the financial cost, this ever-growing problem of unsolicited e-mail has created security, liability, and productivity issues for organizations.

The rapid growth of e-mail has resulted in an increasing awareness of the security threats and the need for solutions to safeguard corporate networks and data. In an ever-changing landscape of products, providers and services in this growing market, millions of dollars are spent every year trying to strengthen the infrastructure of corporations in order to protect its data from spam and viruses.

Existing multi-layered protection methods typically consist of adding extra scanning processes, traps and quarantine areas, all within the network of the corporation, to reduce spam and virus intrusions. Current trends suggest that these multi-layer methods cannot stop the increase in spam e-mail and viruses. Reinforcing the infrastructure is an ad hoc solution; by the time anti-spam and anti-virus protection systems intercept the message, it already resides inside the corporation's firewall. In some cases it might not even be necessary to open the malicious e-mail; just receiving it may be enough to create damage (e.g., in the case of self-executable viruses). From a legal perspective, the digitization of documents has created a large problem in being able to track who has what copy and which was the original version. New trends surrounding archiving and tracking e-mail communications are covered daily by the press because of the following pressure points which traditional e-mail does not cover:

Compliance: The Sarbanes-Oxley (US) compliance for the Securities and Exchange Commission and the Health Insurance Portability and Accountability Act (US) both require that valid records of electronic communication between employees and clients be kept. With traditional e-mail, guaranteed tracking and auditability cannot be reliably achieved, and thus compliance cannot reliably be achieved in any easy manner. Public disclosure of confidential material: Traditional e-mail has no way of tracking or recording unauthorized message forwarding or interception. These pitfalls make e-mail an unattractive solution for the transference of sensitive materials.

Archiving: Archivists commonly require the original document not to be changed or tampered with.

Records Management: Requirements often demand that all copies of the original document be keep in an archive.

Existing e-mail network infrastructures and protocols (hereinafter collectively "e-mail1") have only limited tracking capabilities. Messages typically cannot be tracked between different e-mail servers and recipients; incomplete transactions due to different software configurations create non-guaranteed tracking records. Companies offering e-mail1 tracking systems typically either require users to change e-mail addresses so that messages are routed through the same server, or worse, require HTML and JavaScript embedded into each message in order to track executables (code) rather than the actual e-mail message.

Additionally, e-mail encryption methods, such as PKI, are not widely used today despite their existence for more than 10 years. This is partly because such technologies are not easy to use. For example, PKI requires each user (sender and recipients) to manually set-up their own certificate or private key, and then manually exchange this key with other users. Many users do not know how to manage their key files, creating security loopholes in the process.

Limitations of E-mail1 Message Control and Metadata Functionality

Existing e-mail systems have several inherent limitations in the areas of message control and metadata functionality. Due to the architecture that e-mail1 is based upon, many potentially useful features are impossible or only possible to partially implement.

For example, using Microsoft's Outlook e-mail client, users have the option to 'recall' a message. This feature potentially 'un-sends' an e-mail sent in haste, or one that was sent to the incorrect recipient. However, Outlook's recall functionality typically can only work within an internal domain—a large company's e-mail network, for instance. Even then, different configuration settings on recipient computers can thwart attempts to recall messages. Because many of the people a user communicates with on a regular basis are not a part of the user's internal domain, this feature is significantly less useful than it could be.

As another example, many e-mail clients incorporate a 'voting system', but these tend to be available only for the simple task of providing feedback to the initial sender. These voting systems do not generally allow for more complex peer-to-peer or user-driven ratings in which feedback is available to persons other than the original sender. Further, such systems are generally not extensible in that they do not allow for easy introduction of new types of e-mail metadata functionality.

E-mail1 Architecture and Backward Compatibility

Although the existing e-mail1 architecture is both outdated and ineffective, e-mail1 is widely accepted as the worldwide standard for online communication. There is an enormous amount of infrastructure, both hardware and software systems, devoted to maintaining and propagating e-mail1 messages. Because of the universally massive investment in e-mail1 infrastructure, it is desirable that any solution to the multitude of problems found in e-mail1 be backwards compatible, and that it not disrupt the current flow of e-mail1 communication.

SUMMARY OF THE DISCLOSURE

An e-mail system is disclosed that embodies various inventive features. One feature of the system is a computer-implemented method of securely communicating e-mail messages. The method comprises receiving an e-mail message at a server system that implements a secure e-mail service, the e-mail message being from a sender that has an account with the secure e-mail service, and being addressed to a recipient that does not have an account with the secure e-mail service. The method further comprises storing the e-mail message in encrypted form on the server system; and transmitting, or causing the transmission of, a substitute message to the recipient (e.g., via email1 protocols). The substitute message lacks at least some message content of the e-mail message, and includes a link to a component that provides functionality for the recipient to securely retrieve the e-mail message from the server system.

Another feature of the system is a computer-implemented method of providing for secure delivery of an e-mail message sent, via an e-mail client running on a sender computing device, to a recipient e-mail address. The method comprises intercepting the e-mail message with an e-mail client plug-in running on the sender computing device, such that an ordinary transmission of the e-mail message to the recipient e-mail address is blocked. The method also comprises sending the e-mail message to a server system for storage thereon, and storing the e-mail message on the server system in an encrypted form. The method further comprises sending a substitute message to the recipient e-mail address with information about the e-mail message. The substitute message includes a key for retrieving the e-mail message from the server system, and lacks at least some message content of the e-mail message.

Another feature of the system is an e-mail client plug-in. The e-mail client plug-in is adapted to run in conjunction with an e-mail client program on a user computing device, and is capable of intercepting an e-mail message sent from the e-mail client program such that an ordinary transmission of the e-mail message is blocked. The e-mail client plug-in is also capable of causing the intercepted e-mail message to be sent over a network to a secure e-mail service for subsequent retrieval by a recipient to whom the e-mail message is addressed.

Another feature of the system is a computer-implemented method of securely transferring an e-mail message addressed to at least one recipient. The method comprises sending the e-mail message from a sender computing device to a server system for storage on the server system; and sending a notification message to an e-mail address of the recipient. The notification message includes a message key associated with the e-mail message, and lacks at least some message content of the e-mail message. The method further comprises, on a recipient computing device, prior to retrieving the e-mail message, using the message key as obtained from the notification message to retrieve, from the server system, e-mail message metadata associated with the e-mail message. The e-mail message metadata is displayed on the recipient computing device to assist the recipient in determining whether to retrieve the e-mail message from the server system.

Another feature of the system is a method of collaboratively filtering e-mail messages. The method comprises receiving, at a server system, an e-mail message addressed to a plurality of recipients; and sending notification messages to each of the recipients regarding the e-mail message. The notification messages include information for retrieving the e-mail message from the server system. The method further includes monitoring actions performed by at least some of the recipients in connection with the e-mail message, and based on such actions, generating dynamic metadata for the e-mail message. The dynamic metadata is communicated to a recipient that has not yet retrieved the e-mail message to assist said recipient in determining whether to retrieve the e-mail message. The dynamic metadata may, for example, indicate how other users rated the e-mail message, how many other users retrieved or rejected the e-mail message, how many users replied to or forwarded the e-mail message, etc.

Another feature of the system is a computer-implemented method of providing different versions of an e-mail message to different recipients. The method comprises detecting a send event of an e-mail message composed by a sender on a sender computing device, the e-mail message being addressed to at least a first recipient and a second recipient. The e-mail message includes a non-private message portion that is not private to any particular recipient, and includes a private message portion that is private to the first recipient. The method also comprises securely transferring the e-mail message to a server system, and storing the e-mail message on the server system such that both the non-private and private message portions are stored in association with a common message identifier. The method further comprises providing restricted access to the e-mail message as stored on the server system such that the first and the second recipients have access to the non-private message portion, and such that the first recipient but not the second recipient has access to the private message portion.

Another feature of the system is a computer-implemented method of providing different versions of an e-mail message to different recipients. The method comprises detecting that an e-mail message being composed by a user via an e-mail client program is addressed to at least a first recipient and a second recipient. In response to detecting that the e-mail message is addressed to the first second recipients, an e-mail message composition user interface of the e-mail client program is supplemented to include a first private message entry area for entering a private message to the first recipient, and a second private message entry area for entering a private message to the second recipient.

Another feature of the system is a method of facilitating viewing of e-mail messages. Reply messages are received from each of a plurality of recipients of an original e-mail message sent by a sender, and are stored on a server system in association with the original e-mail message. The sender is presented with a single e-mail inbox entry that represents the plurality of reply messages. In response to a request initiated by the sender in connection with the single e-mail inbox entry, the plurality of reply messages are retrieved from the server system, and are displayed to the sender as part of a single logical e-mail message.

Another feature of the system is a computer-implemented method for providing a threaded display. The method comprises assigning a unique identifier to an original e-mail message sent from a sender to a plurality of recipients; and storing the original e-mail message, and a plurality of reply messages to the original e-mail message, on a server system in association with the unique identifier of the original e-mail message. The plurality of reply messages include reply messages from at least two different recipients of the original e-mail message. The method further comprises using the unique identifier to automatically aggregate at least the original e-mail message and the plurality of reply messages into a threaded display.

Another feature of the system is a computer-implemented method of facilitating viewing of an e-mail conversation. The method comprises identifying a plurality of e-mail messages of an e-mail conversation. The plurality of e-mail messages include, at least, an originating e-mail message sent to a plurality of recipients, reply messages from at least two of the recipients, and at least one reply to one of the reply messages. The method further includes identifying a plurality of sub-conversations of the e-mail conversation, each sub-conversation including a different respective sequence of e-mail messages; and generating a separate, chronological display of each sub-conversation.

Another feature of the system is an e-mail client plug-in stored on a computer readable medium. The e-mail client plug-in is adapted to run in conjunction with an e-mail client program on a user computing device. The e-mail client plug-in is capable of intercepting e-mail messages sent from the e-mail client program, and causing the intercepted e-mail messages to be communicated to recipients via a secure e-mail service. The e-mail client plug-in is additionally capable of retrieving a plurality of e-mail messages of a common e-mail conversation from the secure e-mail service, and aggregating the plurality of e-mail messages into a threaded display.

The invention also comprises a secure e-mail system that comprises a server system configured to store e-mail messages in an encrypted form. The server system provides functionality for addressees of the e-mail messages to retrieve corresponding e-mail messages. The secure e-mail system also includes a cryptographic engine that encrypts the e-mail messages for storage on the server system, and decrypts the e-mail messages for delivery to the addressees. The secure e-mail system further includes an interface that provides functionality for an administrator to add an executable cryptographic method to the cryptographic engine, and to designate a particular executable cryptographic method to be used to encrypt/decrypt e-mail messages.

The invention also comprises a secure e-mail system that comprising a cryptographic engine that includes a plurality of different executable cryptographic methods, at least some of which provide different levels of encryption than others. The secure e-mail system also includes a plurality of e-mail services that run on the server system and use the cryptographic engine to encrypt and decrypt e-mail messages. Each of the secure e-mail services is configured to use a particular one of the executable cryptographic methods, and at least some of the services are configured to use different executable cryptographic methods than others, so that different services provided different levels of security than others. The secure e-mail system further includes an e-mail client component that provides functionality for a sender of an e-mail message to select from the plurality of e-mail services for sending the e-mail message to a recipient.

The invention also comprises a secure email system that comprises a server system that hosts a secure e-mail service. The secure e-mail service is configured to store e-mail messages from senders, and provides functionality for addressees of the e-mail messages to securely retrieve the e-mail messages. The secure email system also comprises a client component that communicates with the server system using a communications protocol that provides for encryption of messages. The client component provides functionality for users to send e-mail messages to recipients via the secure e-mail service, and to initiate retrieval of e-mail messages from the secure e-mail service. The client component and the secure e-mail service collectively provide functionality for a sender of an e-mail message to control whether a recipient of the e-mail message can forward the e-mail message to other users. The client component and secure email service may also provide functionality for the sender to, e.g., control whether the recipient can reply to the e-mail message.

Another inventive feature of the disclosed system is a computer-implemented method of controlling an e-mail conversation. The method comprises receiving a parent e-mail message from a sender, and storing the parent e-mail message on a server system. The parent e-mail message is addressed to at least a first recipient, who is provided access to the parent e-mail message from the server system. The method also includes receiving a child e-mail message generated by the first recipient by forwarding or replying to the parent e-mail message, the child e-mail message being addressed to at least a second recipient. The child e-mail message is stored on the server system in association with the parent e-mail message, and the second recipient is provided access to the child e-mail message from the server system. Subsequently, a request to terminate an e-mail conversation associated with the parent e-mail message is received at the server system from the sender of the parent e-mail message. In response to the request, at least one of the following actions is performed: (a) blocking the first recipient from forwarding and replying to the parent message, (b) blocking the second recipient from forwarding and replying to the child message.

The foregoing summary is not intended to be comprehensive of all of the inventions and inventive subject matter disclosed herein, and is not intended to limit the scope of the invention.

BRIEF DESCRIPTION OF THE DRAWINGS

Specific embodiments and features of the e-mail system will now be described with reference to the following drawings, which are intended to illustrate, and not limit, the invention

FIG. 11 is an example of an eMail2 Message Access Key in its encrypted or obscured form.

FIG. 12 is an example of an eMail2 Message Access Key after being decrypted.

FIG. 13 is an example of an eMail2 Introductory Message.

FIG. 16 is an example of an eMail2 Access Message.

FIG. 24 is an example of the Incoming Message Preferences dialog inserted into Microsoft Outlook with a plug-in, described in FIG. 1 and FIG. 2.

FIG. 30 is a block diagram describing the processes of communication between a third party application, a service and a client plug-in.

FIG. 31 is an example of a metadata extension module, in the form that it would be displayed on the delivery slip.

FIG. 38 is a visual representation of a message reading interface window for a threaded eMail2 conversation.

FIG. 39 is a visual representation of the security matrix, an interface used to determine the registration options for a specific service.

FIG. 40 displays the service-level message options: an interface used to determine whether options are available, what the default value is, and whether users can override the default value.

DETAILED DESCRIPTION OF SPECIFIC EMBODIMENTS

Figure 1:
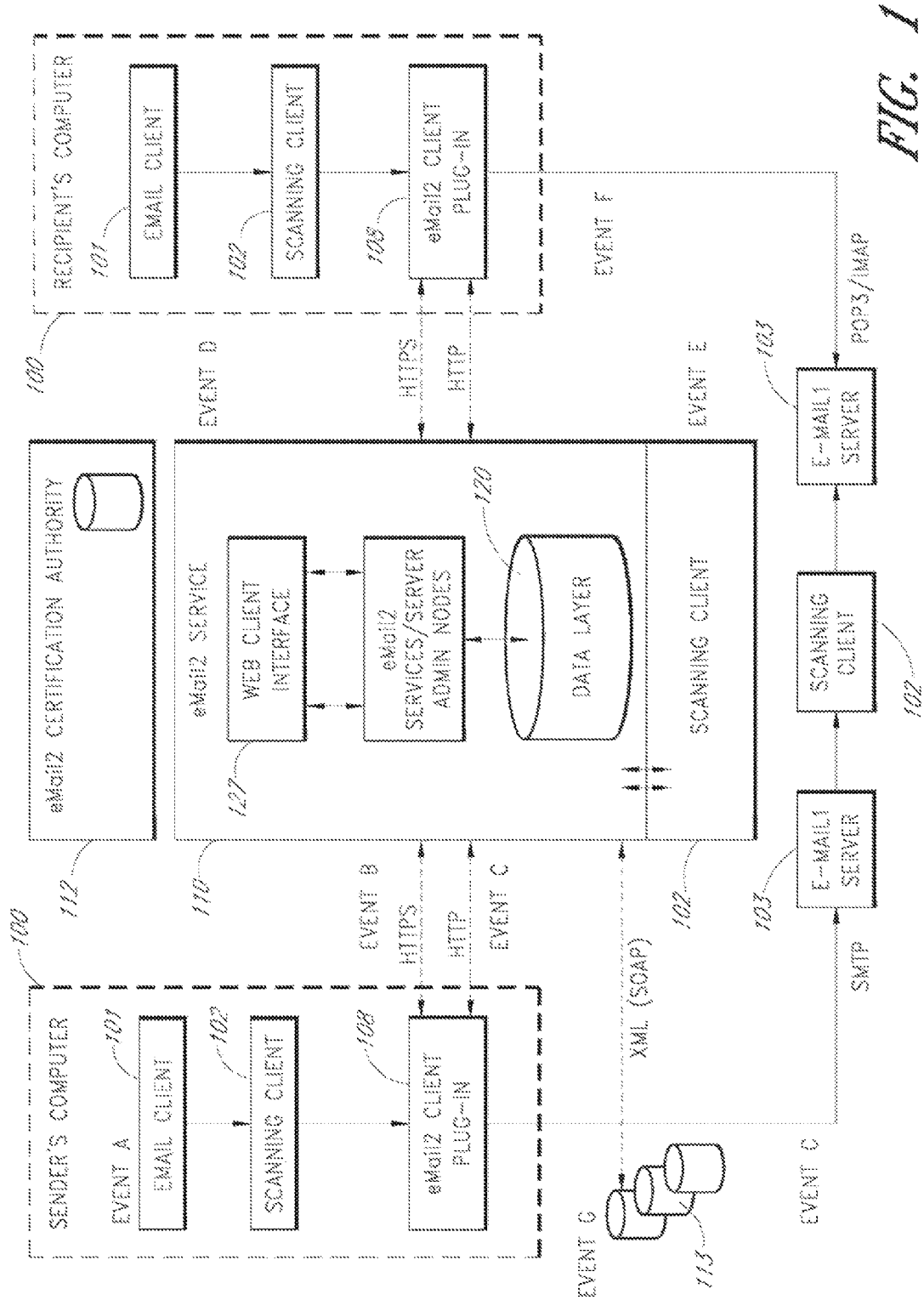
FIG. 1 is a block diagram, describing major components and processes of the system.

An e-mail messaging system (hereinafter "eMail2") that allows users to securely send and track electronic messages will now be described with reference to the drawings. The eMail2 system allows any organization to create its own Private E-mail Network (PEN) and decide who belongs to it. The eMail2™ system is very secure, fully auditable, and trackable. eMail2 interoperates with existing e-mail network infrastructures and protocols ("e-mail1"), but adds extra layers of security and features. eMail2 is not necessarily a replacement for traditional e-mail, it is a comprehensive upgrade that plugs existing security holes and adds valuable layers of new features, all without inhibiting or constraining existing e-mail1 processes.

Embodiments of the eMail2 system may include various features, including but not limited to the following: (1) secure transfer of e-mail messages, without the need for users to replace existing e-mail clients or to change e-mail addresses; (2) tracking of all actions performed in connection with an e-mail transmission; (3) the ability for a recipient to view information about an e-mail message, optionally including information about how other addressees have responded to it, before deciding whether to retrieve the e-mail message; (4) the aggregation of entire e-mail conversations into a single threaded view; (5) the ability to include both private and public messages in a single e-mail communication; (6) sender control over downstream actions performed in connection with an e-mail message; (7) flexible control over cryptographic methods used to encrypt emails messages for storage.

As will be recognized, many of the inventive features and aspects of the eMail2 system can be implemented without others, and can be implemented within very different types of e-mail systems than the system described herein. By describing these features and aspects as part of a common e-mail system, no implication is made that any of these features or aspects need to be implemented in combination. More generally, nothing in this detailed description section is intended to imply that any particular feature or characteristic of the disclosed system is an essential component or aspect of the invention. Further, nothing in the preceding background section is intended to imply that any particular problem must be addressed or solved by the invention. The invention is defined only by the appended claims.

1. Overview eMail2 is a messaging system that interoperates with e-mail1 but uses alternative protocols (HTTPS and HTTP are just two examples) and allows users to securely send, track, and retrieve messages. When considered at a broad level, eMail2 has two major features:

1. eMail2 allows the user to actively participate in the message retrieval process. While e-mail 1 places the responsibility of retrieving messages on the recipients' network infrastructure, eMail2 preferably places that responsibility on the recipients themselves. After reviewing associated message data, a user can make an informed decision about the content that he or she allows into his or her local environment. Thus, unlike e-mail1, eMail2 does not unwittingly expose users' intranets and local data to malicious e-mail content.

2. eMail2 changes the traditional e-mail "store and forward" paradigm by enforcing a centralized message repository. E-mail messages are preferably kept at a single location and retrieved by users based on specific permissions. Because both transmission and retrieval are preferably conducted in a secure manner, and storage is preferably protected by encryption, eMail2 messages are impervious to the common security flaws that plague e-mail1.

One embodiment of the eMail2 system includes a plug-in component (hereinafter "eMail2 client plug-in") that works in conjunction with existing local-computing e-mail clients such as Outlook and Eudora. The eMail2 client plug-in (FIG. 1, 108) may be a module that is installed on top of an e-mail client 101 installation, or the functionality of the plug-in may be directly integrated into the e-mail client 101 such that users need not install an additional plug-in 108 or other add-on component. Additionally, for server-hosted client situations, the eMail2 client plug-in may be a server add-on. Alternatively, the functionality of the eMail2 client plug-in 108 may be available via a web client interface 127 or helper application for web-based e-mail services.

The eMail2 client plug-in 108 communicates over a network, such as the Internet, with a service referred to as the eMail2 service 110. The eMail2 service 110 may be implemented as a service system (one or more physical servers) that executes associated service code. The service can be implemented by a large scale eMail2 service provider, or alternatively, a single organization or company may run its own eMail2 service 110. Although the terms "server" and "service" are used somewhat interchangeably in this document, it should be understood that multiple eMail2 services can run on a single physical server or server system.

In one embodiment, when a new eMail2 message is created, an introductory message containing an encrypted message access key is sent to the eMail2 message recipient(s). This introductory message may be sent by the sender's eMail2 client plug-in 108 using the sender's e-mail1 network and infrastructure (e.g. SMTP server 103) or by the eMail2 service 110 directly, and may be sent using email1 or a secure protocol. The content and attachments of the eMail2 message may be encrypted and sent to an eMail2 service 110, preferably over a secure connection.

If the eMail2 client plug-in 108 is not installed on the recipient's computing device 100, the introductory message may appear in the recipient's inbox as a regular text e-mail message. This message may include a link to an Internet address for downloading and installing the eMail2 client plug-in 108, a link to access the eMail2 web client interface 127, or an attached executable or script that implements eMail2 client plug-in functionality. If the eMail2 client plug-in 108 is installed on the recipient's computing device 100, the plug-in will extract the message key from the introductory message and automatically retrieve an access message from the eMail2 service 110. The message access key contains information about the eMail2 service's location, the status of the eMail2 message, and a unique message ID. The message access key in the preferred embodiment does not contain or serve as a decryption key.

The access message acts in part as a notification to the recipient that there is an eMail2 message on the eMail2 service 110 waiting to be retrieved. The access message may also contain information about the eMail2 message body and attachments. For example, the access message may include information such as virus or spam scanning process results, the number of other recipients that have retrieved the message, and/or a summary of how other recipients have rated the message. The access message allows the recipient to view this type of information. With the access message, the recipient may also retrieve, reject or ignore the eMail2 message, retrieve the message body only excluding any attachments, or even simply retrieve a "text scan" of an HTML message to avoid exposing his or her e-mail client to malicious code often embedded in HTML messages. On retrieval, the access message may be replaced by the actual message.

Because the eMail2 client plug-in 108 is capable of handling the tasks of securely retrieving and decrypting the eMail2 message, there is preferably no need to attach or otherwise include executable code, executable software, encryption/decryption keys, user keys, or private user information with any of the messages (including the introductory message and the access message) transmitted to the recipient's computing device 100.

2. Sample Features and Benefits of Email2

Figure 26:
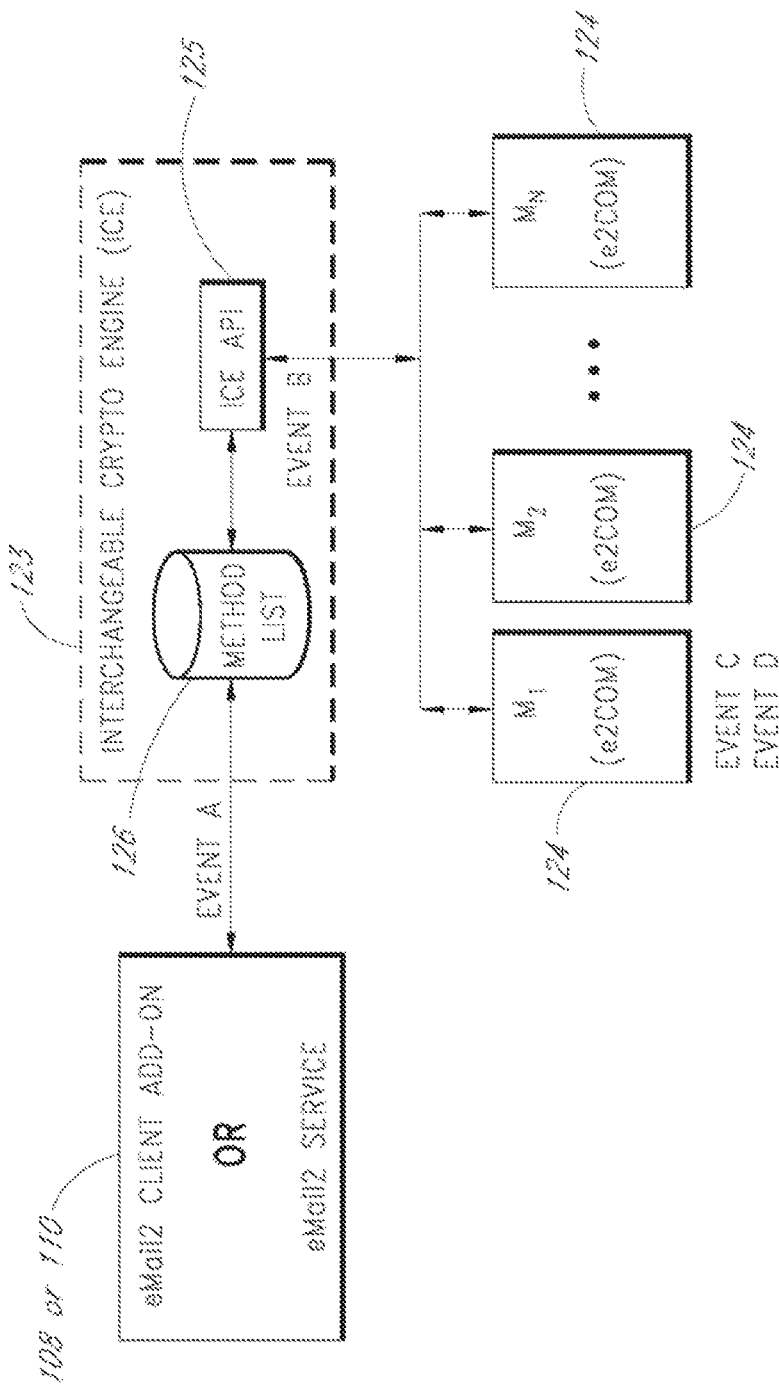
FIG. 26 is a workflow for encryption/decryption using the Interchangeable Crypto Engine (ICE).

Sample features of the eMail2 system may include but are not limited to the following: (1) a seamless and conjunctive relationship with traditional e-mail, optionally embodied through the use of a plug-in to intercept and re-route messages; (2) the ability to circumvent restrictions and pitfalls associated with traditional e-mail by bypassing and supplementing the traditional transport methods; (3) a dramatic improvement in local and server-side security, optionally embodied through the use of an Interchangeable Cryptography Engine (ICE) (FIG. 26, 123); (4) a centralized, secure message repository for storing all messages associated with a single conversation; (5) a comprehensive tracking system that allows for reliable message history and guaranteed audits; (6) the ability to review messages and attachments before retrieving them to a local environment; (7) various upgrades to the feature set of traditional e-mail (collectively called "metadata extensions"), including the ability to have private and non-private conversations within a single e-mail communication, and to allow recipients to respond in the same manner. Specific features are summarized below, and are described in greater detail in subsequent sections.

Controlled, Centralized, and Secure Message Repository

Since all eMail2 messages are sent to an eMail2 service (FIG. 1, 110), the eMail2 service 110 acts as a controlled, centralized, and secure message repository (Private E-mail Network). The messages and their attachments are stored in an encrypted form on the eMail2 service/server system 110 and may be archived for any desired period of time. When creating a new eMail2 message, the sender may select which eMail2 service 110 will handle and store the message and its message thread (replies, forwards, tracking information, etc.).

Increased End-to-End Transport Security eMail2 message bodies and their attachments can be stored encrypted on a user's local computer. When eMail2 messages and attachments are sent to a service 110, they may be temporarily decrypted and sent over a secure protocol (such as HTTPS). A secure protocol is essentially a direct, private tunnel between the client and the server, and as such, is resistant to interception techniques or security compromises. Upon arrival at the server 110, the eMail2 messages and attachments are preferably immediately encrypted before storage, using the service's 110 encryption methods.

Stored data can be decrypted, but preferably cannot be re-encrypted with different information. Enforced through the admin interface, decryption attempts and reasons for such attempts are sent directly to the involved users. This is assuming that the decryption attempts were legitimate. If a message were to be decrypted and then re-encrypted by an un-authorized person with different information in the body, header, or attachments, this would immediately be detected by the eMail2 system, and identified as such to the user and service 110. This identification could optionally be performed by a checksum value comparison.

With this preferred system, data is completely secure between the point of origin and the destination, as well as secured during storage at both points. Additionally, due to the decoupled relationship between the service 110 and client 100 environments (namely, no secret encryption information is shared between the two sides), a security breach at one end will leave the other end remaining completely secure. Further, information generally cannot be tampered with between point A and point B, as it is stored and transferred securely at all times.

Though it is not necessarily required, it is possible for eMail2 to be implemented in tandem with other e-mail security solutions (such as PKI or PGP) to provide even further increased transport security.

Seamless Use of Encryption Keys

From the user's perspective, the process of encrypting and decrypting eMail2 messages is seamless. These security features are embedded in the eMail2 client plug-in 108 and the eMail2 service and require no extra effort on the part of the user. Each eMail2 message is preferably encrypted during storage, and preferably only transferred over a secure protocol (such as one from the popular TCP/IP suite of protocols). Since these messages are protected from creation to retrieval, it is difficult or impossible to change their content (message body and any attachments) during the transaction. It is also difficult or impossible for unauthorized users to retrieve or intercept messages and attachments. Self-executable viruses generally cannot infect an eMail2 service 110 and propagate themselves, resulting in an overall safer global network.

Interchangeable Crypto Engine

In addition to the seamless use of encryption keys, the eMail2 system preferably makes use of a unique Interchangeable Cryptography Engine (ICE) (FIG. 26, 123). The ICE is implemented either on the client side (FIG. 1, 100) or the service side 110 of the service, and allows administrators to select custom or third party encryption algorithms to protect messages stored in the services they manage. New encryption methods or systems can be registered with the ICE (FIG. 26, 123) as they emerge, allowing an eMail2 installation to offer the highest possible levels of security to clients.

Co-Existence With Traditional E-Mail

No changes are necessarily required to a user's e-mail address or e-mail server/internet service provider to start retrieving eMail2 messages. As mentioned previously, the eMail2 client plug-in (FIG. 1, 108) may handle all of the added client-side functionality of eMail2.

Users that wish to initiate a new eMail2 message may do so by subscribing to an eMail2 service 110. Such a service may be provided by anyone, including national or local ISPs (AOL, MSN), web-based e-mail providers (Yahoo Mail, Hotmail, Gmail) or security service providers (Verisign, Symantec). Users may subscribe to any number of eMail2 services 110 and choose the appropriate service 110 to serve each new message. Preferably, recipients do not need to subscribe to any eMail2 service 110 in order to retrieve or reply to eMail2 messages. Preferably, all replies to an eMail2 message are served by the eMail2 service 110 on which the original message was created, although linkages between email2 servers are contemplated and discussed below.

Each eMail2 service 110 may offer value-added features such as different security, encryption and storage options. Any organization can also set-up its own eMail2 service 110 internally and/or subscribe to external eMail2 services 110. Preferably, all eMail2 services 110 are able to interoperate with the same version of the eMail2 client plug-in 108 (i.e., the eMail2 client plug-in 108 is preferably universal to any eMail2 service 110).

In some embodiments, multiple eMail2 services 110 can be linked by the service administrators to allow for routing across disparate eMail2 services, or alternatively, only among trusted services. In such a case, the message may be 'owned' by the initiating service 110, but copies may be stored at other locations. This provides for sharing tracking results across multiple companies. For example, if Company A wants to communicate with Company B, but both want to be able to universally access tracking and service information, the administration may be able to set up both services so that in defined instances, tracking and service information can be shared. If more than one service is hosting copies of the message, this may be disclosed in the access message and tracking information, possibly in the "service" section of the respective items.

In other cases, where special arrangements have not been made between services, eMail2 messages for a specific service 110 are preferably only hosted by and acted upon by the service 110 with which they were initiated. Although multiple eMail2 services 110 and service providers are contemplated, the system may be implemented with only a single eMail2 service 110 and service provider.

Proactive Message Summary: The Access Message and Delivery Slip

Figure 17:
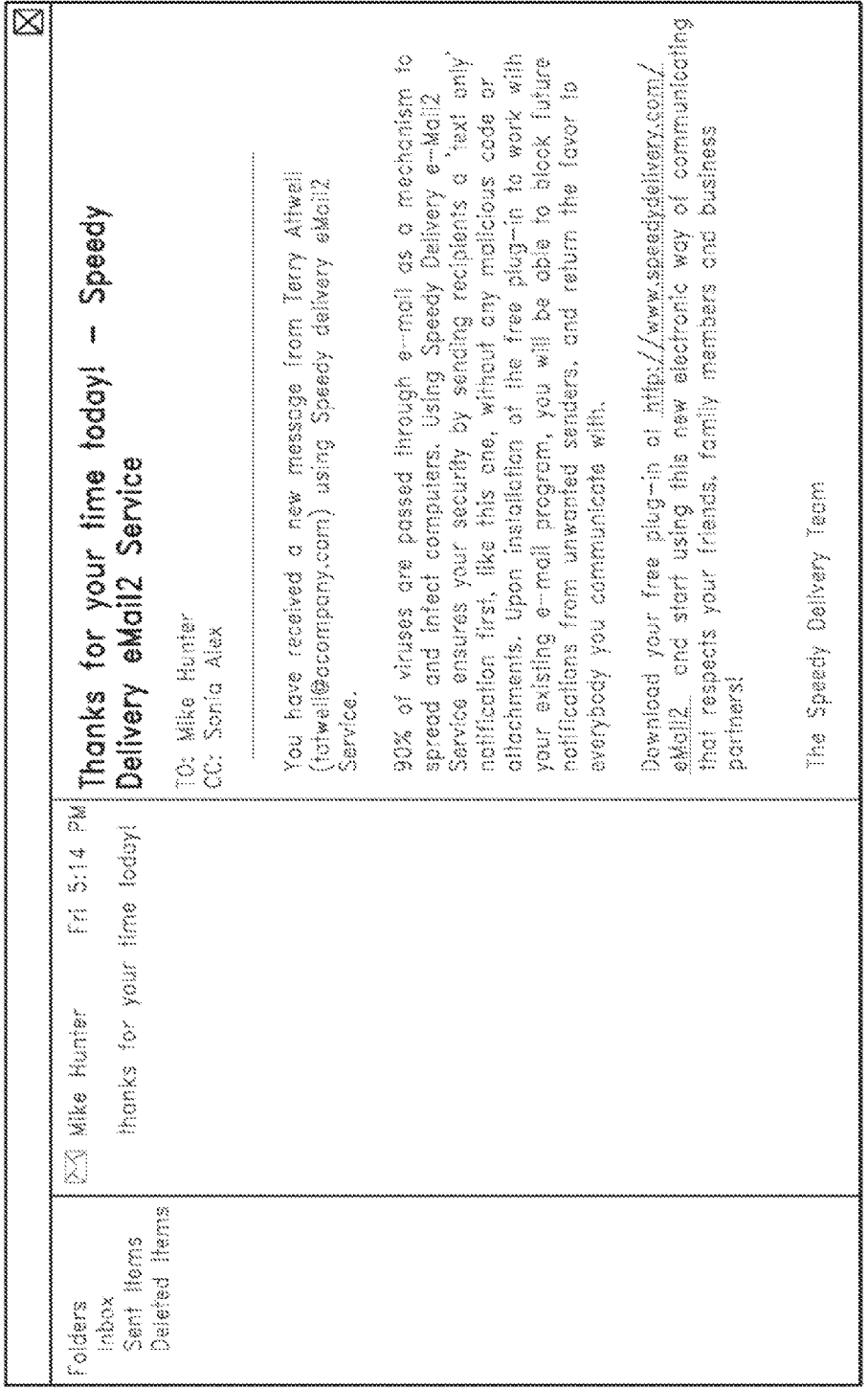
FIG. 17 is an example of an eMail2 Introductory Message, viewed through the preview pane in Microsoft Outlook.

Allowing recipients to manually retrieve messages after reviewing the access message substantially reduces the probability that their computers will become infected by an e-mail virus. The access message may contain information such as, but not limited to, the identity of the sender, the identity of the recipient(s), whether any local anti-spam and anti-virus scanning has been performed, a brief summary of message, metadata associated with attachments to the message, etc. (See FIGS. 16 and 17). Access messages containing inappropriate key strings or virus warnings can be blocked and deleted by the recipient or the recipient's computer system (FIG. 1, 100). The access message is retrieved from an eMail2 service 110 using the introductory message that is initially sent to the recipient. Since the introductory message may be sent via e-mail1, it can go through all of the anti-spam and anti-virus scanning processes 102 currently in use.

In one embodiment, the access message exists as an e-mail message in the recipient's inbox, and may replace the introductory message automatically when the eMail2 client plug-in 108 is installed. Users may also have the option to view a web-based version of the access message called the "delivery slip." The delivery slip (FIG. 30, 806) may contain the same information as the access message, less information, or more information, and is fully customizable within an eMail2 service (FIG. 1, 110). In embodiments that include a web client interface 127, the delivery slip (FIG. 30, 806) is also a part of the web client interface (FIG. 1, 127). As such, users can not only view metadata, but may also be able to retrieve or perform other actions with the eMail2 messages, such as replying, forwarding, downloading attachments, and so forth.

Customized Private Messages

Figure 8:
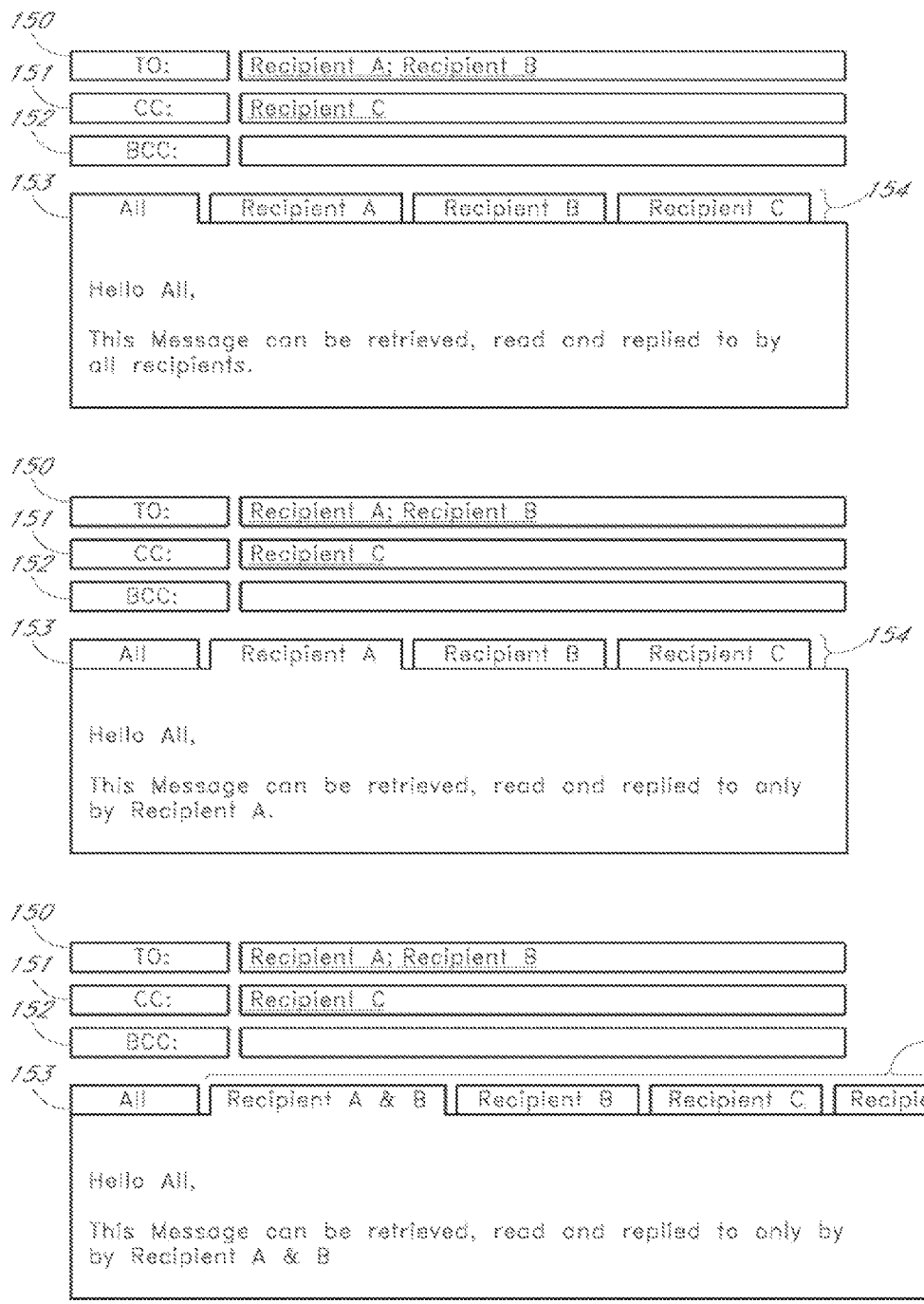
FIG. 8 describes the process for adding multiple private messages to a single conversation, as well as the process for combining private messages into private groups.
Figure 9:
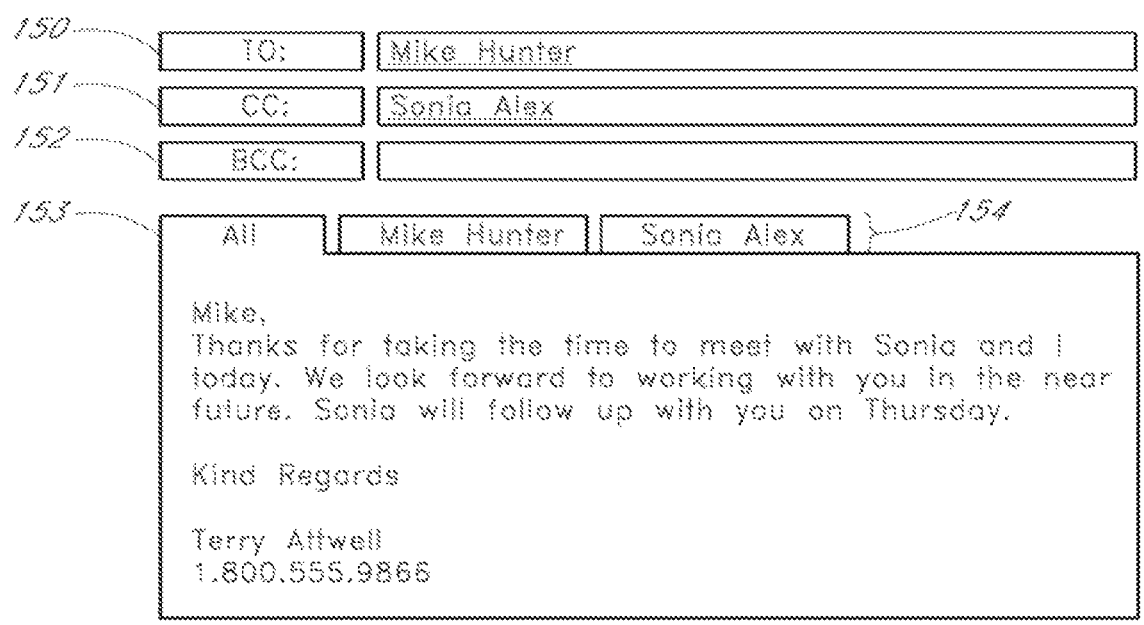
FIG. 9 describes the process for adding public sub messages, specifically using Microsoft Outlook with a plug-in (described in FIG. 1 and FIG. 2) installed.
Figure 10:
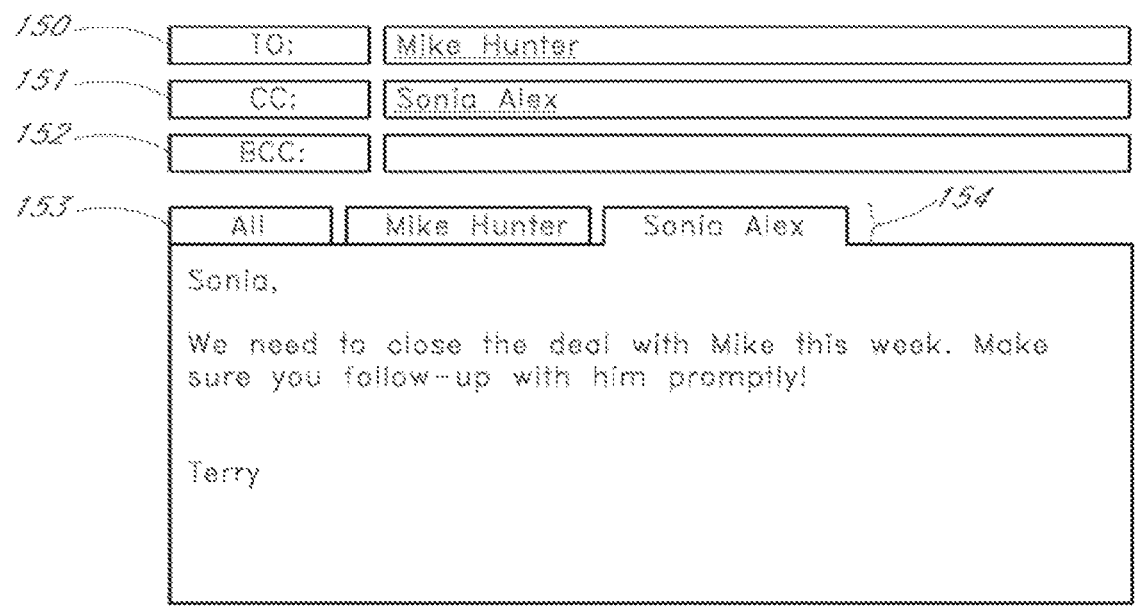
FIG. 10 describes the process for adding private sub-messages, specifically using Microsoft Outlook with a plug-in (described in FIG. 1 and FIG. 2) installed.

Some embodiments of the eMail2 system allow users to combine public and private "sub-messages" into a single logical eMail2 message. For example, a sender may create a public sub-message that is viewable by all recipients, and additionally embed into the eMail2 message customized private sub-messages to a sub group of recipients and/or each individual recipient (See FIG. 8). Recipients preferably retrieve from the eMail2 service the public sub-message to "All" as well as their individual private sub-messages (possibly including individual attachments). The public and private sub-messages preferably appear to the recipient as a single logical eMail2 message in his or her inbox. Each recipient can reply in the same secure fashion to any recipients originally included in a given sub-message and may add new recipients (See FIG. 8) subject to the forwarding controls put in place by the sender. FIGS. 9 and 10 provide visual representation of custom private messages in a real-world setting.

Unique Message Threading

Each eMail2 message (and sub-message) is assigned a unique message ID and, if appropriate, a unique parent message ID. As a result, an original message and all of its replies can be tracked and assembled. For example, these IDs allow an e-mail client to combine all replies to the same eMail2 message into a single inbox entry.

P2P Event-Based and Transactional Data: Ratings and Surveys

Some embodiments of the eMail2 system may provide peer-to-peer event-based and transactional functions that link the sender and recipients of an eMail2 message. Because all eMail2 messages in a conversation are served by the same service 110, users can be linked directly to their actions, and reliable records of said actions can be kept. This allows for the possibility of features like rating and survey systems for e-mails, in which recipients can, prior to retrieving a given message, see if other recipients rated the message as valuable. User-to-action links may include interoperability with social networking systems.

One of the largest benefits of such an approach is the ability to seamlessly display metadata in real time via a secure browser window. Survey, rating and voting results (e.g., average rating) can be generated and updated in front of the user's eyes.

Additionally, the rating or survey functionality of a message is not necessarily limited to a sender-recipient relationship. Peer-to-Peer (p2p) ratings and surveys are possible, allowing recipients to view metadata generated by other recipients.

Real-Time E-Mail Tracking Accountability & Auditability

Because eMail2 messages are not sent via traditional e-mail1 protocols, it is possible with eMail2 to track the entire lifecycle of a message (send, retrieve, forward, reject, delete. etc.). As each recipient retrieves, forwards or rejects their intended message, the sender and/or recipients can monitor the status of these transactions. The eMail2 system may also include web services that can be customized into existing applications such as online e-commerce engines, supply chain management deployments, CRM applications, etc., enabling flawless transactions throughout the entire cycle.

Complete Message Control and Termination

In some embodiments, the originator of a message has a level of control over the future use of that message. The options to terminate a message, change policies or control permissions may be held by the sender throughout the entire lifecycle of a conversation. In some embodiments, upon creating a new message, the sender can decide whether or not recipients can reply to the message, forward it, or see the tracking metadata associated with it. Preferably, these options can still be exercised by the sender after the message has already been sent. As an example of message control, the sender may be able to enforce a policy for a message that will require that the initial recipients request the sender's permission before forwarding a message to a third party. This permission may include global permission (to allow all forwarding by the recipient) or per-3.sup.rd-party permission (where the sender may approve or deny forwarding to specific 3.sup.rd-parties).

The current generation of e-mail, built on an outdated architecture, does not provide for the same level of message control. Message control features, such as termination and requiring permission to forward messages, are a direct result of the new architectural system that is a part of eMail2 and are generally not possible within the bounds of an e-mail1 framework.

Termination, essentially freezing the conversation in time, can be especially useful in contract negotiations, legal disputes, e-commerce communication and the general prevention of the dissemination of sensitive information. Senders have the option of choosing between soft termination, wherein users are prevented from performing further action on an eMail2 message, such as forwarding or replying, or hard termination, wherein users are prevented from accessing the message again, as well as prevented from performing further action on the eMail2 message.

Registered Electronic Mail

The eMail2 system, when optionally composed of message retrieving, storing, threading and tracking processes, seamless use of encryption keys and digital signature auditing, allows for a true "registered electronic mail" application. For example, eMail2 allows for later retrieval of messages and activity logs over a secure web based interface (FIG. 1, 127). eMail2 services 110 may offer secure eMail2 transaction services where the complete transaction is monitored and recorded. The messages (and their attachments) may be saved in an encrypted form on the eMail2 service/server 110 and may be recovered later by a third party organization, such as a legal entity, in order to prove that the transaction actually occurred. The encryption inhibits unauthorized users from tampering with the messages and their attachments.

eMail2 re-creates the business process of traditional registered snail mail, but electronically, or paperless. In one embodiment, all message contents and attachments are stored encrypted, certified and available for later retrieval, in their original condition, by any authorized user (such as a legal entities), proving that the transaction actually occurred without any possibility to have it tampered with over time.

As an example, financial institutions are struggling to comply with SEC rule 17a-4 which says they must record all electronic communication between employees and clients. Although the rule has been in effect since 1997, only recently have regulators come down on the industry by fining such firms as Deutsche Bank, Goldman Sachs, Salomon Smith Barney and Morgan Stanley, among others. Not wanting to join this dubious list, financial-services firms are now faced with the task of investing millions of dollars in e-mail archival and retrieval systems or face fines and, even more seriously, a damaged reputation.

eMail2 introduces a robust solution for archiving and retrieving all of the e-mail content and its associated tracking details, ensuring that the complete range of electronic communications of specific users and groups is fully archived and auditable. In one embodiment, eMail2 makes compliance transparent, ensures the security of archived e-mail, supports legal and litigation processes and addresses compliance requirements worldwide.

Private E-Mail Networks

The structure of eMail2 allows for the creation of Private E-mail Networks (PENs). PENs are communication networks that function independently of traditional e-mail networks, but preferably do not preclude users from using their regular e-mail address, e-mail client, or communication methods. As the name implies, PENs are private, but the level of privacy is preferably directly tailored to the needs of an eMail2 client. With eMail2, it is possible for a large business (e.g. an American HMO) to run its own eMail2 service and only allow hospital employees and patients to communicate through it. Alternatively, a general purpose eMail2 service provider could offer secure communications to anyone willing to join or subscribe to its services.

Members of eMail2 PENs preferably can belong to more than one network and may decide on a per message basis which PEN service to use. Every subsequent activity (e.g. replying and forwarding) is preferably driven from the PEN service originally chosen by the sender. Even message recipients who are not members of a sender's PEN are able to retrieve messages from the sender's specified PEN. This increases security by reducing the number of times an eMail2 message is kept in storage, and therefore reducing the chance that data could be compromised.

So, for example, a single HMO could institute multiple PENs for multiple users and with different security policies: A high-security PEN with strong cryptography, virus scanning, message access controls, and tracking for emails relating to patient health records; a medium-security PEN with medium security, fewer message access controls, and tracking for intra-office business communication; and a low-security, low-tracking general purpose PEN for non-business communication.

The eMail2 system need not itself include any anti-spam software, anti-virus software, blacklist software, encryption key or a TCP/IP protocol, but may instead work in conjunction with pre-existing software for handling these tasks. Furthermore, eMail2 is not a different e-mail messaging system to replace MS Exchange, Outlook, etc, or another web based e-mail system like Gmail or Hotmail.

3. Architectural Components of the Preferred Embodiments

The components and subcomponents depicted in FIG. 1 can be logically divided into four areas: the sender and recipient's local computing devices (FIG. 1, 100) (PCs, Personal Digital Assistants, set-top television boxes, etc.), the eMail2 service 110 (comprised of one or more servers), traditional e-mail1 servers 103, and the communication protocols used to exchange information over the Internet.

While FIG. 1 illustrates a client plug-in-to-server communication model, it will be recognized that the system may also be implemented with web client-to-server communication model, or even a server-to-server communication model. The system can also be effectively implemented across terminal services/Citrix access type architecture without departing from the scope of the invention.

a. Sender and Recipients Local Computing Devices

E-Mail Client [EC]

The e-mail client 101 is responsible for creating, exchanging, and viewing e-mail messages and may be a conventional e-mail1 client. Existing e-mail clients include MS Outlook, Eudora Mail, and Lotus Notes. As used herein, "e-mail client" refers to any program (e.g. PC-based, web-based, PDA-based, etc.) that allows for the creation and management of e-mail messages though existing e-mail protocols such as SMTP. Ordinarily, the e-mail client does not itself include any eMail2 functionality, but rather relies on the eMail2 client plug-in 108 to provide this functionality.

Anti-Virus/Spam Client [AVC]

Anti-virus/spam clients 102, which may include or consist of conventional, pre-existing anti-virus and spam filtering software, may be installed on the local computers or servers of the sender and/or recipients 100 (or on the eMail2 service server 110) and are used to scan e-mail messages and attachments for malicious code or spam from unwanted senders. In the preferred embodiment, these programs are not a part of the eMail2 system, but may be used in conjunction with eMail2. For example, the results of these scanning processes 102 may be displayed in the access message and delivery slip (FIG. 30, 806) of each eMail2 message.

eMail2 Client Plug-In [e2CP]

The eMail2 client plug-in 108 is the client component used to exchange eMail2 messages. The eMail2 plug-in is preferably universal (one version per e-mail client such as Outlook for Windows, Mail for Apple) and is optionally installed on both the sender and recipients' local computing devices (FIG. 1, 100). The client plug-in is preferably responsible for creating, sending, retrieving, and forwarding eMail2 messages and retrieving/sending tracking record(s) and other information provided by an eMail2 service 110. It also incorporates the added features offered by eMail2 (creating private messages, ratings, surveys, etc.) and is preferably responsible for all communications with the eMail2 service. The functionality of the eMail2 client plug-in can be replicated in the form of the e-mail web client interface 127.

Different versions of the eMail2 client plug-in 108 can be developed by third party programmers for each e-mail client 101 using eMail2's API objects. Alternatively, the functionality of the eMail2 client plug-in 108 may be integrated directly into existing e-mail clients, or may be integrated into the operating system of the users' computers.

eMail2 Client Plug-In Global Unique Identifier [e2CPGUID]

The eMail2 client plug-in global unique identifier is a unique identification key that is tied to each specific installation of the eMail2 client plug-in 108. The e2CPGUID is used in conjunction with the eMail2 User Key [e2UK] and e-Mail1 Address [e1A] in validation and authentication with the eMail2 service server 110.

Cryptographic Engine

Cryptographic engines (FIG. 2, 115) are used by applications to encrypt or decrypt data. In the eMail2 system, a cryptographic engine 115 may exist on the client side, the service side, both, or neither. Various cryptographic engines 115 already exist, and may be implemented in tandem with eMail2 system architecture. A specialized cryptographic engine 115 called the eMail2 Interchangeable Cryptography Engine 123 is disclosed below. The Interchangeable Cryptography Engine 123 is a part of the eMail2 system in some embodiments and is not an existing Cryptographic Engine 115.

eMail2 Interchangeable Cryptography Engine [ICE]

The eMail2 ICE (FIG. 26, 123) is a type of cryptographic engine (FIG. 1, 115). The eMail2 ICE (FIG. 26, 123) is an optional component of the eMail2 system. When provided, it may be part of the eMail2 service 110, the eMail2 client plug-in 108, both. The eMail2 ICE, when present, handles the encryption and decryption methods used to protect and transport messages. The eMail2 ICE is preferably a modular encryption system, allowing new encryption methods and existing third-party methods to be integrated into the eMail2 system on a server-only level, a client-only level, or both.

eMail2 Communication Plug-In [e2COM]

The eMail2 communications plug-in (FIG. 26, 124) is an executable subcomponent of the eMail2 ICE 123 and is used by the ICE 123 to encrypt/decrypt each eMail2 message with a particular encryption method. e2COMs 124 are security expansion packages for the eMail2 ICE 123: each e2COM 124 contains an encryption/decryption method and is implemented through the ICE Application Programming Interface (API) 125. An unlimited number of e2COMs 124 can be created and installed by third party developers for use with the eMail2 ICE 123. The e2COMs may, for example, be implemented as DLLs.

As encryption methods improve, existing encryption methods are broken, or if the business needs of a specific eMail2 service (FIG. 1, 110) requires stronger encryption, new e2COMs (FIG. 26, 124) can be developed and made available for use with one or more eMail2 services (FIG. 1, 110). As subcomponents of the eMail2 ICE (FIG. 26, 123), e2COMs 124 are installed and registered wherever the ICE is implemented. In the preferred embodiment, one e2COM 124 (a default) is included inside the ICE 123, but custom and third party e2COMs can also be added as needed or desired by services/users. Encryption methods that may be implemented as e2COMs 124 include (but are not limited to) AES, DES, DSA, SHA1, MAC TripleDES, MD5, RC2, Rijndael, RSA, SHA256, SHA384, SHA512, etc.

eMail2 Communication Plug-In UUID [e2CPUUID]

The eMail2 communication plug-in UUID is a unique identifier that is tied to an eMail2 communication plug-in 124. The eMail2 plug-in (FIG. 1, 108) can use the communication plug-in UUID to identify which eMail2 communication plug-in (FIG. 26, 124) to use when communicating with a specific eMail2 service (FIG. 1, 110).

b. eMail2 Service eMail2 Message [e2M]

An eMail2 message is an electronic message, including plain text, html, and/or attachments, that is sent through an eMail2 service 110. The eMail2 message may also include public and private message content and attachments. All of the actions that can be performed with respect to an eMail2 message (creating, forwarding, replying, reading, tracking, and so forth) are facilitated by the eMail2 client plug-in 108 (or the eMail2 web client interface 127) and/or the eMail2 service 110. In some embodiments, the eMail2 web client interface 127 can actually take the place of the eMail2 client plug-in 108, allowing users to perform all usual eMail2 message actions (creating messages, retrieving messages, replying, forwarding, etc.) across a preferably secure connection at a eMail2 service web interface (e.g. a website).

eMail2 Public Message [e2M Public]

With the eMail2 public/private message system, senders can create sub-messages' within a single logical e-mail message. These sub-messages can be either public or private. A public eMail2 message can be viewed and replied to by all recipients, and is generally contained within the "all" tab of the tabbed e-mail window interface.

eMail2 Private Message [e2M Private]

With the eMail2 public/private message system, senders can create 'sub-messages' within a single logical e-mail message. These sub-messages can be either public or private. A private eMail2 message can be viewed and replied to only by the recipients that it is specifically addressed to. In an e-mail conversation, the private messages are only retrieved by the intended recipients. Private messages are generally displayed within tabs labeled for specific recipients in the tabbed e-mail window interface that may include one or more recipient per tab (See FIG. 19).

eMail2 Message ID [e2MID] and eMail2 Parent Message ID [e2PMID]

Message IDs and Parent Message IDs are embedded in eMail2 messages when they are created. A Message ID is the unique identifier for an eMail2 message, and enables several of the extended features that eMail2 offers. Every eMail2 message has a Message ID, and messages that are replies or forwards (derivative messages) contain Parent Message IDs that identify them as members of a specific eMail2 conversation (or thread).

If Message B is a reply to Message A, then Message B will contain both a Message ID that uniquely identifies it as a message, as well as a Parent Message ID that links it to Message A.

eMail2 Service/Server [e2S]

The functions of the eMail2 service (which is comprised of one of more servers) (FIGS. 1 and 2, 110) may include but are not limited to (1) registration/activation of eMail2 users; (2) e-mail2 message storing, archiving, scanning, and retrieving; (3) introductory message creation and delivery; (4) access message creation and delivery; (5) dynamic delivery slip creation and hosting; and (6) web services. The eMail2 service 110 also preferably offers a management console that allows administrators to manage their member base, control server traffic flow, receive reports about system activity, and access other administrative functions.

The eMail2 service 110 is preferably a combination of hardware and software running on one or more servers. From a client computer's perspective, it is a single, autonomous entity that provides eMail2 services, even if the actual eMail2 service 110 is distributed between multiple computers or servers. The eMail2 service 110 preferably runs on the Windows or UNIX operating systems, although it may run on any operating system platform. The eMail2 service data layer 120 preferably runs on a relational database management system such as Microsoft SQL Server or Oracle, although it may run on any type of data repository. The eMail2 service can be hosted by any ISP or internally by any organization. It may authenticate each user, store eMail2 messages in an encrypted manner, and send and retrieve each eMail2 message. The eMail2 service 110 may also log activity related to an eMail2 message and create and update eMail2 access messages and delivery slips accordingly.

eMail2 Service Global Unique ID [e2SGUID]

The eMail2 Service Global Unique Identifier preferably uniquely identifies a specific eMail2 service 110. It may be stored on both the eMail2 service 110, and on the local computer 100 of any eMail2 users that have activated with the specific service 110.

eMail2 User Key [e2UK]

The eMail2 user key is generated from a user's e-mail1 address and a specific eMail2 service 110 as identified by an e2SGUID. User keys are service-specific and are created during passive registration. In one embodiment, the user key is embedded into the local PC registry of the user's computer 100. In other embodiments, the user key may be stored in other locations, such as networked or removable storage. The user key serves to uniquely identify a user when accessing a particular eMail2 service 110. It is created and delivered to the user by the eMail2 service 110 and, in the preferred embodiment, is always transferred in a secure manner between the different hardware components.

eMail2 Activation Code [e2AC]

The eMail2 activation code may be generated when a user registers with an eMail2 service 110. In one embodiment, a user registers by navigating to an eMail2 service's web client interface 127 and providing his or her e-mail address to the eMail2 service. An activation code is preferably comprised of: an eMail2 user key, an eMail2 CPGUID and an e-mail address. The registered e-mail address becomes "bound" to the eMail2 service 110. Upon providing this e-mail address, the eMail2 service 110 preferably sends an eMail2 activation code (which may or may not be encrypted) via e-mail1 to the user's e-mail client 101 where it is intercepted by the eMail2 client plug-in 108 to complete the activation.

eMail2 Message Access Key [e2MAK]

The eMail2 message access key uniquely identifies an eMail2 message and contains information about where the message is stored. It is preferably used by an eMail2 service 110 and client plug-in 108 to track all of the actions that occur for the message.

The message access key preferably contains non-secret information which describes the eMail2 message, the eMail2 service 110 from which it is to be retrieved and the unique message ID that identifies it on the service 110. The message access key might not contain any sensitive information but is preferably obscured by a public algorithm. This algorithm is preferably included natively within all versions of the eMail2 client plug-in 108, thereby allowing all eMail2 client plug-ins to decipher the eMail2 message access key. However, without the other key personal information (such as the eMail2 user key and possibly even the eMail2 CPGUID, for example) it is impossible or difficult to retrieve the message. See FIG. 11 and FIG. 12 for eMail2 message access key samples.

The eMail2 message access key may contain (but is not limited to) the following four elements:
1. The eMail2 service node (FIG. 2, 116) address or eMail2 service host ID.
2. A unique eMail2 message ID.
3. A unique eMail2 parent message ID.
4. The eMail2 message access key state.

Note that the message access key is preferably not used as an encryption or decryption key for encrypting/decrypting eMail2 messages. The encryption/decryption of each message is preferably the responsibility of a cryptographic engine 115 (such as the ICE [FIG. 26, 123]) or the eMail2 client plug-in (FIG. 1, 108) itself The eMail2 client plug-in uses the message key to locate and retrieve each eMail2 message from an eMail2 service 110. If the user's e-mail address and unique user key are valid and authenticated by the eMail2 service 110, the eMail2 client plug-in 108 is able to retrieve the eMail2 message.

eMail2 Message Initialization [e2MI]

An eMail2 message initialization occurs when an eMail2 client plug-in 108 has supplied valid credentials for message creation with a service 110. The message initialization is an empty database entry in the eMail2 service's data layer 120, containing:

eMail2 User Key (e2UK)
eMail2 client plug-in Global Unique ID (e2CPGUID)
Parent Message ID (for tracking replies)
Forward ID (for tracking forwards)
Message Options
Status (at this point, 'initialized')
Date and time of the message initialization.

A specific message initialization is identified by a Message ID. New message initializations are performed for every new message, including replies, forwards and each private or public message. Old or unused message initializations are preferably never reused for new messages.

In some embodiments, the message initialization takes place as soon as the e-mail composition window is opened (i.e. once the user chooses to create a message with eMail2). In other embodiments, the message initialization can take place upon the send command, or during any other event than can be recognized by the eMail2 client plug-in 108.

eMail2 Introductory Message [e2IM]

The eMail2 introductory message is used to initiate a new eMail2 message with one or more recipients. In one embodiment, the introductory message is a text-only message. It may be sent via e-mail1 or some other communications protocol. In one embodiment, it contains a generic "welcome" statement and a unique eMail2 message key. The introductory message preferably includes a hyperlink to, or URL of, an Internet site for downloading the eMail2 client plug-in 108. The introductory message may additionally or alternatively include a link to the web client interface 127, if this is feature enabled by the eMail2 service 110. If the recipient's computing device already has the eMail2 plug-in 108 installed thereon, the recipient ordinarily will not see the introductory message, but will instead see the eMail2 access message (see description below). See FIG. 13 for an eMail2 introductory message sample. Optionally, an applet that functions as a 'reader' could be attached to the introductory message. Using this bundled 'reader,' the recipient may be able to access and read the eMail2 message addressed to him or her without installing the eMail2 client plug-in (FIG. 1, 108) or accessing the web client interface 127. Any type of scripting or programming language could be implemented to create this applet.

eMail2 Access Message [e2AM]

The eMail2 access message is generated by an eMail2 service 110 once the introductory message is retrieved by the eMail2 client plug-in 108 of a recipient. The access message may be automatically retrieved by the eMail2 client plug-in 108, and may dynamically replace the introductory message in the user's inbox. Alternatively, a user may send a "retrieve access message" command, using the eMail2 toolbar, to achieve the same result (See FIG. 27B).

While the introductory message may be sent over SMTP protocols, the access message is preferably retrieved over HTTP or HTTPS (or any other TCP/IP channel). This allows increased transport security for the access message. See FIG. 16 for an eMail2 access message sample.

eMail2 Delivery Slip [e2DS]

The eMail2 delivery slip (FIG. 30, 806) is preferably a web-based extension of the access message retrieved by the eMail2 client plug-in (FIG. 1, 108) and a part of the web client interface 127. The delivery slip (FIG. 30, 806) may display extensive tracking and relational information, presenting it dynamically on a webpage. It may also include a dynamic eMail2 mailbox (FIG. 28, 801), displaying all eMail2 public and private messages that a user has stored on the eMail2 service (FIG. 1, 110). Selecting these messages may display the metadata for that specific message. The delivery slip (FIG. 30, 806) preferably features high levels of user interactivity and customizability. All features available to a user while using the eMail2 client plug-in (FIG. 1, 108) are preferably available to a user when viewing a delivery slip (FIG. 30, 806) through the use of the eMail2 web client interface (FIG. 1, 127).

eMail2 Web Client Interface [e2WCI]

Figure 30:
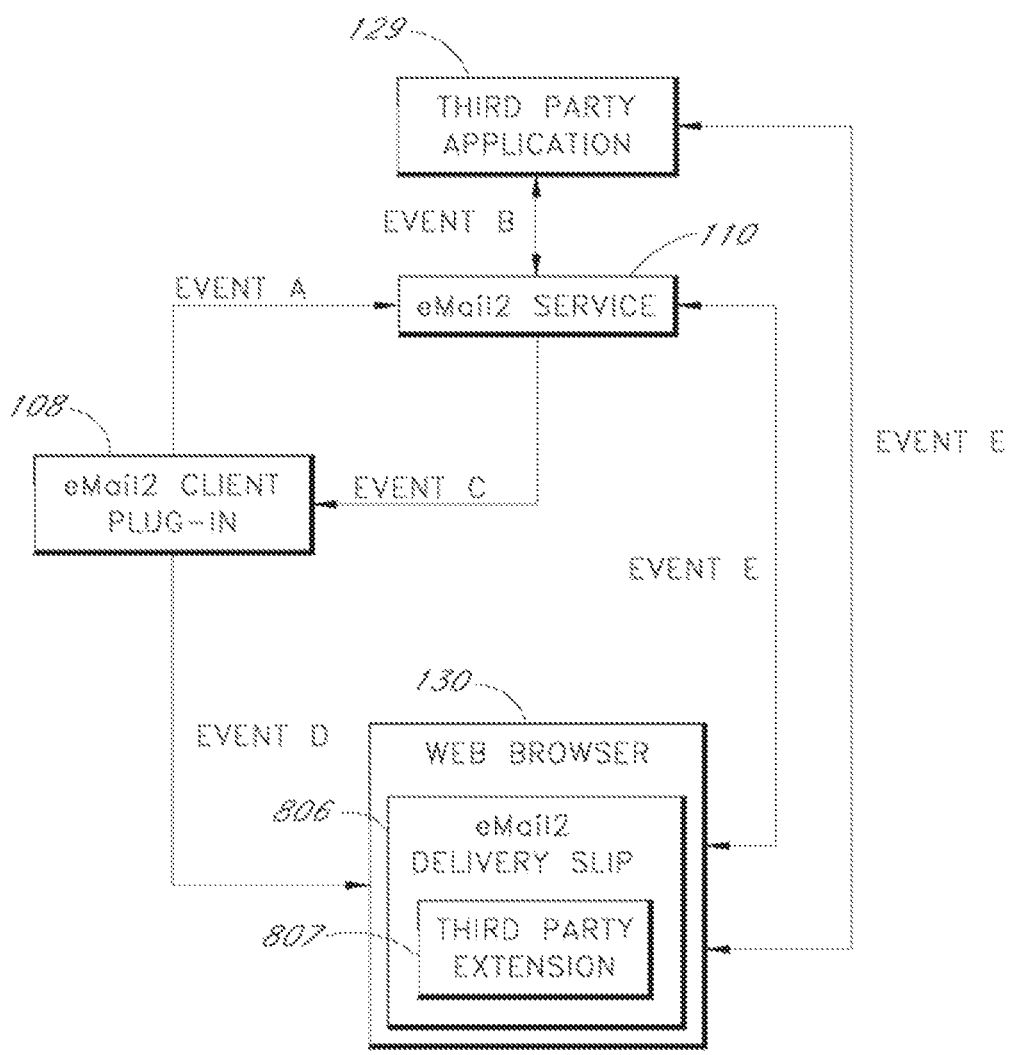

In embodiments that include a web client interface 127, the web client interface 127 is a web-based companion for the eMail2 client plug-in 108. The web client interface 127 includes the eMail2 delivery slip (FIG. 30, 806). The web client interface (FIG. 1, 127) offers similar functionality as the eMail2 client plug-in 108 in the sense that it allows for safe, secure creation, retrieval, replying, forwarding, etc. of eMail2 messages. The web client interface 127 is preferably accessed by eMail2 users with a web browser over a secure TCP/IP connection like HTTPS. In one embodiment, a hyperlink is included in either the introductory message or the access message, directing the user to the web client interface 127. In other embodiments, the web client interface 127 may be accessed via a secure log-in screen on the service's website, or by a button on the eMail2 client plug-in toolbar (FIG. 27b).

The eMail2 web client interface (FIG. 1, 127) enables fully functional use of an eMail2 service from a location where the eMail2 client plug-in 108 is not installed. With the eMail2 web client interface 127, it is not necessary for a user to install the eMail2 client plug-in 108 to use eMail2.

The delivery slip (FIG. 30, 806) aspect of the web client interface (FIG. 1, 127) preferably contains a 'pre-send' state that allows a user to set outbound message options (whether or not to enable tracking, ratings, surveys, allow replying/ forwarding, etc.). These options are preferably set through the web client interface 127 regardless of whether the message is being composed with the client plug-in 108 or the web client interface 127. If the user is composing the message with the eMail2 client plug-in, this aspect may be transparent.

eMail2 Service Provider [e2SP]

The eMail2 service provider or host is similar to an ISP (Internet Service Provider) but provides eMail2 services and product downloads. eMail2 service providers can host Private E-mail Networks (PENs), (essentially, private eMail2 services 110), enabling e-mail communication outside of the traditional e-mail networks and without using the traditional e-mail protocols. An eMail2 service provider is preferably administrated by an eMail2 Super Administrator.

Since companies can preferably host their own eMail2 services 110 (or PENs), it is possible for a company to be an eMail2 service provider while maintaining a company-specific eMail2 service 110. A service provider is host to one or more services 110 which users may join and use.

eMail2 Certification Authority [e2CA]

The eMail2 Certification Authority (FIG. 1, 112) is preferably a combination of hardware and software running on one or more computers/servers. The certification authority maintains a mapping of user e-mail addresses to eMail2 service providers. In some embodiments, it may also provide regular updates about the current list of available eMail2 services 110 to all eMail2 client plug-ins 108.

Additionally, the certification authority 112 may be implemented to authenticate eMail2 services 110. Legitimate eMail2 services are validated by the eMail2 certification authority 112 by means of publicly viewable, electronically signed certificates. When an eMail2 client plug-in 108 attempts to connect to a service 110, it may first check the certificate provided by the service 110. If the certificate is invalid or does not exist, the eMail2 client plug-in 108 will inform the user that the service 110 is not registered or validated with the eMail2 certification authority 112. The user then has the choice to either ignore this warning and continue, or to block this service 110 from communicating with his or her eMail2 client plug-in 108.

In the preferred embodiment, the certification authority's 112 validation and certification procedure is a manual process, but in other embodiments, it may be automated.

c. Traditional E-Mail1 Servers

E-Mail Address [e1A]

An e-mail address refers to a specific e-mail account to which a user can send and receive messages. For example, bgatesgmicrosoft.com is an e-mail address.

E-Mail1 Server [e1S]

An e-mail1 server (FIGS. 1, 103 and 105) provides a service that enables a user to send and/or receive e-mail via any of the existing e-mail protocols. Users' e-mail1 servers 103 and/or 105 may be hosted at their ISP or internally within an organization (e.g. MS Exchange).

E-Mail1 Message [E1M]

An e-mail1 message is an e-mail message sent using traditional e-mail1 protocols such as SMTP, POP3, and IMAP.

d. Network Protocols

SMTP, POP3, and IMAP Protocols

SMTP (Simple Mail Transfer Protocol) is a TCP/IP protocol used for sending e-mail. POP3 (Post Office Protocol 3) is the most recent version of a standard protocol for receiving e-mail. POP3 is a client/server protocol in which e-mail is received and held by the recipient's Internet server. Periodically, the recipient (or the recipient's client e-mail receiver) checks a mailbox on the server and downloads any mail, typically using POP3. This standard protocol is built into most popular e-mail products, such as Eudora and Outlook Express. It is also built into the Netscape and Microsoft Internet Explorer browsers. For more information on POP3, refer to RFC 1725, RFC 1734 and RFC 1939.

IMAP is another protocol that provides the user more capabilities over POP3 for retaining e-mail on the server and for organizing it in folders on the server. IMAP can be thought of as a remote file server. IMAP4 can be used to access multiple mailboxes and mailbox folders, as well as public folders. For more information on IMAP4, see RFC 2060 and RFC 2061.

Hyper Text Transfer Protocol Over SSL [HTTPS]

HTTPS is a secure TCP/IP protocol. HTTPS streams are encrypted using both asymmetric and symmetric algorithms. Although HTTP and HTTPS is used for illustration purposes in this document, other communication protocols can be used in conjunction with eMail2 methods.

4. eMail2 Users and Administrators

Figure 25:
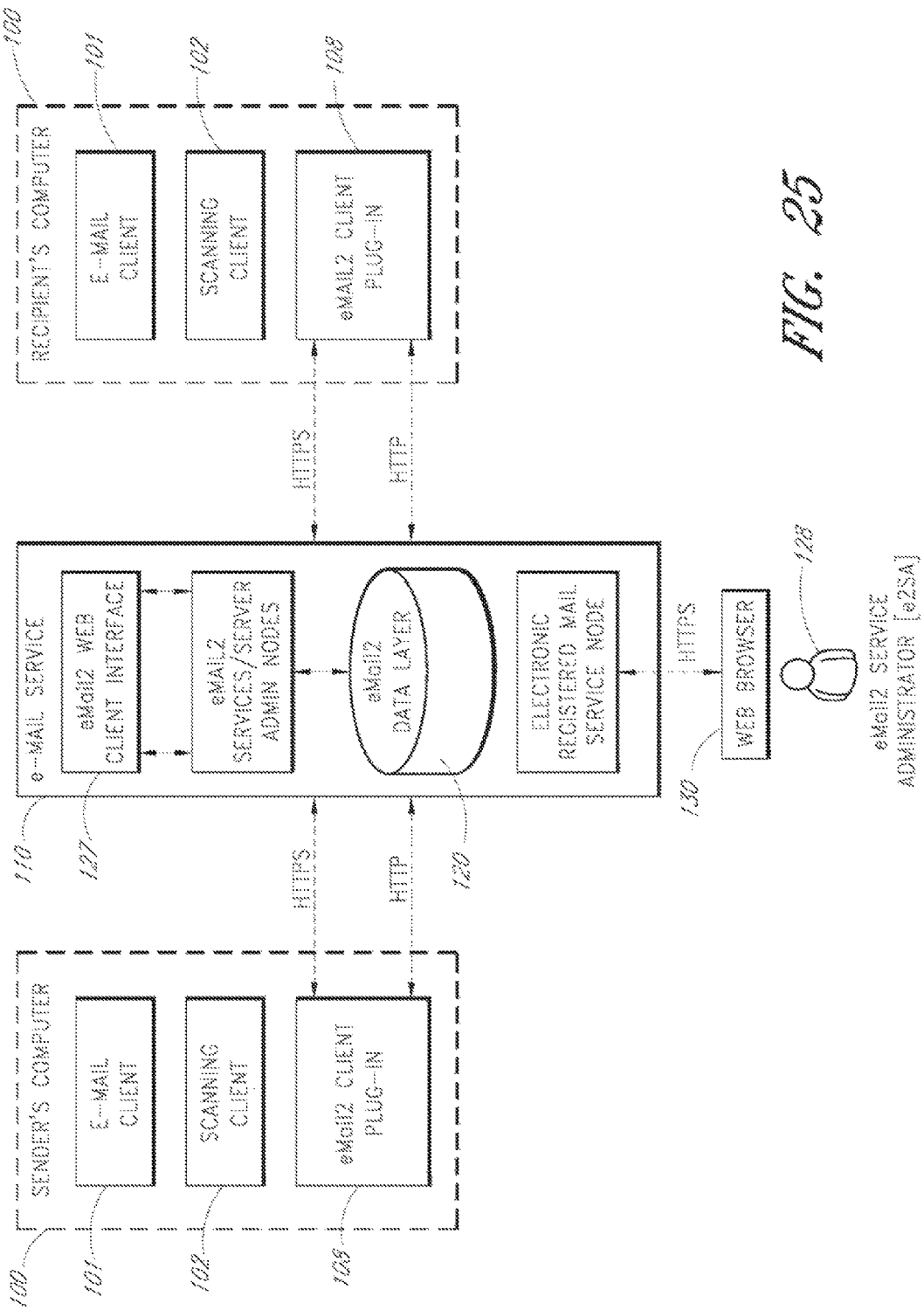
FIG. 25 is an overview of how Registered Electronic Mail can be enabled in one implementation of the system (described in FIG. 1 and FIG. 2).

In the eMail2 system, there are users and administrators. eMail2 administrators can be further divided into super administrators and service administrators (FIG. 25, 128). The power hierarchy (from the most powerful to the least) is as follows:

1. Super administrator
2. Service administrator
3. User

Users belong to an eMail2 service (FIG. 1, 110), which is controlled by at least one service administrator (FIG. 25, 128). Services (FIG. 1, 110) belong to a service provider, which is controlled by at least one super administrator. Service providers are preferably independent of each other, and as such, a super administrator for one service provider has absolutely no control over a different service provider or the services 110 hosted on it.

Super Administrator

Super administrators are the most powerful administrative users in the eMail2 system. Super administrators control eMail2 service providers, which host multiple eMail2 services 110. A super administrator can perform all administrative functions for the service provider as a whole as well as all administrative functions for each eMail2 service 110. For a given service provider, the super administrator can preferably access, search, view, and/or track eMail2 message transactions made by one or more specific eMail2 users on any of the services 110 being hosted by the service provider.

However, even though the super administrator has sufficient privileges to perform administrative actions for the services 110 that the service provider hosts, this is generally not the domain of a super administrator. Preferably, specific service 110 management falls to the service administrators (FIG. 25, 128).

Service Administrator

Service administrators 128 are a step lower than super administrators in the power hierarchy of the eMail2 system. Service administrators 128 are responsible for one or more eMail2 services (FIG. 1, 110) that are hosted by an eMail2 service provider. For a given service, the service administrator can access, search, view, and/or track eMail2 message transactions made by one or more specific eMail2 users. Preferably, service administrators only have sufficient privileges to administrate their specific services 110.

User

Users are the basic members of the eMail2 system. Users preferably do not have administrative privileges for any level of the system. eMail2 users of an eMail2 service 110 are uniquely identified by a eMail2 user key. User keys are the identifying aspect of eMail2 user accounts on a service.

Service Conferred Status

Users may have a specific status associated with their eMail2 user account. Certain statuses are set by the eMail2 service 110 that the specific user account resides on. Service conferred user statuses include but are not limited to:

Active: This user is a regular user of an eMail2 service 110 and is not restricted from his or her normal operating practices.

Inactive: This user has been temporarily suspended by a service administrator or a super administrator. No further actions may be taken by this user on the specific service 110 that has labeled him or her inactive. Reasons for flagging a user as inactive include, but are not limited to: suspicion of fraud, ongoing investigation, failure to pay required charges, disregard for service rules, etc.

Pending approval: Some services 110 may require the completion of an approval process before the user is able to use the specified service 110. This approval process may be automated or manual, depending on the requirements defined by the service 110.

User Conferred Status

In addition to service conferred user statuses, users may also be flagged with statuses by other users. Preferably, the user conferred user statuses are not stored in the flagged user account. Rather, user conferred statuses are stored locally by the conferring user. These statuses include but are not limited to:

Trusted: The flagged user is on the conferring user's trusted list.

This may result in special treatment of the flagged user by the conferring user's client plug-in. For example, a user may choose to always retrieve all messages received from contacts on his or her trusted list.

Allowed: The flagged user is allowed to communicate with the conferring user. No special treatment is granted to conversations involving 'allowed' users.

Blocked: The flagged user is unable to communicate with the conferring user. A conferring user will never retrieve messages, or receive introductory messages, from users that they have flagged as 'blocked.'

Preferably, users can confer similar statuses on specific eMail2 services 110. For instance, a service 110 that a user has flagged as 'blocked' will not able to contact that member, unless it is explicitly un-blocked.

Global User Conferred Statuses

Because statuses are preferably stored in user accounts, and are therefore specific to eMail2 services 110, if User A blocks User B at Service 1, User A has not blocked User B at Service 2. To provide for cases where, for example, User A wants to block (or trust) User B on all services, User A preferably has the option to block (or trust) User B's e-mail1 address. Thereafter, whenever User A's eMail2 client plug-in 108 encounters User B's e-mail1 address, the associated user account on the service 110 will be blocked (or trusted).

5. eMail2 High Level Process Flow (FIG. 1)

This section describes, at a high level, a preferred process flow for sending an eMail2 message with reference to the embodiment of FIG. 1. The numbers below correspond to the reference numerals depicted in FIG. 1, and indicate the major components in FIG. 1. Events A through G are described in the order which component interaction occurs in a typical embodiment of the eMail2 system.

For purposes of illustration, the various process flows are described in this document in the context of a system in which an eMail2 client plug-in 108 is installed on the user computing devices. In embodiments in which no such eMail2 client plug-in is used, the steps described as being performed by a plug-in may alternatively be performed by the e-mail client 101, the operating system, an e-mail1-attached executable or script, or the web client interface.

Event A

A sender first creates an eMail2 message using his or her e-mail client 101 in conjunction with the eMail2 client plug-in 108. The eMail2 client plug-in is responsible for eMail2 functionality such as authentication to the eMail2 service 110 and encryption and decryption of each locally stored eMail2 message (with the aid of the optional eMail2 ICE (FIG. 26, 123), described further infra).

Event B

The eMail2 client plug-in 108 sends an authentication request, via HTTPS, to the eMail2 service 110. The service 110 authenticates the sender by determining whether his or her credentials are valid for sending messages with a specific service 110. Credentials may include, but are not limited to, a registered e-mail1 address, an eMail2 user key and an eMail2 client plug-in global unique ID. Once authenticated, the service 110 creates an empty entry associated with a Message ID in the service's data layer 120 and sends the aforementioned Message ID back to the sender's client plug-in 108. This process is called "Message Initialization." The sender's client plug-in then sends the eMail2 message, including metadata and attachments if any, across the secure HTTPS connection, using the Message ID to store the eMail2 message body, attachments, and message decryption key (optional) in the service's data layer 120. Preferably, the eMail2 Message Initialization in the eMail2 service's data layer 120 is only valid for the current eMail2 message submission and is different for each eMail2 message and each eMail2 user authentication.

Although the eMail2 system can, in some embodiments, be implemented such that a single decryption key is communicated from the sender's computer 100 to the recipient's computer 100, the eMail2 system is preferably implemented without any such transmission. Instead, the eMail2 system relies on decoupled local and server encryption, with safe transmission of data across secured protocols.

Event C

The eMail2 client plug-in 108 receives the content for an introductory message from eMail2 service 110, and then sends the introductory message through e-mail1 to the recipient, via the sender's SMTP server 103. As a result of using the sender's SMTP server, the recipient will receive the message from the sender's normal e-mail address and not an address assigned by the eMail2 service. If the recipient has a safe-list or a black-list of any sort, it should not affect the receipt of the introductory message, provided the recipient can normally receive e-mail1 messages from the sender. Alternatively, the eMail2 service 110 can send the introductory message on behalf of the sender from the eMail2 service's own SMTP server. If the introductory message is sent through e-mail1, it may go through an existing local scanning client 102 such as those used by conventional anti-spam and anti-virus software. The results of these scans may be added to the eMail2 access message and delivery slip (FIG. 30, 806) that is subsequently created by the eMail2 service (FIG. 1, 110). The message may also be routed through any scanning processes 102 that may exist between the sender's e-mail1 server 103 and the recipient's e-mail1 server 103. Alternatively, if any of the recipients are registered with the same eMail2 service provider as the one chosen by the sender, the introductory message may be sent over HTTP, thus bypassing e-mail 1. In one embodiment, the introductory message contains a generic "welcome" message (see FIGS. 13 and 17) and a unique eMail2 message access key.

Event D

The eMail2 service 110, which may be hosted by a third-party eMail2 service provider, stores the eMail2 message content in an encrypted state in the data layer 120. In the preferred embodiment, access to the eMail2 messages stored on a particular service 110 is managed by that service, and eMail2 services 110 work independently from one another. In addition, all of the replying, forwarding, transaction tracking, and event tracking (e.g. ratings, virus scan results, etc.) for a given eMail2 message is handled by the eMail2 service 110 that originally serviced the eMail2 message. The logical eMail2 message sent to and stored on service 110 may be separated into multiple sub-messages, each with its own message ID and parent message ID. In the preferred embodiment, an eMail2 message that contains a public message to "All" and multiple private messages to individual recipients is divided such that each private message is a separate sub-message (with its own message ID). Only the designated recipients are able to retrieve their private messages through their unique access message.

Event E

The eMail2 service 110 can perform additional virus and spam scanning processes on the eMail2 message using scanning module 102. While this scanning process preferably occurs after the access message is produced and delivered to the recipients, the eMail2 message can still be blocked and deleted before the recipients have a chance to retrieve it. In addition, if a virus is detected by module 102, service 110 may update all of the recipients via an updated access message. If new information becomes available, service 110 may automatically update the access message and display a warning message alerting the recipient of new and critical information. In addition to a custom access message, recipients have the option to view a dynamic 'delivery slip' before retrieving the message. This delivery slip (FIG. 30, 806) contains information similar to that of the access message, but is web-based. In the preferred embodiment, the web-based delivery slip is a part of the web client interface (FIG. 1, 127), and is seamlessly integrated with sending, retrieving, replying to and viewing eMail2 messages.

Scanning module 102 may decrypt each message during the scanning process. Preferably, the messages are not re-encrypted once the scanning is completed.

Service 110 may also use blacklist programs so that introductory messages from specific senders may be blocked.

Event F

The recipient's e-mail client 101 receives the introductory message from the sender. This message may be scanned by anti-virus/spam clients 102 on the recipient's local computing device 100. If the recipient does not have an eMail2 client plug-in 108 installed, the introductory message may display a welcome message inviting the recipient to install the eMail2 plug-in (see FIG. 17), a hyperlink to the web client interface 127, or an attached executable that implements eMail2 client plug-in functionality.

If the recipient does have the eMail2 client plug-in 108 installed, the client plug-in 108 automatically retrieves the access message from service 110 onto the recipient's computing device 100 using the eMail2 message access key in the introductory message. In one embodiment, the recipient opens the access message in order to retrieve or reject the eMail2 message. In another embodiment, the eMail2 client plug-in 108 may automatically prompt the user to retrieve the eMail2 message when an access message is received. In yet another embodiment, plug-in 108 may automatically retrieve the eMail2 message from eMail2 service 110 when an access message is received or when an access message meeting certain criteria is received.

If the recipient is given the option of manually retrieving the eMail2 message, the recipient may retrieve the body of the eMail2 message and its attachment(s), the body of the message only, or simply delete the access message and ignore the message and its attachments altogether. eMail2 messages and attachments are stored encrypted on the service 110, so upon retrieval, the specified items are decrypted and sent to the user over a secure (encrypted) channel.

In the preferred embodiment, recipients can reply to eMail2 messages without having to subscribe to any eMail2 services 110. This process is described further infra. Preferably, all replies are processed by the same eMail2 service 110 that processed the original message.

Event G

Third party applications 113 can access eMail2 services through the use of an eMail2 web services API instead of using the e-mail2 client plug-in 108. Such web services may be customizable to different applications in order to provide eMail2 compliant services.

It should be recognized that the message initialization described in Event B may occur at a different point in the process flow. For instance, the system may be implemented with message initialization occurring on a send command, or during any other event that can be recognized by the eMail2 client plug-in.

Figure 2:
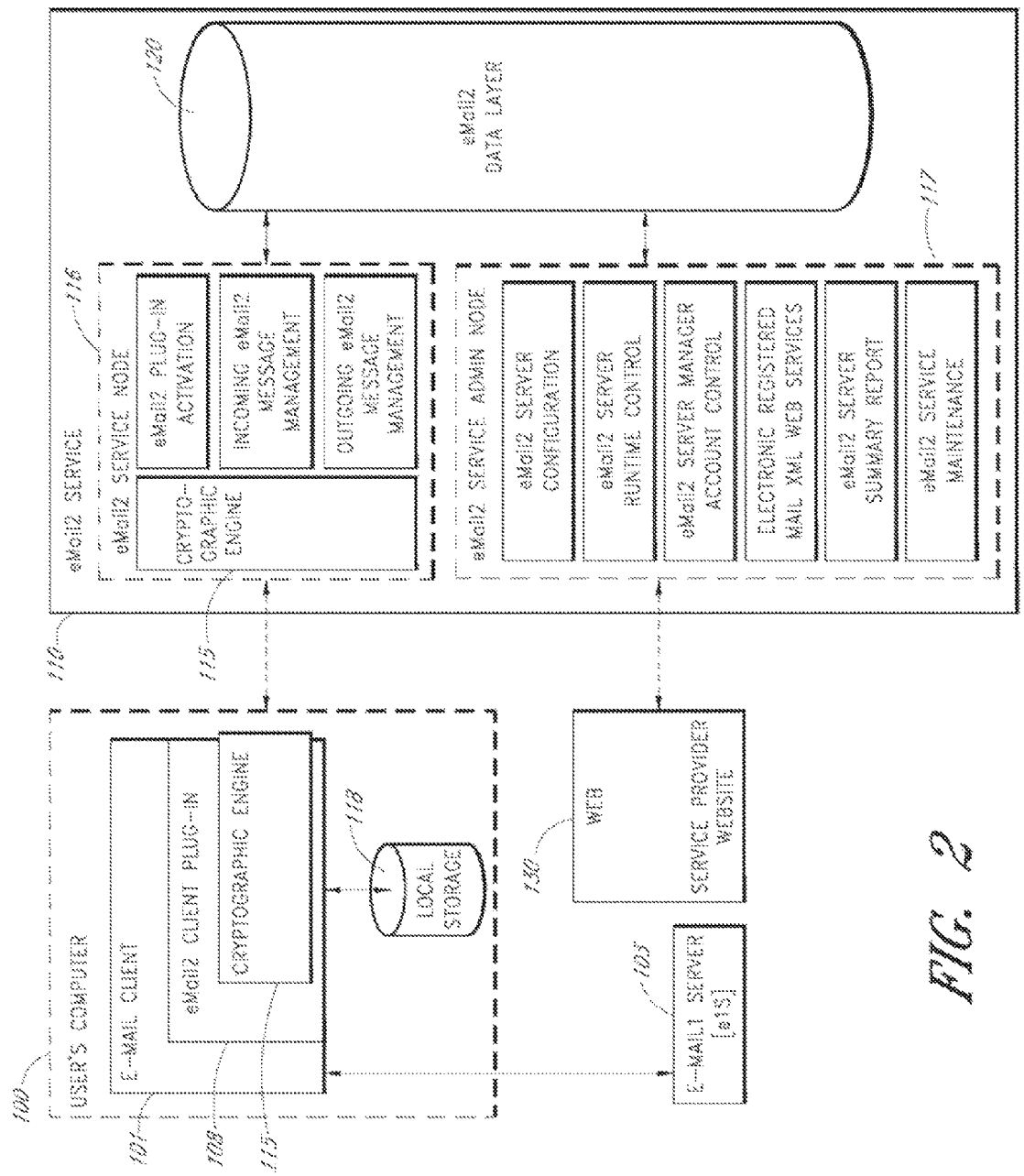
FIG. 2 is a schematic, describing the architecture of the client plug-in aspect and service/server aspects of the system shown in FIG. 1.

6. eMail2 Client Plug-In and email2 Service Architecture (FIG. 2)

FIG. 2 illustrates the two major components of one embodiment of the eMail2 system: the eMail2 client plug-in 108 and the eMail2 service 110.

The eMail2 Client Plug-In

The eMail2 client plug-in 108 represents the client layer of the eMail2 architecture. In one embodiment, the eMail2 client plug-in 108 resides on the user's local computing device 100, as depicted in FIG. 2. In another embodiment, the plug-in 108 may reside in a separate location, such as a networked resource, that is accessible by the user's computing device 100.

The eMail2 client plug-in 108 controls all of the data exchanges between the user's computing device 100 and the eMail2 service 110. These data exchanges are preferably performed through the HTTPS protocol. The eMail2 client plug-in 108 also interacts with the user's e-mail client 101 and user storage 118.

A cryptographic engine 115 preferably exists in the eMail2 client plug-in 108. The cryptographic engine 115 is used for the encryption and decryption of messages that are stored locally. In one embodiment, the cryptographic engine 115 is the Interchangeable Cryptographic Engine (ICE), a proprietary encryption engine.

However, the eMail2 system may be implemented so that the ICE only exists on the server side, and a separate cryptographic engine is designed or implemented for the client plug-in 108/local environment.

The eMail2 Service

The eMail2 service 110 represents the server layer of the eMail2 architecture and preferably comprises two modules: the service node 116 and the server admin node 117.

The service node 116 may handle service processes such as user activation/deactivation, incoming and outgoing eMail2 message management (including encryption and decryption), and transaction tracking. This node also processes the sending and updating of access messages and message metadata tracking (including message ratings, virus status results, etc.). Preferably, the service node 116 communicates with the eMail2 client plug-in 108 through HTTPS.

The server admin node 117 may be used to configure, maintain and monitor operations performed by the eMail2 service 110. These administrative functions may be made available through secured, direct server access, or through the use of eMail2 application programming interfaces.

The server admin node 117 may also be responsible for user account configuration. For example, this node may provide users with various options or services such as eMail2 plug-in downloads, user account management (including changing configuration options for message threading, storing and archiving, etc.), and server summary reporting. These features can be made available via a web based interface 130 to users, or through a web services API to third party applications.

The hardware configuration of an eMail2 service 110 supports multiple physical servers. In one embodiment, HTTP or HTTPS communication to the eMail2 service 110 uses an "access violation" detection method. Thus, eMail2 service 110 commands in this embodiment may only be issued through an eMail2 plug-in 108. In addition, data such as transaction tracking and message ratings may be displayed in a browser on the client side but may only be retrieved by an eMail2 client plug-in 108. In other embodiments, commands may be issued through a secure web client interface 127.

The eMail2 Data Layer 120

A third layer of the eMail2 architecture is the data layer 120. The data layer 120 stores eMail2 data such as the following: Message ID, eMail2 user key, eMail2 client plug-in global unique ID, message options, message status, date of initialization. The eMail2 data layer 120 is flexible, and can store more or less information depending on what is required of it. Although the data layer 120 is depicted in FIG. 2 as sitting within the eMail2 service block, this layer may reside on a completely different server. In addition, like an eMail2 service 110, the eMail2 data layer 120 may be split among many physical servers.

Figure 3:
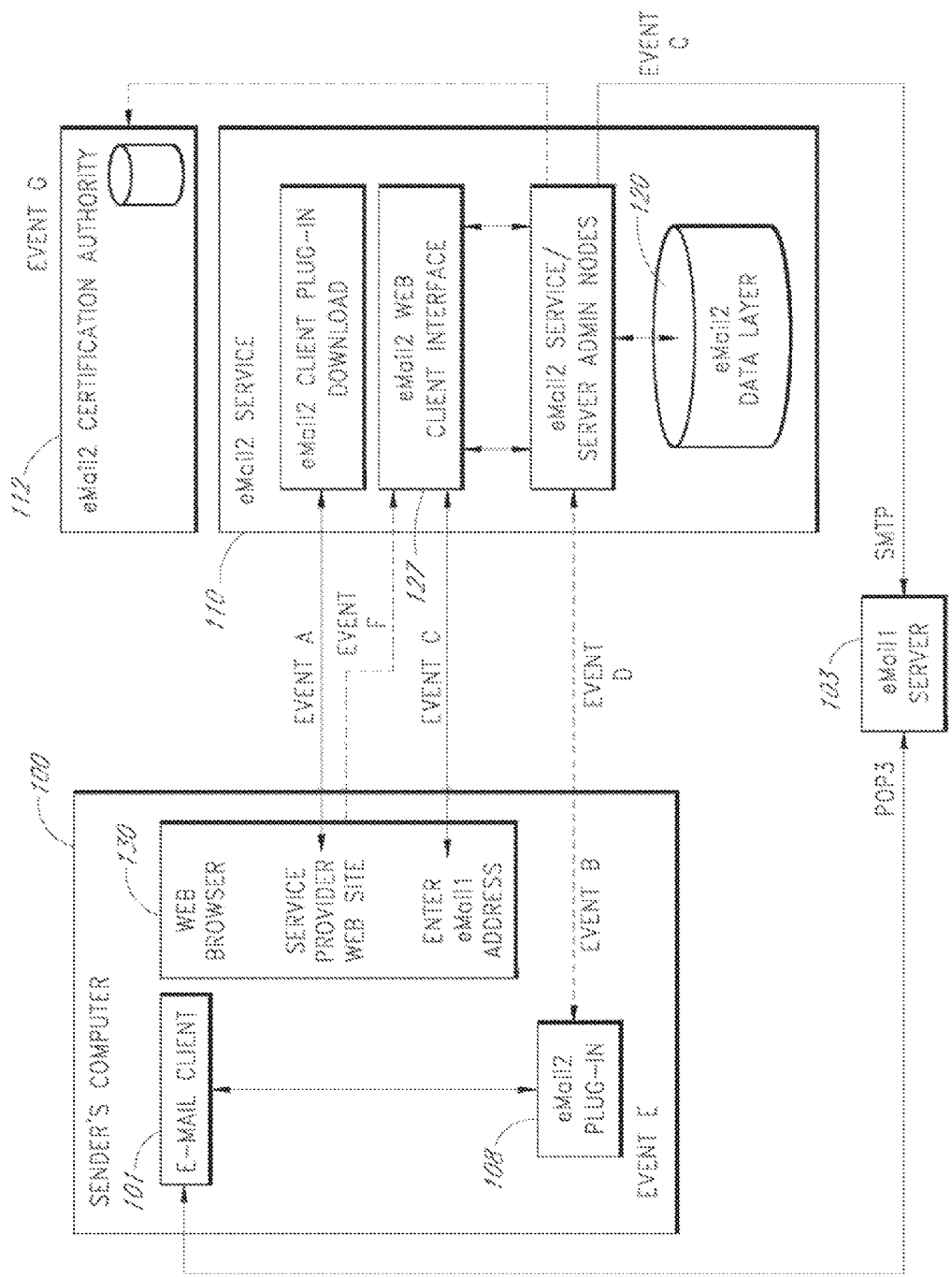
FIG. 3 describes the processes of registration and activation in relation to the major components of the system described in FIG. 1 and FIG. 2.
Figure 4:
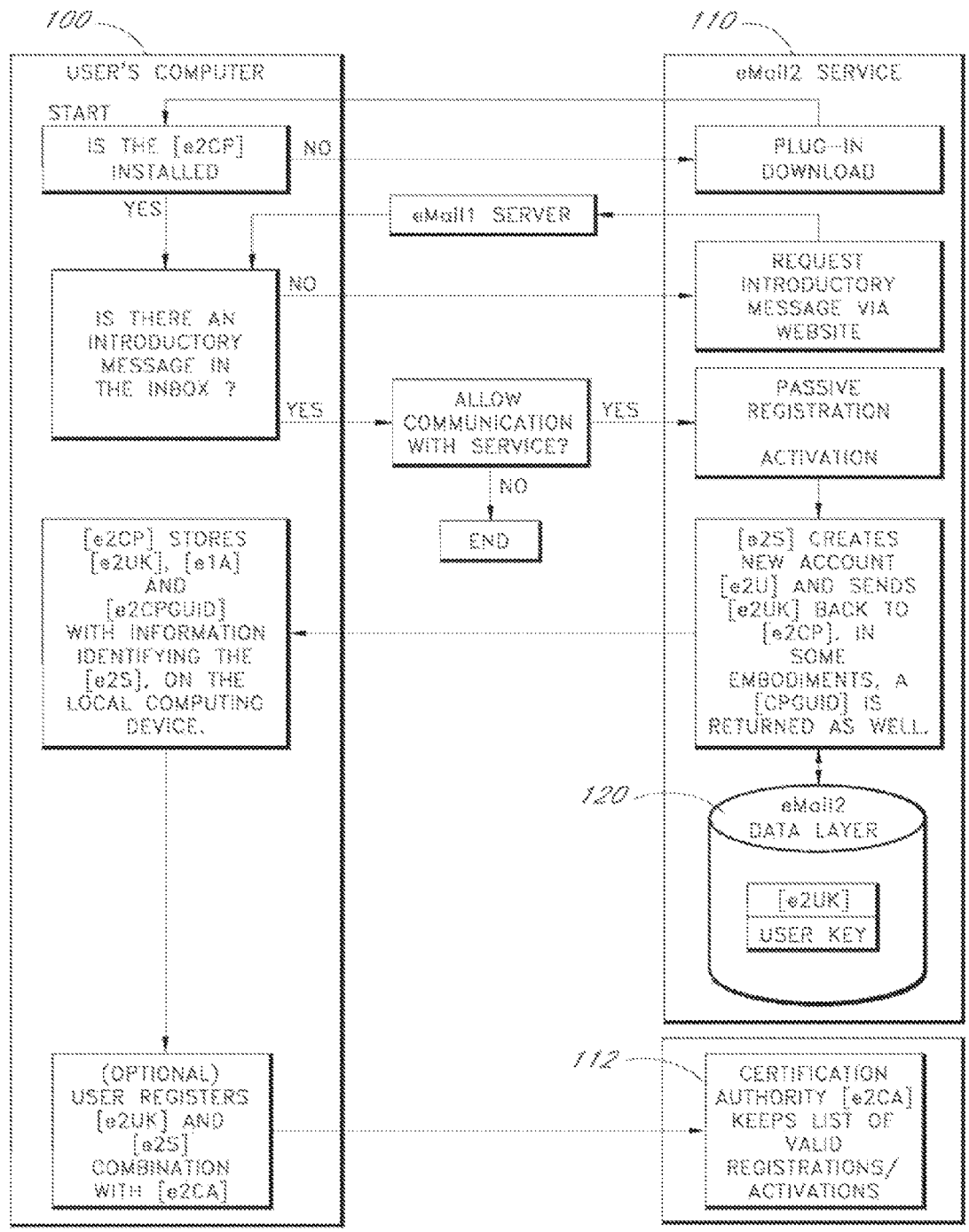
FIG. 4 is a workflow, detailing the processes of registration and activation.

7. eMail2 Account Registration and Activation (FIGS. 3 and 4)

FIG. 3 illustrates the components involved in the eMail2 registration/activation process according to one embodiment. FIG. 4 illustrates a typical workflow for this process. The numbers below correspond to the reference numerals in FIG. 3. Events A through G describe the typical process for registration and activation.

"Activation" refers only to the creation of a relationship between a specific client plug-in (identified by the CPGUID), an eMail2 service 110 (identified by the service GUID or SGUID) and an e-mail1 address. This relationship is created automatically when an eMail2 client plug-in 108 encounters a new service 110. A user may have multiple activations from multiple locations under one e-mail address, (e.g., a user may be activated with one service 110 from both home and the office). An activation is essentially a registration that is specific to a given computer.

"Registration" refers to the process of supplying user information to the eMail2 service 110. While a user can have multiple activations for a single service 110 and e-mail1 address, a user can only have one registration per eMail2 service 110 and e-mail1 address. For the purposes of an eMail2 service 110, there are two types of registration, 'active' and 'passive.'

"Passive registration" is called such because it requires no action on the part of a user. When a user receives a new activation from Service A, an eMail2 user account is created on the service for that user. This eMail2 user account is identified by the user's e-Mail1 address and the eMail2 service 110 he or she is using. Passive registration allows a user to retrieve messages from that service and respond to them, but the user is unable to create new messages or access extra features that the service 110 may provide. From a user perspective, passive registration is completely transparent. From the perspective of an eMail2 service 110, however, it is important so that the service can interact with the user while retaining reliable auditability and trackability.

"Active registration" is essentially the completion of passive registration. During active registration, users enter personal information about themselves, possibly including, but not limited to, name, address, phone number, e-mail1 address, billing information, etc. Preferably, the user information fields are entirely configurable on a per-service basis. Depending on the security policies set up by specific services 110, active registration could be required to create new eMail2 messages, as well as access any extended features the service may offer. However, this is completely configurable on a per-service basis. Certain services 110 may require active registration before recipients are even able to retrieve messages, or at the other end of the spectrum, they may allow full use of the service 110 with only passive registration.

In the following workflow, it will be assumed that a service 110 requires active registration before allowing the creation of new messages, but users are able to retrieve messages with only passive registration.

Registering/Activating an eMail2 Account (FIG. 3)

Event A: When a user first downloads and installs the eMail2 client plug-in 108, he or she has no activations or registrations.

Event B: If the user has an introductory message in his or her inbox, the eMail2 client plug-in 108 automatically contacts the specific eMail2 service 110 and attempts to retrieve the access message. At this point, "service discovery" occurs. Service discovery occurs as follows: (i) The eMail2 plug-in 108 recognizes an eMail2 introductory message in the inbox. (ii) Using the message access key in the eMail2 introductory message, the eMail2 client plug-in 108 determines whether or not it has previously interacted with the service 110 that sent the message. (iii) If the plug-in 108 has not communicated with the service 110 before, the user may be given the option to allow or block communication with the specific service 110. If the user allows communication, he or she is able to decide whether or not to trust the service 110 as well. If the user chooses to block the communication, nothing further happens. Otherwise, the user may become passively registered with the service 110, as well as activated for a specific installation of the eMail2 client plug-in 108. (iv) In one embodiment, the client plug-in 108 contacts a certification authority to determine whether or not the service 110 is certified. This information can be displayed to the user when he or she is deciding whether to block/allow/trust the service 110. (v) If the plug-in 108 has communicated with the service 110 before, it may remember the user's choice from the first time the service 110 was discovered.

Event C: If a user does not have an existing introductory message in his or her inbox, he or she may visit the website of the eMail2 service 110 and actively register, which causes a welcome message to be sent to the user over eMail2. Because the welcome message is an eMail2 message, the new user receives an introductory message via the user's e-mail1 server 103. The user may register and activate for the given service 110 using this introductory message.

Event D: Passive registration and activation occur: Passive registration is an automatic process that is transparent to the user. When a user contacts a service 110 for any reason, the eMail2 client plug-in 108 sends the eMail2 service 110 the user's e-mail1 address. The eMail2 service (identified by the service GUID) and the e-mail1 address form what is called an eMail2 user key, which identifies an eMail2 user using a given eMail2 service 110. This passive registration is not enough to validate a user's identity, and as such, most services 110 will not allow passively registered users to use the system fully.

Activation occurs when an eMail2 service 110 receives an eMail2 user key and eMail2 client plug-in global unique identifier (CPGUID). The activation is specific to a single installation of the eMail2 client plug-in 108 (as identified by the CPGUID). If this is the first contact a user has had with an eMail2 service 110, the CPGUID may be assigned by the service 110, the service provider or the certification authority 112. Alternatively, the CPGUID may be generated at the time of the eMail2 client plug-in 108 installation. The activation, comprised of an eMail2 user key and eMail2 client plug-in GUID, is sent back to the eMail2 client plug-in 108 and stored on the user's local computer.

Event E: When an eMail2 user account is created on an eMail2 service 110 through either passive or active registration, the eMail2 user key is sent back to the eMail2 client plug-in 108. In one embodiment, the eMail2 client plug-in 108 stores the eMail2 user key locally, either in the user's computer registry, or elsewhere on the client's computer. The user's e-Mail1 address, the eMail2 service GUID and the CPGUID may also be stored with the eMail2 user key. Alternatively, this information could be stored securely on specific eMail2 services 110.

Event F: Preferably, full registration is required before the user can either create new messages or take advantage of the extended features associated with the eMail2 service 110 he or she is using. Full registration involves the following steps: (1) The user visits a secured portion of the eMail2 service's website, specific to the service 110 that the user wishes to register with. (2) The user is then prompted to enter identifying information. In preferred embodiments, this includes the e-Mail1 address that the user wishes to officially associate with the eMail2 service 110, but it can also include any other information the eMail2 service 110 wishes to collect, (e.g. Billing information). (3) For the registered electronic mail feature, the service 110 may also prompt the user to enter a password (for later retrieval of messages or tracking results from the service's website).

Event G: In some embodiments, the user can request that the eMail2 service 110 and his or her eMail2 user key be registered with the eMail2 certification authority 112 for future reference. Alternatively, the service/user key registration may occur with a different entity, created specifically for such a purpose.

A user may subscribe to multiple eMail2 services 110 using the same e-mail address. Each subscription may have its own settings and security options. Conversely, the same eMail2 service can be bound to multiple e-mail addresses of a single user. Thus, a many-to-many relationship may exist between e-mail addresses and registered eMail2 services 110, all using a single eMail2 client plug-in 108. For each subscription to an eMail2 service 110, a new eMail2 unique user key is generated (through the activation process) and registered by the user's eMail2 client plug-in 108.

In one embodiment, if the user changes computer devices, the new installation of the eMail2 client plug-in must be activated again. This activation can be performed by re-opening, on the new computing device, the initial introductory message (containing the activation code) received via e-mail1 or requesting a new activation code by registering again on the eMail2 service provider's website. Registering more than once with the same eMail2 service 110 (using the same e-mail address) preferably does not create multiple eMail2 user accounts. Therefore, all previous messages are still available under the same account.

Deactivation

A user is preferably able to "deactivate" a specific installation of the eMail2 client plug-in 108. In one embodiment, "deactivation" is performed through a secure section of the eMail2 service 110's website. If a plug-in is "deactivated" it can no longer perform any eMail2 operations with respect to the affected e-mail address/eMail2 service 110 combination. Thus, if the user's computer is stolen, the user can change the password of his or her e-mail account and deactivate the eMail2 plug-in installed on that computer (for each service).

Sample Steps to Deactivate Through an eMail2 Service Provider

1. User visits the eMail2 service 110's web site and enters the e-mail address that should be deactivated. As described previously, an activation is comprised of a CPGUID and a user key (the user key being comprised of an e-mail1 address and an SGUID). Therefore, by providing a valid e-mail1 address to a valid service, the user is essentially providing his or her service-specific user key.

2. Upon submitting the request, an e-mail1 message may be sent back to the user with a link to his or her account statement. The account statement may have the following fields: TABLE-US-00001 Associated Last Used Last Used CPGUID E-mail1 Address Statement (date/time) (IP Address)

3. From the account statement webpage, the user is given the option to deactivate any of the CPGUIDs that are associated with the eMail2 account. Because a CPGUID is tied to a specific installation of an e-mail client (FIG. 1, 101), a user may be able to remotely prevent a specific computer, e.g. a stolen laptop, from accessing his or her eMail2 account.

4. If deactivated, the user cannot retrieve eMail2 messages with the eMail2 client plug-in 108 for this specific account.

5. If the user chooses to reactivate a CPGUID, the process is similar to the new registration process. A new user key is generated using the e-mail1 address and eMail2 service GUID.

6. Optionally, any or all of these steps may be protected with the implementation of a password system.

Figure 5:
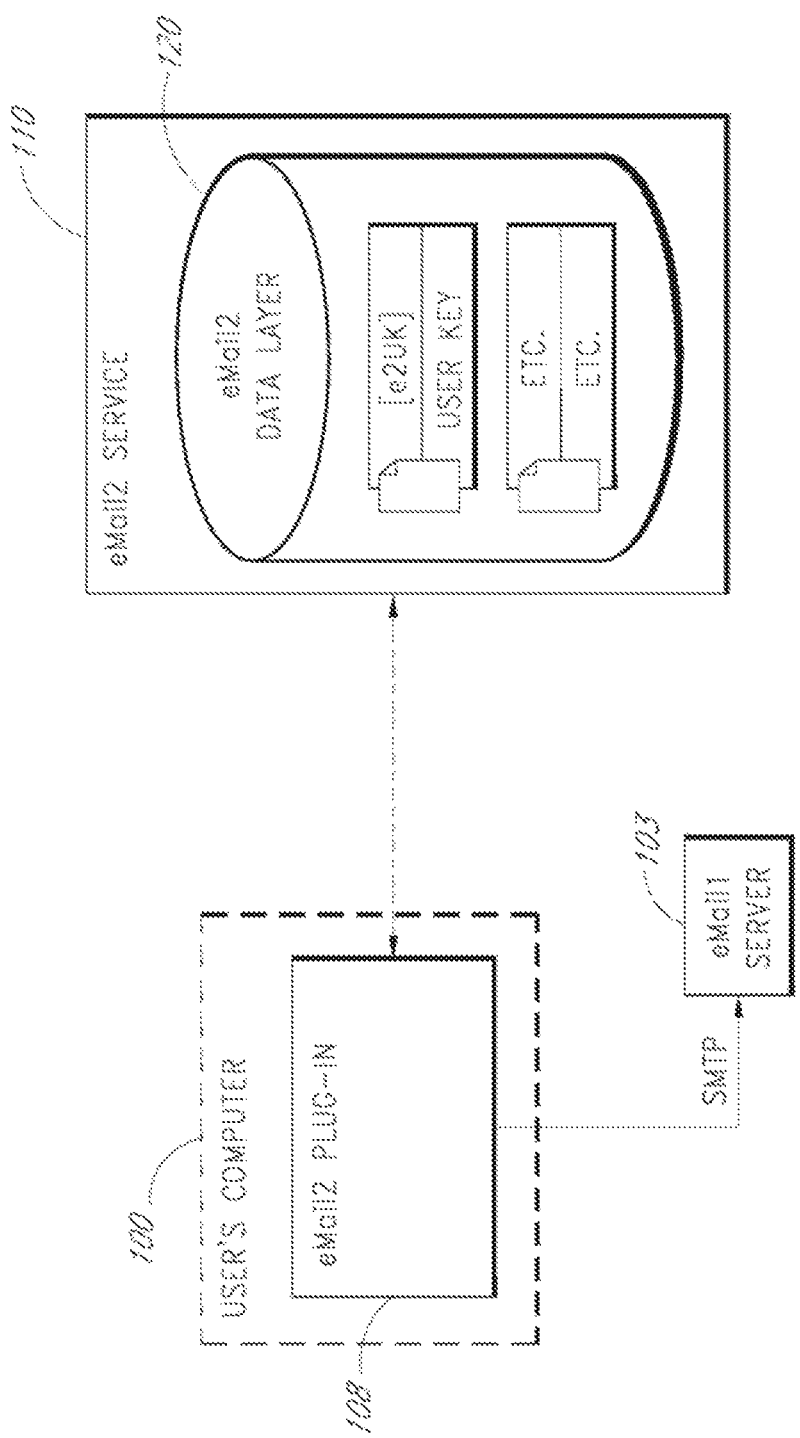
FIG. 5 describes, at a high level, how messages are created and sent using the system described in FIG. 1 and FIG. 2.
Figure 6:
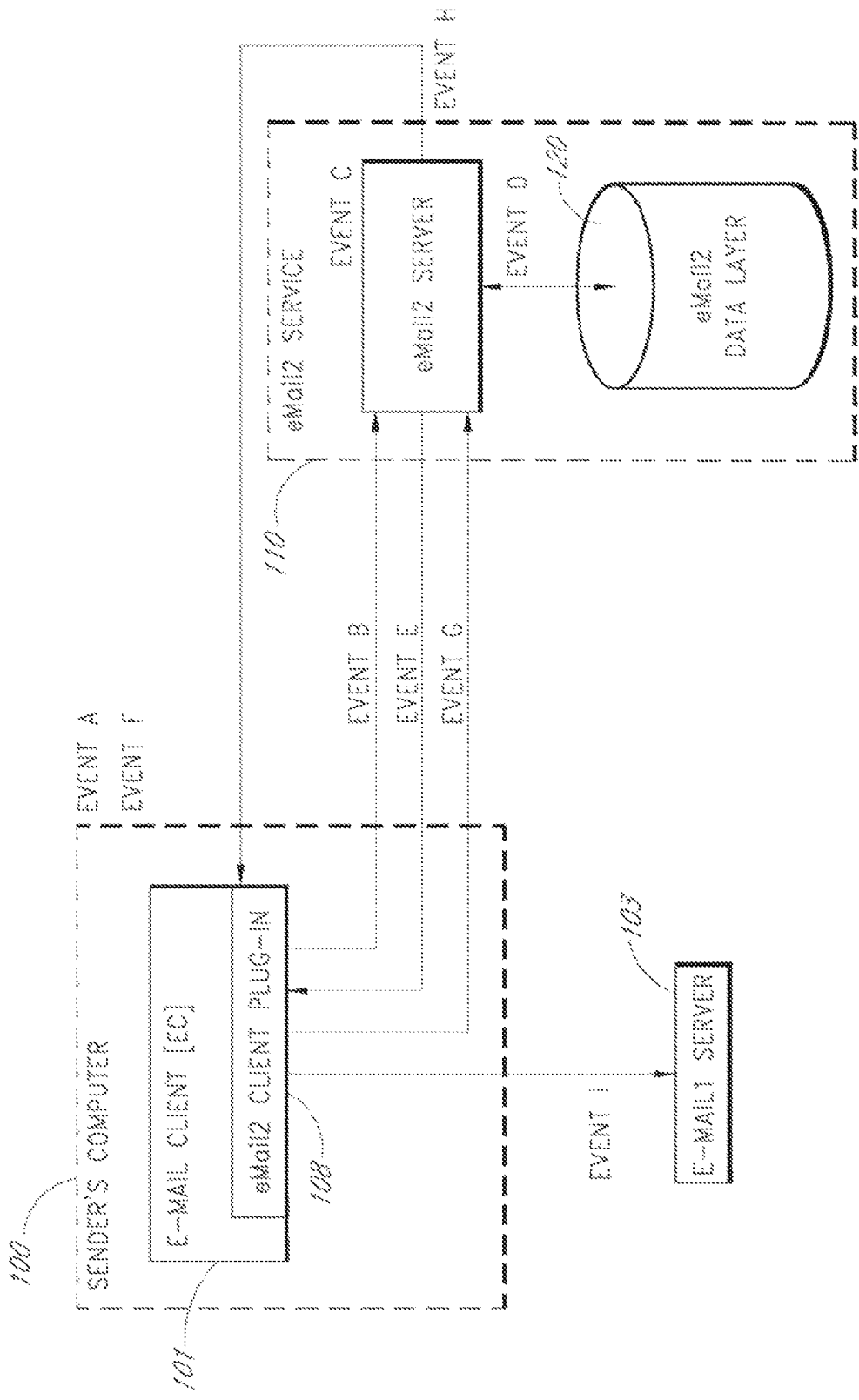
FIG. 6 is a detailed workflow, describing how messages are created and sent using the system described in FIG. 1 and FIG. 2.

8. eMail2 Message Creation and Sending (FIGS. 5 and 6)

FIG. 5 illustrates the typical components involved in the eMail2 message creation and sending process. FIG. 6 illustrates a typical workflow for this process. The numbers below correspond to the reference numerals in FIGS. 5 and 6. The events A through I correspond to those in FIG. 6 and indicate the order in which the described events occur for one preferred embodiment.

From the user's perspective, creating an eMail2 message is preferably similar to creating a traditional e-mail message with the user's e-mail client 101. However, as discussed later, eMail2 messages expose additional features to the user such as message ratings, tracking, etc. Users can also create private messages (with attachments) to specific recipients within an eMail2 message (described further infra).

Beyond the user level, however, the process for creating and sending an eMail2 message is very different than that of an e-mail 1. FIG. 5 and FIG. 6 display the process for one embodiment in detail.

Sending an eMail2 Message (FIG. 6)

Figure 7:
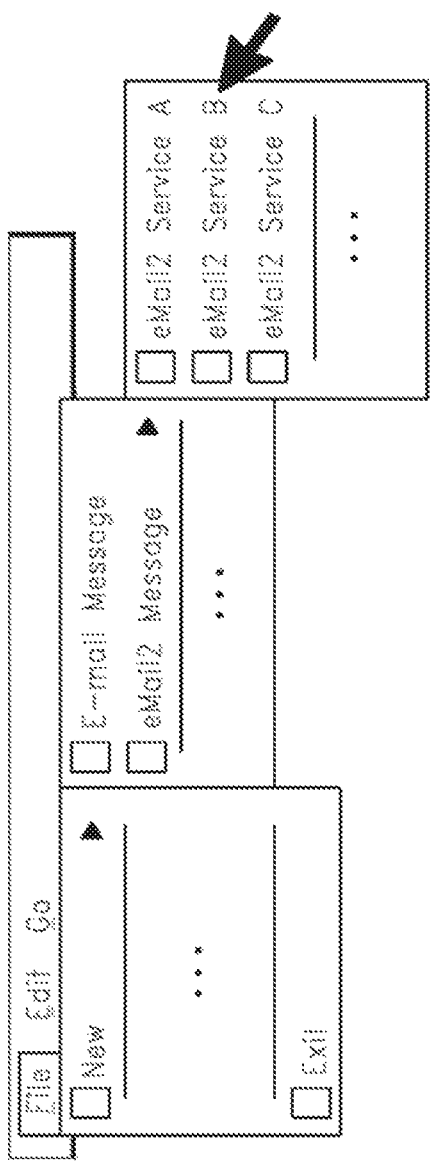
FIG. 7 is a representation of a graphical user interface in a standard e-mail client. It shows the extra menus, created and integrated into the existing menu system by the plug-in described in FIG. 1 and FIG. 2.

Event A: In one embodiment, the sender first selects an e-mail address and a corresponding eMail2 service 110 from the list of services 110 he or she has previously registered with. Alternatively, if the user only has one e-mail address, he or she may only select an eMail2 service 110. This selection may be performed through the e-mail client user interface (see FIG. 7) or through an eMail2 specific toolbar (See FIG. 27C, 906).

The sender then selects an option to create a new e-mail message. If the new e-mail message is a regular e-Mail1 message, it is composed and sent in the usual manner, with no interaction from the eMail2 client plug-in 108. If the new e-mail message is an eMail2 message, the rest of this workflow executes.

Event B: The eMail2 client plug-in 108 sends a request to the eMail2 service 110, asking for permission to compose and send a new eMail2 message using the specified eMail2 service 110. The request may include, but is not limited to, the following: (1) The eMail2 client plug-in global unique ID (e2CPGUID), (2) The eMail2 user key (e2UK).

Event C: Once the eMail2 service 110 receives and analyzes this information, it determines whether or not the user is authorized to compose and send messages using the specified eMail2 service 110. In the preferred embodiment, this is done by checking that:

The e-mail1 address is at least passively registered (for some services, the e-mail1 address may have to be actively registered) and the plug-in is activated with the service 110. The eMail2 user key is valid for the e-mail1 address being supplied. The eMail2 CPGUID is valid for the e-mail1 address. If the user is not authorized, the workflow ends and he or she is unable to send an eMail2 message. Otherwise, the workflow will continue as indicated below.

Event D: The eMail2 service 110 creates an empty entry in the eMail2 service's 110 data layer 120. This process is called the "message initialization" and potentially holds the following information:eMail2 user key (e2UK); eMail2 client plug-in global unique ID (e2CPGUID); Parent Message ID (for tracking replies); Forward ID (for tracking forwards); Message Options; Status (at this point, 'initialized'); Date and time of the message initialization. This database entry is identified by a Message ID.

Event E: The Message ID is sent from the eMail2 service 110 back to the eMail2 client plug-in 108.

Event F: Events B through E preferably occur in the background and are invisible to the user. At this point, the user simply continues to compose the new e-mail message, as per normal creation of an e-mail. In some embodiments, when two or more recipients are specified, the eMail2 plug-in 108 is able to dynamically supplement the e-mail composition user interface with a respective tab for each of the recipients (see FIGS. 8, 9, and 10, 154).

Addition of a recipient-specific tab 154 to the sender's user interface preferably can be accomplished by clicking a button on the eMail2 editing toolbar (See FIG. 27C), a button next to existing tabs 154 (or where tabs would be, if they existed), dragging and dropping recipients from the "To:" field 150 to the tab area 154. There may also be an option to automatically add tabs to the interface in certain instances (if, for example, there are fewer than 10 recipients). Removal of recipients from a given tab could take place, for example, by requiring a right-click on the recipient to be removed, followed by selection of the 'remove' option on the resulting context menu.

Each such tab 154 is selectable to access a respective message entry area for composing a private message to the respective recipient. An "All" tab 153 is also provided to enter a "public" message that is accessible to all of the recipients.

If the sender wishes to compose a private message to two of the recipients, the sender can drag-and-drop one tab onto another tab to create a new tab and private message area. This feature is illustrated at the bottom of FIG. 8, in which the eMail2 plug-in 108 has added the tab "Recipient A, Recipient B" in response to the user dragging and dropping the "Recipient A" tab onto the "Recipient B" tab, or vice versa 154. In this particular example of FIG. 8, the sender can compose a non-private message to all of the recipients (A, B and C), compose a private message to A+B, and compose separate private messages to each of A, B and C.

Preferably, the user can add participants to a public conversation or private message whenever they are creating, replying to or forwarding an eMail2 message. Preferably, the ability to remove users from private messages after a message has been sent is configured on a per-service basis. In some embodiments, removing users could be discouraged to promote message tracking and auditability. Creating new private conversations in a reply is possible in the preferred embodiment.

Event G: When the user selects the "send" command, the eMail2 client plug-in 108 intercepts the outgoing e-mail message. The message content is extracted from the e-mail1 message, and sent to the eMail2 service 110 across a secure TCP/IP connection. The message is considered an 'eMail2 message' at this point. The user's identifying information (eMail2 user key, e-mail1 address, eMail2 CPGUID) and the Message ID previously returned by the service 108 are preferably also sent along with the message. The eMail2 service 110 verifies that the Message ID is valid for the User Key, CPGUID and e-Mail1 address supplied, and then stores the message contents (including attachments) in an encrypted state in the data layer 120, identifying the message by its Message ID.

Event H: Once the eMail2 service 110 has received and stored the message and its attachments, it prepares an appropriate "Introductory Message" and sends the contents to the eMail2 client plug-in 108 of the sender.

Event I: The eMail2 client plug-in 108 sends the introductory message in place of the original message to each of the intended recipients. The introductory message preferably explains to the recipient that a new eMail2 message is awaiting his or her retrieval on a secure eMail2 service 110. The introductory message preferably contains a message access key that allows only the intended recipient to retrieve the actual eMail2 message. If the recipient user does not have the eMail2 client plug-in installed, the introductory message may provide details on how to download it.

In some embodiments, if the original e-mail message contains any attachments, a separate file is created when the introductory message is being composed, describing the attachment metadata (virus scan status, size, etc.). This file can be of any type (e.g. a text file, a Word doc, an image, etc.) and is attached to the introductory message when it is sent to the recipient. Because of the attached file, the recipient's e-mail client will correctly display that the message has an attachment in the e-mail client 101 interface. There may be only one attachment placeholder, containing information for all of the attached files, or there may be a separate placeholder for each attachment.

Sending the eMail2 introductory message to all intended recipients may be done via traditional e-mail1 methods (i.e. using the sender's e-mail1 server 103). The introductory message also may replace the original message in the sender's outgoing messages folder.

In some embodiments and scenarios, the eMail2 service 110 is able to send the introductory message on behalf of the user's infrastructure, through its own SMTP server. This can happen when a user's SMTP server is unavailable. This method can also be used if a user chooses to abandon traditional e-mail (SMTP/POP3/IMAP) altogether.

It should be recognized that the message initialization described in Event D may occur at a different point in the process flow. For instance, the system may be implemented with message initialization occurring on a send command, or during any other event that can be recognized by the eMail2 client plug-in.

Figure 14:
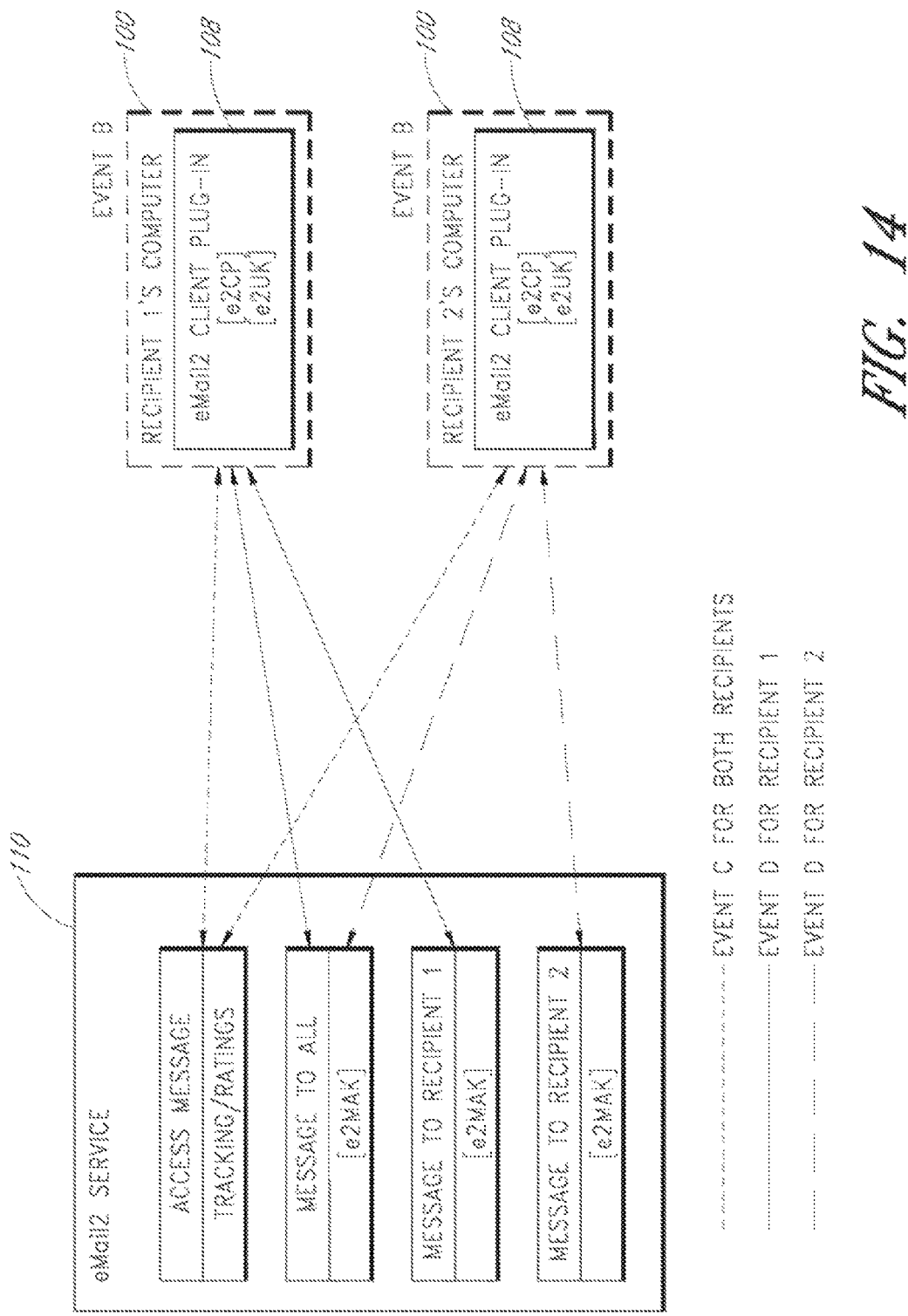
FIG. 14 describes the general process for retrieving messages, including how access permissions are handled.
Figure 15:
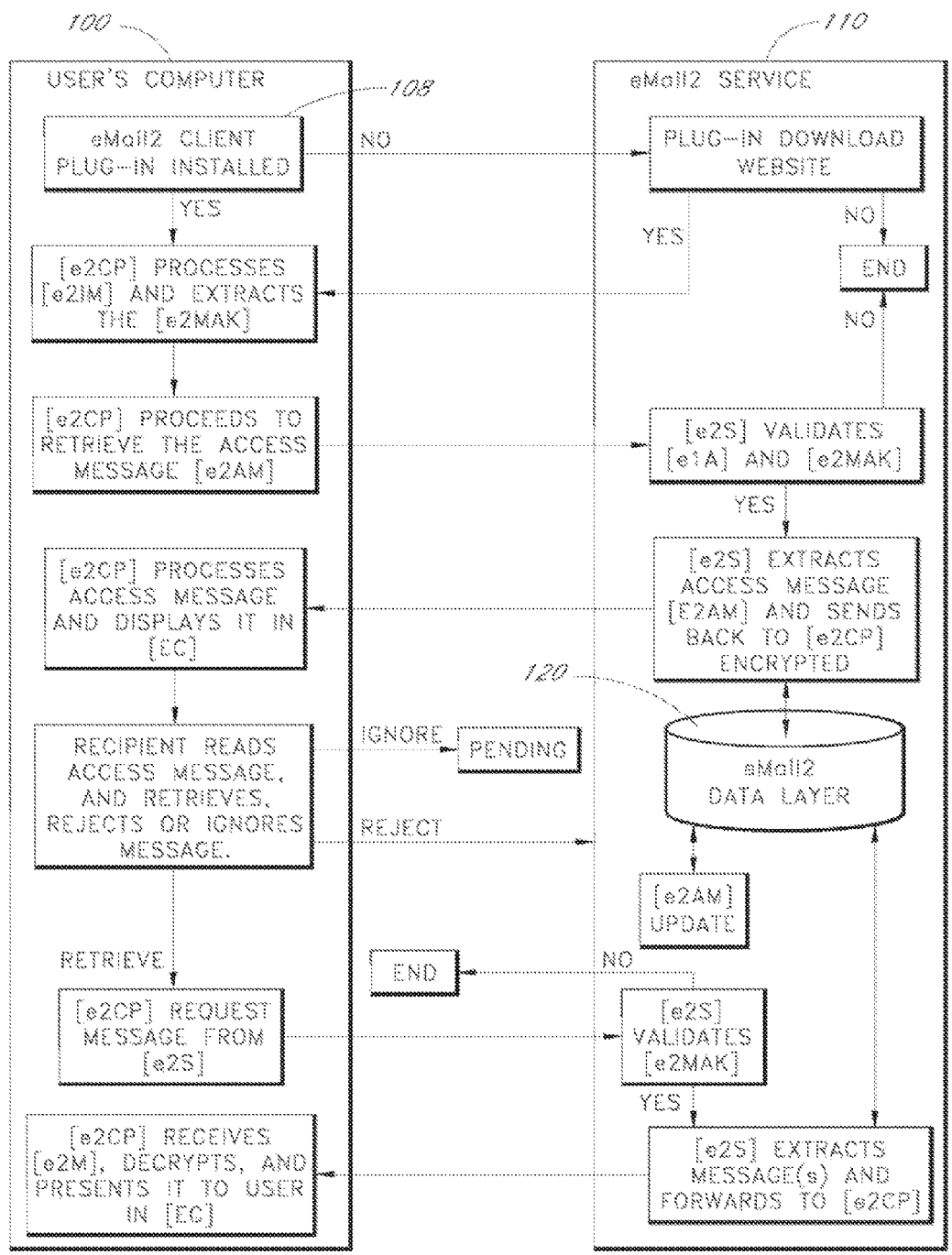
FIG. 15 is a detailed workflow, describing how a client plug-in (described in FIG. 1 and FIG. 2) retrieves messages from an external service.

9. eMail2 Message Revival (FIGS. 14 and 15)

FIG. 14 illustrates the components involved in a preferred embodiment of the eMail2 message retrieval process. FIG. 15 illustrates a typical workflow for this process. The numbers below correspond to the reference numerals in FIG. 14. Events A through D correspond to the events in FIG. 14 and indicate the order in which the described events occur.

Retrieving an eMail2 Message

If the recipient does not have the eMail2 client plug-in 108 installed, the introductory message remains in the recipient's inbox and can be viewed/read by the recipient. In one embodiment, the introductory message invites the recipient to download the eMail2 plug-in 108 from the service 110's website (see FIG. 13). If the recipient does not download and install the eMail2 plug-in (FIG. 1, 108) in the preferred embodiment, the recipient cannot retrieve the eMail2 message, unless use of the web client interface 127 is allowed by the service 110. If the service 110 allows use of the web client interface 127, users are able to use it to retrieve (and perform any other actions with) the eMail2 message. The recipient may still reply to the introductory message via e-mail1 if it was sent through e-mail1.

Event A: After the recipient has installed the eMail2 client plug-in 108, the plug-in automatically intercepts the introductory message and sends the recipient's e-mail address and the embedded unique message key to the eMail2 service 110 for authentication. In most embodiments, the recipients are not required to be actively registered with any eMail2 service 110 in order to retrieve eMail2 messages. If the user chooses to allow communication with a service 110 when the "service discovery" dialog is displayed, passive registration and activation occur automatically (described elsewhere).

Figure 18:
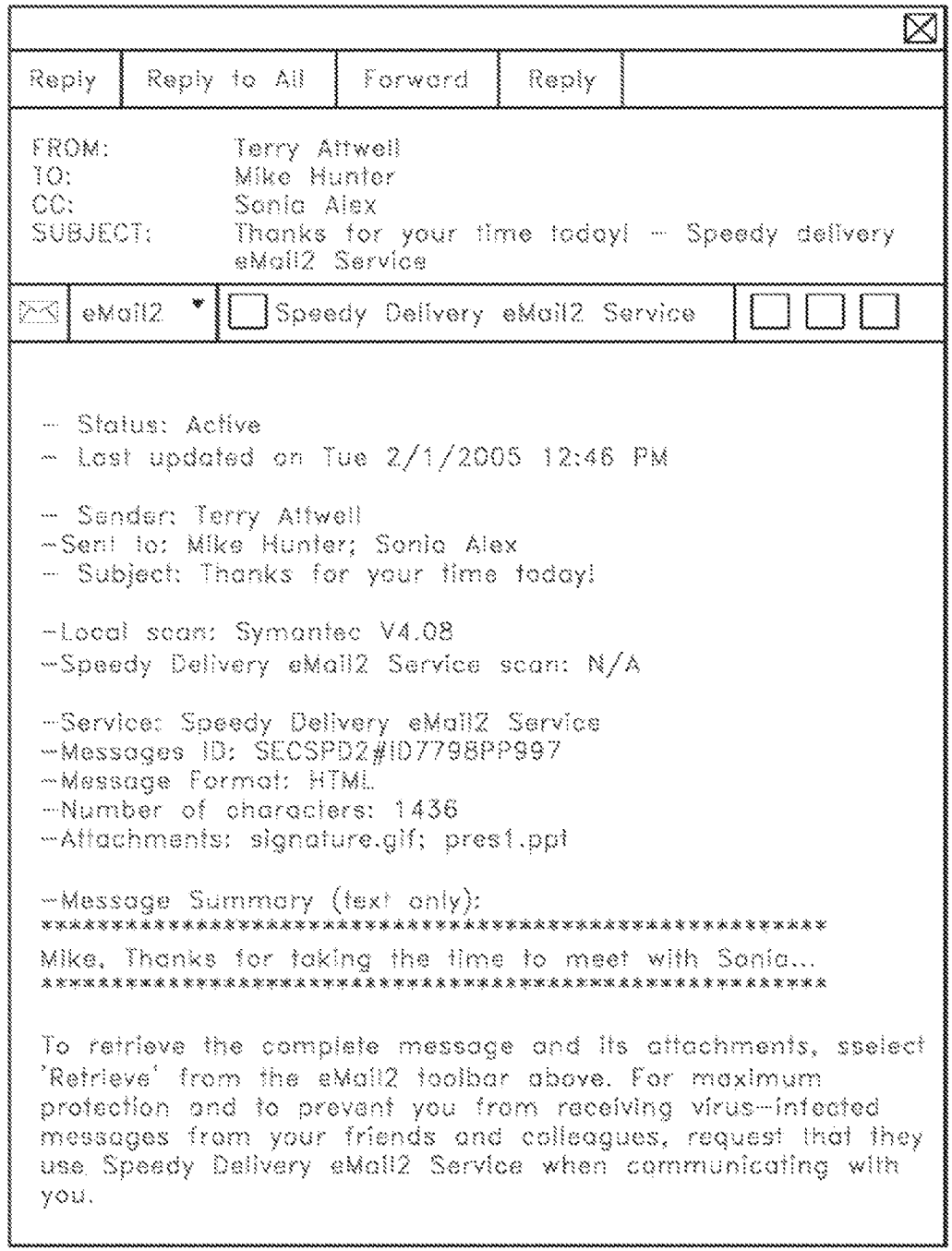
FIG. 18 is an example of an eMail2 Access Message viewed through the reading window in Microsoft Outlook.

Event B: If the authentication is successful, the eMail2 service 110 creates an access message for the recipient and transmits this access message via HTTPS to the recipient's eMail2 plug-in 108. The plug-in automatically replaces the introductory message with the access message in the user's inbox. The access message may contain information about the eMail2 message such as a text-only summary, scanning process results, recipient names, etc. (See FIG. 18). To generate some or all of this message information or "metadata," the eMail2 service 110 may generate a temporary, decrypted copy of the eMail2 message; alternatively, the eMail2 client plug-in 108 of the sender may generate the message metadata before encrypting the message, and may send the metadata to the service 110 with the message and the message initialization information.

In one embodiment, a separate access message is generated for each public and private part of an eMail2 message.

Alternatively, a single access message may be generated for both the public and private parts of an eMail2 message.

Event C: The access message informs the recipient that they have a new incoming eMail2 message waiting to be retrieved (see example access message in FIG. 18). With the access message, the recipient may retrieve, reject or ignore the public and/or private parts of the eMail2 message. The access message also acts as a "live link" to the eMail2 message stored on the eMail2 service 110 and enables certain workflow features (described further below). For example, the recipient can obtain updated data about virus scan results, the number of other recipients that have retrieved or rejected the message, and the ratings assigned to the message by those recipients. In one embodiment, a single access message (generated from a single introductory message) controls the delivery status of all elements of an eMail2 message (public, private, attachments, etc.).

With the access message, the eMail2 user is able to access the eMail2 service 110's web client interface 127, where a web based delivery slip (FIG. 30, 806) may be accessed. The web based delivery slip functions in much the same way as the access message, but it also enables web based message retrieval through an eMail2 service's (FIG. 1, 110) secure web services.

The recipient may configure the eMail2 plug-in 108 so that eMail2 messages are automatically retrieved when an access message is received. Alternatively, the eMail2 plug-in 108 may automatically retrieve those messages that it determines to be "safe" (for example, a text-only message from a trusted sender). Recipients may also use a "Retrieve All" command to retrieve all of the messages (public and private) within an eMail2 message with a single action.

If the eMail2 message is encrypted, the recipient's eMail2 plug-in 108 may also retrieve the message decryption key from its local storage, or in some embodiments, from the eMail2 service 110. The recipient's eMail2 client plug-in 108 automatically decrypts the message using this decryption key.

Event D: Since eMail2 message attachments are stored on the eMail2 service 110 and retrieved over HTTP by the recipients on demand, attachments need not have any size restrictions (as frequently encountered with traditional e-mail1 (SMTP/POP3) protocols). The eMail2 plug-in 108 can also work in conjunction with download manager clients to save large attachments directly on the computer storage (disk) instead of storing it in the mailbox file.

Once a recipient has retrieved a message, the same workflow features described above apply. For example, the recipient may view virus scanning results, view the number of other users that have retrieved the message, rate the message, etc. As recipients perform any of these actions, they are tracked by the eMail2 service 110. In the preferred embodiment, the eMail2 client plug-in 108 monitors these operations and sends status updates to the eMail2 service 110 via HTTPS.

Attachment Retrieval

Because the attachments are preferably retrieved over HTTP or HTTPS, and because the system may operate in conjunction with a download manager, attachments can be downloaded from multiple streams at once, greatly improving download speeds. This process is similar to the way that existing download accelerators and managers speed up transfer speeds.

If the attachments are being downloaded from the web client interface 127, conventional download managers may be configured to work with the eMail2 system. If the attachments are being downloaded from the e-mail client 101, with the aid of the eMail2 client plug-in 108, a proprietary download manager may be integrated directly into the eMail2 client plug-in 108.

Bundled Reader (Attached Executable Code)

In some embodiments of the system, a user may not need to access the web client interface 127, download a client plug-in 108, or have the plug-in 108 installed in order to retrieve the message. Message reading functionality can be offered by means of a bundled reader, a reading applet or script attached to the introductory message. The attached applet or script can be initialized and used to display retrieved message data from the service 110, independent of plug-ins 108 or web client interfaces 127.

Because messages are stored encrypted on the service 110, and because the message access key in the introductory message only gives the location of a rightfully owned e-mail message, service-wide security will not be compromised.

The attached applet or script can be written in Java, or any other programming or scripting language available.

10. eMail2 Message Storage

Server-Side Storage eMail2 messages (which include the header, subject, message body and attachments) are preferably stored in the eMail2 data layer (FIG. 1, 120) and may be encrypted using a pair of encryption keys: the 256-bit eMail2 user key and a 128-bit random number (unique to a particular eMail2 service). If the eMail2 message contains multiple public and private parts, each public or private sub-message may be encrypted and stored separately. Alternatively, the messages may be encrypted by one, or neither of these encryption keys.

The eMail2 Interchangeable Cryptographic Engine (ICE) (FIG. 26, 123), described further below, may be implemented on the server side or client side for the secure storage of messages.

An eMail2 message is preferably decrypted only if: (1) a recipient retrieves the message; (2) the eMail2 service 110 performs security scanning checks on the message content; or (3) an authorized third-party needs to retrieve the message.

Client-Side Storage

The eMail2 plug-in 108 may store each eMail2 message, reply, and forward as separate entities encrypted in a special folder. This folder may reside on the user's local computer storage (FIG. 2, 118) or an alternative location such as networked storage. Encryption may optionally be performed by the ICE (FIG. 26, 123) if it is implemented on a client side level. In one embodiment, each stored message includes the following information: [0368] 1. Unique eMail2 Message ID [0369] 2. Parent Message ID—used to link messages within the same thread together. This value is NULL if the message is a new message. [0370] 3. Sender's e-mail address [0371] 4. Public message ID [0372] 5. Private message ID(s) [0373] 6. Public attachment reference(s) [0374] 7. Private attachment reference(s)

In other embodiments, more or different information can be stored with the eMail2 message.

Options regarding sent items in the sender's inbox are configurable by the service 110. In the preferred embodiment, with respect to "sent" messages, only the introductory message (containing the message key) is stored on the POP3 e-mail1 server. Sent messages can appear as regular messages in the sender's mail storage. When the sender re-opens a sent message, the eMail2 plug-in 108 automatically fetches the actual message content and metadata from the eMail2 service 110 and/or from the local client storage (FIG. 2, 118). This content, and all of the replies, are displayed to the sender. However, a service 110 may not allow senders to retrieve sent messages from the introductory messages in the inbox.

11. Interchangeable Cryptographic Engine (ICE)

The ICE (FIG. 26, 123) is an instance of a Cryptographic Engine (FIG. 1, 115). The ICE is a tool that allows developers, services or cryptologists to design and/or implement new cryptographic methods for use with eMail2. Such cryptographic methods are preferably stored and accessed as eMail2 communication plug-ins (FIG. 26, 124) or "e2COMs". The ICE 123 preferably includes a default cryptographic method (e2COM 124) that is a robust security solution for the storage of eMail2 messages. Depending on the preferences of the users and administrators, multiple other cryptographic methods (e2COMs 124) may be implemented. These methods include, but are not limited to, AES, DES, DSA, SHA1, MAC TripleDES, MD5, RC2, Rijndael, RSA, SHA256, SHA384, SHA512, etc. New cryptographic methods are implemented in the form of eMail2 communication plug-ins 124.

e2COM Validation and Distribution

In some embodiments, services, service providers, users or administrators may design and implement their own cryptographic methods (each as an e2COM 124). To register the new e2COM 124 for use with eMail2, the cryptographic method is preferably validated by an authority. In one embodiment, this authority is the same as the eMail2 certification authority (FIG. 1, 112). In other embodiments, it may be an entirely different entity. To register an encryption method with the ICE (FIG. 26, 123), the e2COM 124 containing the cryptographic method is preferably submitted to a validation authority (such as the eMail2 certification authority (FIG. 1, 112)), which validates, electronically signs and returns the file. Submission may occur by any method of information interchange, including http or ftp transfer.

Figure 41:
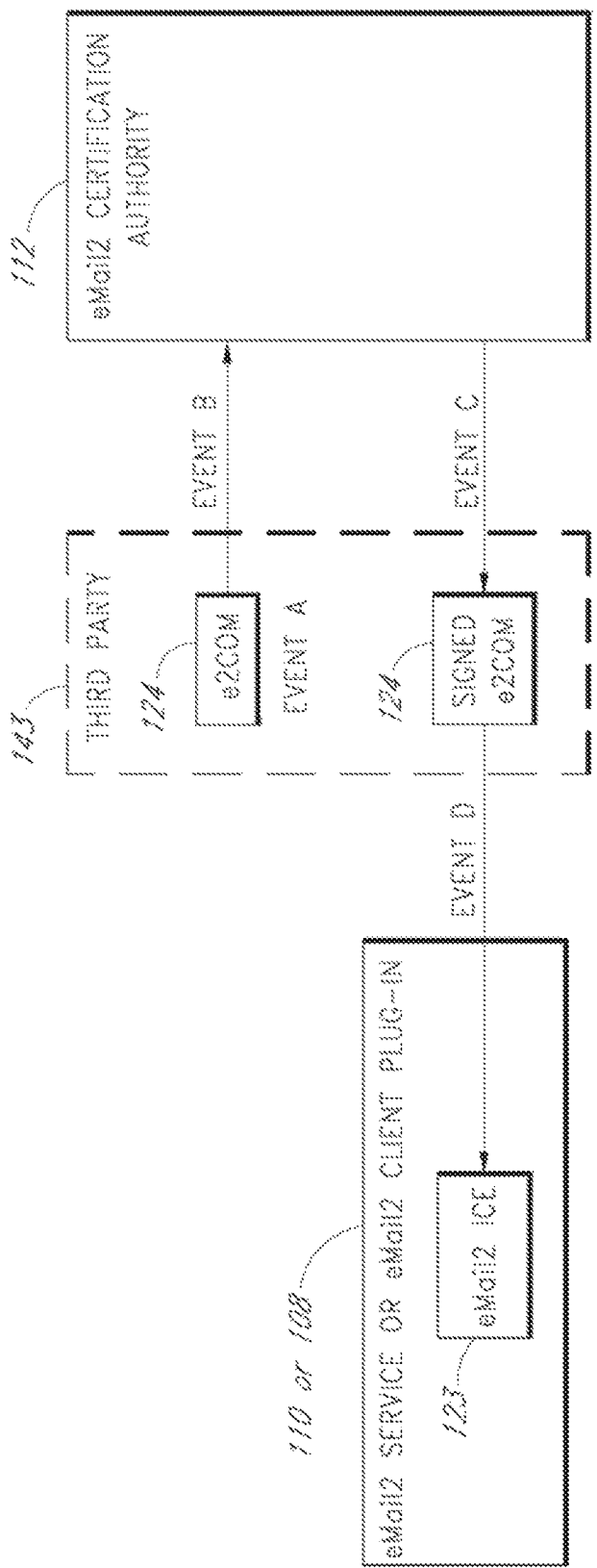
FIG. 41 displays the process for validating an e2COM with the eMail2 certification authority and subsequently registering the e2COM with the eMail2 ICE.

Once the new cryptographic method has been validated and signed, it can be submitted to the ICE (FIG. 26, 123) as an e2COM 124, where it becomes registered and available for use as a cryptographic method. FIG. 41 provides a sample workflow:

Event A: A third party (FIG. 41, 143) has developed a new encryption method. In order to enable use of this method in conjunction with eMail2, the third party 143 must submit the encryption method to the eMail2 certification authority 112. For new encryption methods to be used as eMail2 ICE 123 encryption methods, they must be formatted as eMail2 communication plug-ins or e2COMs 124. Once a developer has released the encryption method as an e2COM 124, he or she may initiate a validation process by submitting the e2COM 124 to the eMail2 certification authority 112.

Event B: Submission may be initiated by uploading the e2COM 124 using a web based upload interface on a secure website associated with the eMail2 certification authority 112. The submission process may also be initiated by an FTP transfer, submission of a live link to the e2COM 124, submission via an eMail2 attachment, or any other method commonly associated with transferring files across a network.

Event C: Once the eMail2 certification authority 112 has received a submitted e2COM 124, it verifies that the e2COM is safe, virus free and generally ensures that the e2COM 124 is what it has been reported to be. This can be part of an automated process, or part of a manual review. After this, the eMail2 certification authority 112 digitally signs the specific version of the e2COM 124 and returns it to the third party 143. The digital signature is only valid for the unmodified, returned version of the e2COM 124. Modifications will cause the signature to become detectably invalid through known cryptographic techniques.

Return of the e2COM 124 can take place via eMail2 attachments, FTP transfer, or any other method commonly associated with transferring files across a network.

Event D: Third parties 143 may release signed e2COMs 124 on their websites, as packaged products, or bundled with certain deployments of eMail2. When an e2COM 124 is signed, it can be submitted to a local version (local to a service 110 or to a client plug-in 108) of the eMail2 ICE 123. The ICE 123 checks the signature against the certification authority 112, and if it is valid, adds the e2COM 124 to its encryption library.

Subsequent to Event D, calls made to the eMail2 ICE API (FIG. 26, 125) can reference the new e2COM (FIG. 41, 124) and call the method for valid encryption. Preferably, if a third party 143 chooses to upgrade or change the e2COM 124 in any way, it must submit to the whole validation again.

If a sender or service, perhaps utilizing complete message control, makes requirements upon the encryption methods to be used by a sender or recipient to send, retrieve, store, reply to or forward a message, and these requirements include using a particular e2COM 124 that may not be present or registered with the ICE 123 on a sender or recipient's computer 100, notification of these requirements may be transmitted to the user's eMail2 client plug-in 108 or web client interface via an introductory message or any other method of communication. The user's eMail2 client plug-in 108 or web client interface may then optionally ask the user for permission to install the e2COM and download and install the proper e2COM 124 by contacting the relevant eMail2 service 110, the certification authority 112, or any other provider of e2COMs 124.

In this way, the body of encryption methods, expressed as e2COMs 124, available to ICE 123 users is dynamically expandable: Users and eMail2 services 110 may create their own encryption methods, while the ICE and email2 systems, working in conjunction, take care of making these encryption methods available to other users and enforcing the security requirements of the service or sender.

Optionally, the functionality of sender and recipients ICEs, including acceptable or unacceptable e2COMs, may be controlled by the eMail2 service 110. Within the constraints set by the service, eMail2 senders may, using total message control as described below, control the functionality of the service and recipients' ICEs insofar as it pertains to the sender's message or conversation. Within the limits set by the service and sender, recipients may control the functionality of their ICE. This allows for, for example, an organization to define the minimal and maximal levels of security for all eMail2 messages originating from or traversing their organization.

Thus, a single organization may create multiple Private E-mail Networks (PENs) by creating multiple eMail2 services, each with different security settings. A user may thereafter choose the level of security of a message they wish to send by selecting the appropriate service.

For instance, a law firm may set up one secure email service for communicating with clients, and another for communicating with service providers. Each such service may be configured to use a particular e2COM/encryption method, such that one service provides stronger encryption than the other. Other configuration options may be separately specified for each service as well.

ICE Message Encryption and Decryption Workflow

The general workflow for the preferred embodiment of ICE 123 is described below. The reference numerals refer to those numerals in FIG. 26. The events A through D refer to those events in FIG. 26 and describe the order in which the events occur.

Event A: The eMail2 client plug-in 108 (or eMail2 service 110) sends data to the ICE 123 to be encrypted, with instructions for encryption using a specific encryption method.

Event B: Inside the ICE 123, the list of available methods is stored in a database 126, and if the desired method exists, the ICE application programming interface 125 makes a call to the appropriate eMail2 communication plug-in 124.

Event C: Using the appropriate eMail2 communication plug-in 124, the ICE 123 encrypts the specified data with the specified method.

Event D: The encrypted data is returned to the eMail2 client plug-in 108 (or the eMail2 service 110).

An important feature of the ICE 123 is that it is not itself an encryption solution for e-mail message storage. The ICE 123 uses a plug-in format in order to allow users or administrators the flexibility to implement customized security solutions created by third parties in tandem with the eMail2 system.

In some embodiments, the eMail2 ICE may be modified, repackaged and resold by individual security providers, using their proprietary security solutions as the default eMail2 communication plug-in 124.

Seed

Preferably, embodiments include support for a custom cryptographic "seed" to begin the encryption algorithm through the ICE 123 interface, further increasing the security levels possible with the ICE 123. A seed is a numerical value that begins the mathematical encryption algorithm executed by a computer. Even slightly different seeds can produce wildly different encryption results, and without the seed, decryption is virtually impossible. A human-defined seed, not chosen according to any logical rules, further strengthens encryption systems. For an unauthorized person to gain access to the encrypted data, he or she would not only have to break the encryption, he or she would also have to know the specific seed that began the encryption algorithm.

12. eMail2 Message Security and Encryption eMail2 messages are preferably stored in the data layer (FIG. 1, 120) with at least the following fields: TABLE-US-00002 Message ID To CC BCC From Data 25664 terry@sys-derek@sys-<encrypted national.com national.com message>

Preferably, the body of the message is stored as an encrypted XML file. Included in this encrypted file is the message header information, containing header elements such as recipients "To," "CC," "BCC," "From," "Subject," etc., and their corresponding values. The message header information is also stored in individual "open" (unencrypted) fields (shown above).

When the encrypted XML file from the "Data" field is extracted and decrypted through the eMail2 administration system, notification is sent to the user that someone has accessed that specific message.

Typically, it is not necessary for administrative staff to access and decrypt messages, but in extenuating circumstances, it may be unavoidable. This system is designed so that users are aware of these third party decryptions as they happen.

Verifying Header Validity

If it becomes necessary to validate the header content at any point, this can be done by comparing the header data stored in the encrypted XML file to the "open" fields in the messages table.

Because the "open" header fields in the messages table are generated from the same data as the header information in the encrypted XML file, they should be the same. If they are not, that is an indication that someone has tampered with the header information stored in the database.

Because there is a copy of the header information stored in encrypted form in the "Data" field, it is impossible for anyone to alter the header data stored in the "open" fields without detection.

Encrypted Data Integrity

In some embodiments, data is transferred from the user to the service across a secure SSL "pipeline" (using the HTTPS protocol). Preferably, as soon as the data reaches the service (FIG. 1, 110), the body and header content is encrypted using the eMail2 service's encryption system and specific algorithm "seed." The data is stored encrypted as long as is needed. During this time, it is inaccessible to unauthorized users.

The only way to access this encrypted data is to enter the database directly, extract the encrypted database entry and decrypt the XML file. This can be protected against by implementing standard database protection methods. These include, but are not limited to:

Physically securing the database servers

Requiring password authentication to access database records

Limiting which administrator accounts can access database records

E-mail1 Checksum Comparison

As an additional security option, services 110 may provide e-mail1 checksum comparisons. Before the message is sent to an eMail2 service 110, a message hash may be generated and stored locally by the sender's eMail2 client plug-in 108. When an e-mail1 checksum comparison is necessary or requested, another message hash is generated at the service side and sent to all recipients of the eMail2 message as an e-mail1 message. The sender's eMail2 client plug-in 108 can send the locally-stored message hash to the eMail2 message recipients via an e-mail1 message. The eMail2 message recipients can compare the checksum sent by the service to the one sent via e-mail1, and may compute their own message hash based on data received from the service 110, to verify the integrity of the eMail2 message.

Security Configurations

Figure 33:
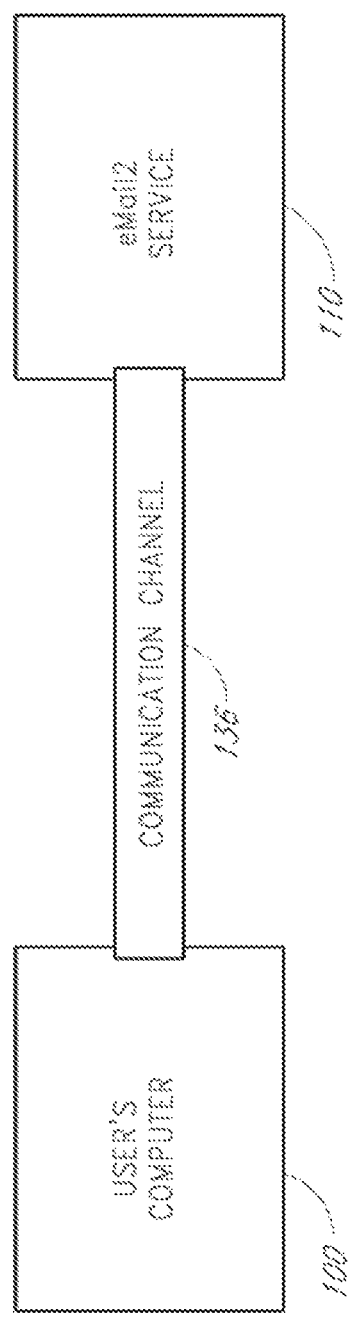
FIG. 33 is an overview of the general areas in the eMail2 system (described in FIG. 1 and FIG. 2) that can be protected by encryption or other security methods.

The eMail2 system described can be implemented with several different levels of security. These will be described now. For the purpose of this discussion, eMail2 data can exist at three different locations within the scope of the system: The client local environment (namely, the user's computer (FIG. 33, 100)), the transit channel 136 (or communications protocol), and the service environment 110.

Encryption can occur to various degrees at these three locations. The system can be implemented using encryption at any combination of these locations, including all of them and none of them. [0423] Encryption at a client side 100 level occurs via a local encryption system. [0424] Encryption during transit 136 occurs via an SSL secured communications channel, e.g. HTTPS. [0425] Encryption at a service side 110 level occurs via a service side encryption system. [0426] The encryption system at either the client side 100 or service side 110 can be the eMail2 ICE (FIG. 26, 123).

A matrix describing these security combinations can be found below, referred to as Security Scenarios A through H: TABLE-US-00003 Client Local Communications Service Environment Channel Environment A Unencrypted Unencrypted Unencrypted B ENCRYPTED Unencrypted Unencrypted C Unencrypted ENCRYPTED Unencrypted D Unencrypted Unencrypted ENCRYPTED E ENCRYPTED ENCRYPTED Unencrypted F Unencrypted ENCRYPTED ENCRYPTED G ENCRYPTED Unencrypted ENCRYPTED H ENCRYPTED ENCRYPTED ENCRYPTED In scenarios such as G and H, when data is stored encrypted at both endpoints (local (FIG. 33, 100) and service 110 environment), it can further be specified whether the data is stored encrypted using the same algorithm, or separate (decoupled) algorithms. Additionally, senders and recipients are able to use different encryption methods from each other for local storage 100.

Furthermore, in scenarios such as G and H, it can further be specified that one encryption method may be implemented over top of another encrypted method, effectively creating "double encryption." For example, in Scenario H, data could be encrypted at a client side 100, transferred over a secure SSL communications channel 136, and then encrypted again at the service side 110.

An implementation of any of these combinations of encryption can work collaboratively with existing e-mail security solutions (such as PKI or PGP). Implementation of one of the security scenarios A through H at one time does not preclude eMail2 from being implemented with a different security scenario at a different time. Additionally, eMail2 may be implemented with the option for services and users to individually configure the security settings on a per-service, per-user basis.

Supplemental Methods of Message Encryption

In some embodiments, in addition to all other security measures available for the protection of eMail2 messages, users may implement a supplemental password or passphrase on a per-message basis to further protect message content.

If a user chooses to do so, he or she can add a password to the message that is about to be sent. Encryption of the message based upon this password takes place on the sender's machine (FIG. 33, 100) and preferably in the eMail2 client plug-in (FIG. 1, 108). Thereafter, before the message can be viewed by the recipient, it must be decrypted using the password supplied by the sender.

Preferably, the password is not communicated with the eMail2 message and never enters the eMail2 system until entered by the recipient. In preferred embodiments, it is up to the sender to communicate the password to the recipient in an alternative manner (for example, in a phone conversation or in a face-to-face meeting).

If this security measure is enabled, the message preferably cannot be decrypted by anyone, including the service 110 or service administrators, without the sender's password.

13. Messaging Threading and Public/Private Messaging

Message Threading

Figure 20:
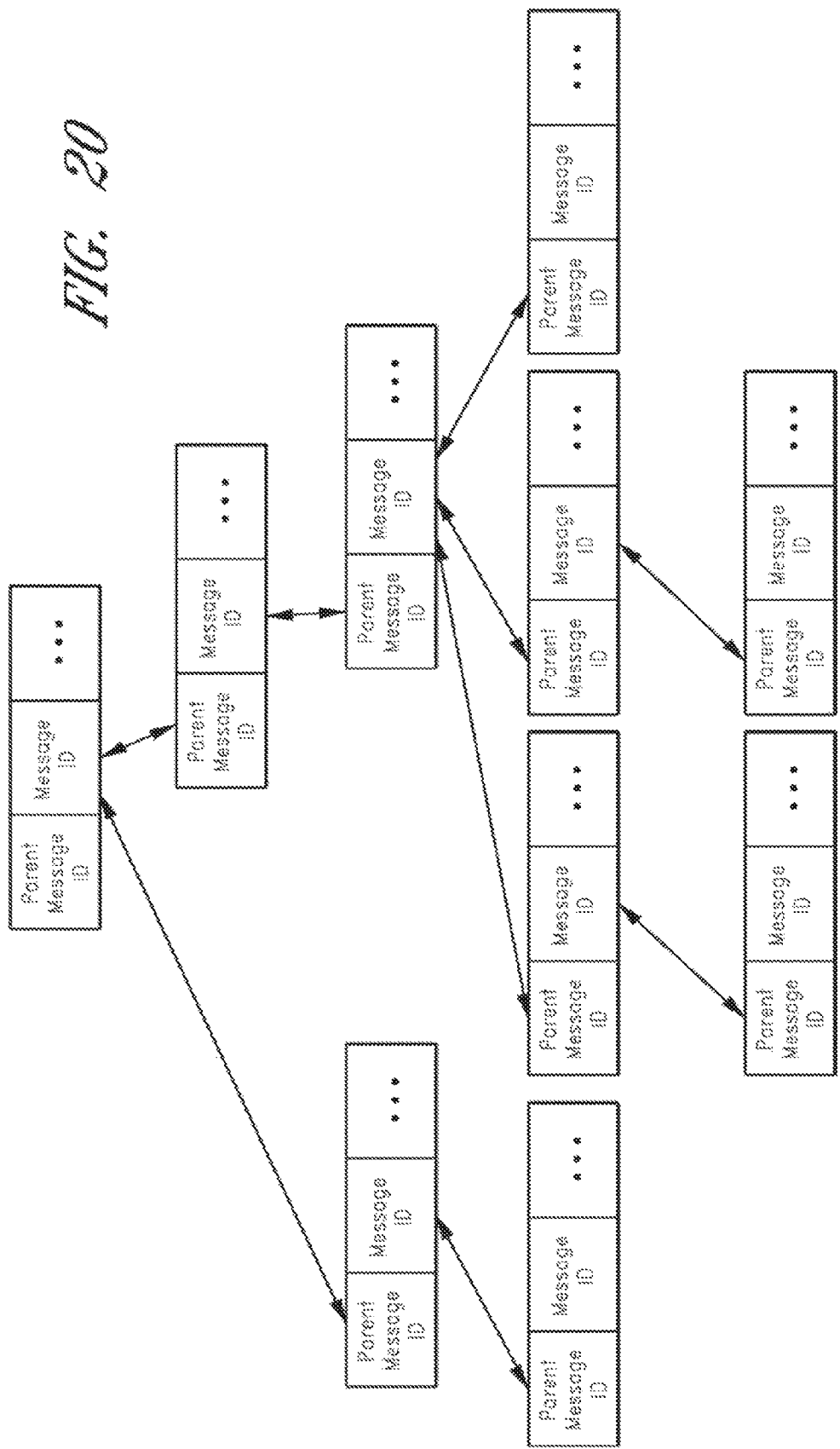
FIG. 20 describes the structure of the message threading system.

One feature of some embodiments of eMail2 is the ability to organize eMail2 messages as threads and to provide a threaded display to the user. Messages are identified by their unique message ID. When a derivative message (such as a reply or forward) is created from an original eMail2 message, the derivative message preferable stores the original's message ID as its parent message ID (see FIG. 20). This design allows the eMail2 service (FIG. 1, 110) and eMail2 client plug-ins 108 to combine all replies to a message into a single inbox entry. In the preferred embodiment, eMail2 messages are stored in the eMail2 data layer with at least the following fields: TABLE-US-00004 Message ID Parent Message ID [E1A] Public Message . . . Message ID Parent Message ID [E1A] Public Message . . . Message ID Parent Message ID [E1A] Public Message . . . Message ID Parent Message ID . . . .

eMail2 can use preorder, in-order, postorder, or level-order algorithms to traverse the "m-way" search tree depicted in FIG. 20 to find all of the messages in a particular thread.

Message aggregation occurs with the help of unique Message IDs and Parent Message IDs. When the user loads an e-mail client with the eMail2 client plug-in 108 installed, the plug-in recognizes all related eMail2 messages (originals, replies, forwards, public/private messages) and displays them in the e-mail client interface as a single inbox entry. The client plug-in can only perform this action if the related messages contain the embedded Message IDs and Parent Message IDs that the eMail2 client plug-in enables.

"Related messages" are still treated by the client plug-in 108 (and by the e-mail client 101) as independent messages, but because of the Message ID system and the eMail2 client plug-in, it is possible for the e-mail client to display them in a single logical e-mail window and inbox entry. The actual multiplicity of the single inbox entry is rendered invisible to the user through a transparent aggregation process.

If, at some point, the user uninstalls the eMail2 client plug-in 108, message threading functionality is lost. However, during the uninstall process, the user is prompted to convert all retrieved eMail2 messages into regular e-mail1 messages. If the user agrees to this, all of the thread items in a single eMail2 conversation will be displayed as independent, separate items in the user's e-mail client inbox, as in traditional displays of e-mail messages, replies and forwards.

Implementation

The conversation threading feature can be implemented in the eMail2 system in various ways. In one embodiment, there are two methods for the conversation threading: chronological or logical.

The chronological threading method aggregates all messages in a thread into a single inbox entry. The ordering and organization of these messages rely on date and time for readability.

The logical threading method aggregates all messages in a thread into a single inbox entry based on a logical conversation. The logical threading method may create multiple inbox entries if a single inbox entry is not logically readable.

Figure 35:
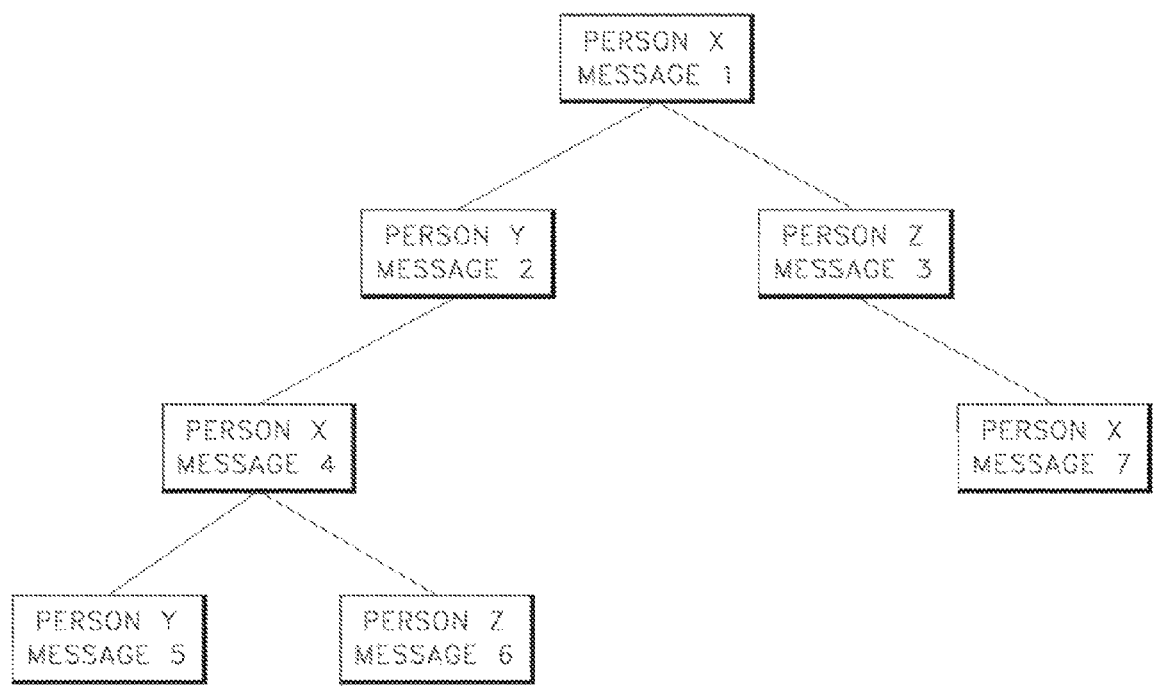
FIG. 35 is an example of the message transactions that would constitute a "conversation" in eMail2 terminology. Reference to FIG. 35 is used to describe the events, processes and elements in FIGS. 36-38.

Conversation Example (FIG. 35)

Provided in FIG. 35 is an example of a conversational structure. The messages and participants named in the figure will be used to further explain the threading methods disclosed further infra.

1. Person X originates a message to recipients Person Y and Person Z.

2. Person Y replies to the original message sent by Person X.

3. Person Z replies to the original message sent by Person X.

4. Person X replies to the reply sent by Person Y.

5. Person Y replies to the reply sent by Person X.

6. Person Z replies to the reply sent by Person X.

7. Person X replies to the earlier reply by Z (number 3).

Figure 36:
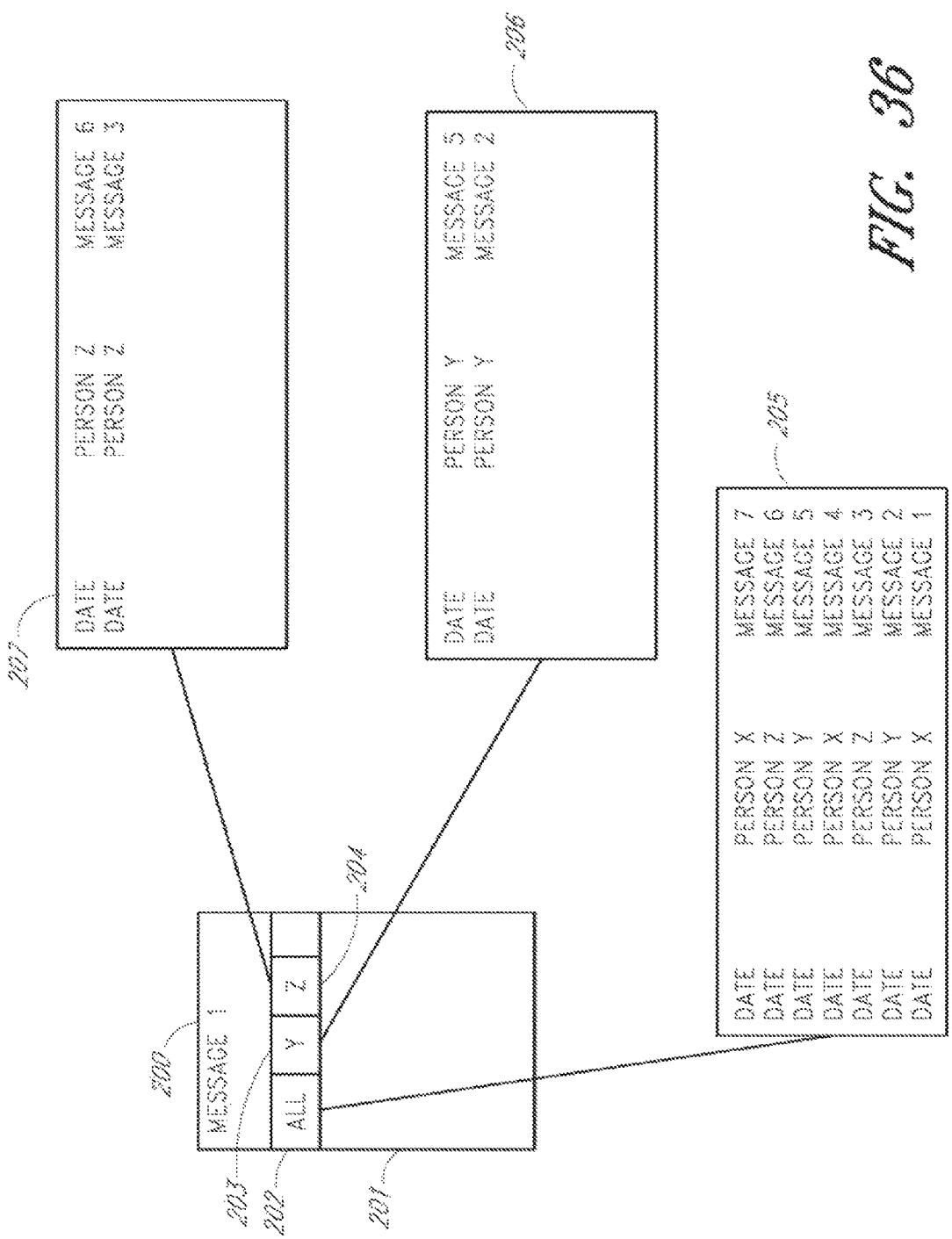
FIG. 36 is an example of a message reading interface and bookmark manager, displaying an eMail2 conversation with the chronological threading method.

Threading Method 1: Chronological Threading (FIG. 36)

Interface window 200 is a standard e-mail reading interface. It is supplemented by tabs 202, 203 and 204. The reading interface is for Message 1, composed by Person X. This is the originating message in the conversation. In this example, Person X is reviewing the conversation, which has now grown to encompass all of the message transactions explained in FIG. 35.

The entire conversation (described in FIG. 35) may be displayed in the single reading interface window 200. Additionally, when viewing the inbox, the entire conversation may be displayed to the user as a single entry in the inbox.

Left clicking any of the tabs 202, 203 or 204 switches the message body window 201 to that particular thread. The messages are displayed one after another, with the newest message at the top, together with respective date/time stamps. For tab 202 ("All"), all messages in the conversation are displayed in chronological order (the order in which they were sent or received). For tab 203 ("Y"), only messages sent by Person Y are displayed in chronological order. For tab 204 ("Z"), only messages sent by Person Z are displayed in chronological order.

Right clicking any of the tabs 202, 203 or 204 displays the bookmark manager (elements 205, 206 or 207). The bookmark manager can be used to jump directly to a particular item in a conversation. For example, right clicking the "All" tab 202 and then selecting the entry for Message 4 in bookmark manager 205 would switch the view in message body 201 to the "All" thread and jump directly to Message 4.

Although all of the post-origination e-mail messages in this example are the result of a "reply" transaction, e-mail messages resulting from "forward" transactions may also be included in the threads, such as where the originator (Person X) is copied on the forwarded e-mail message.

Threading Method 2: Logical Threading (FIG. 37A and FIG. 37B)

Figure 37A:
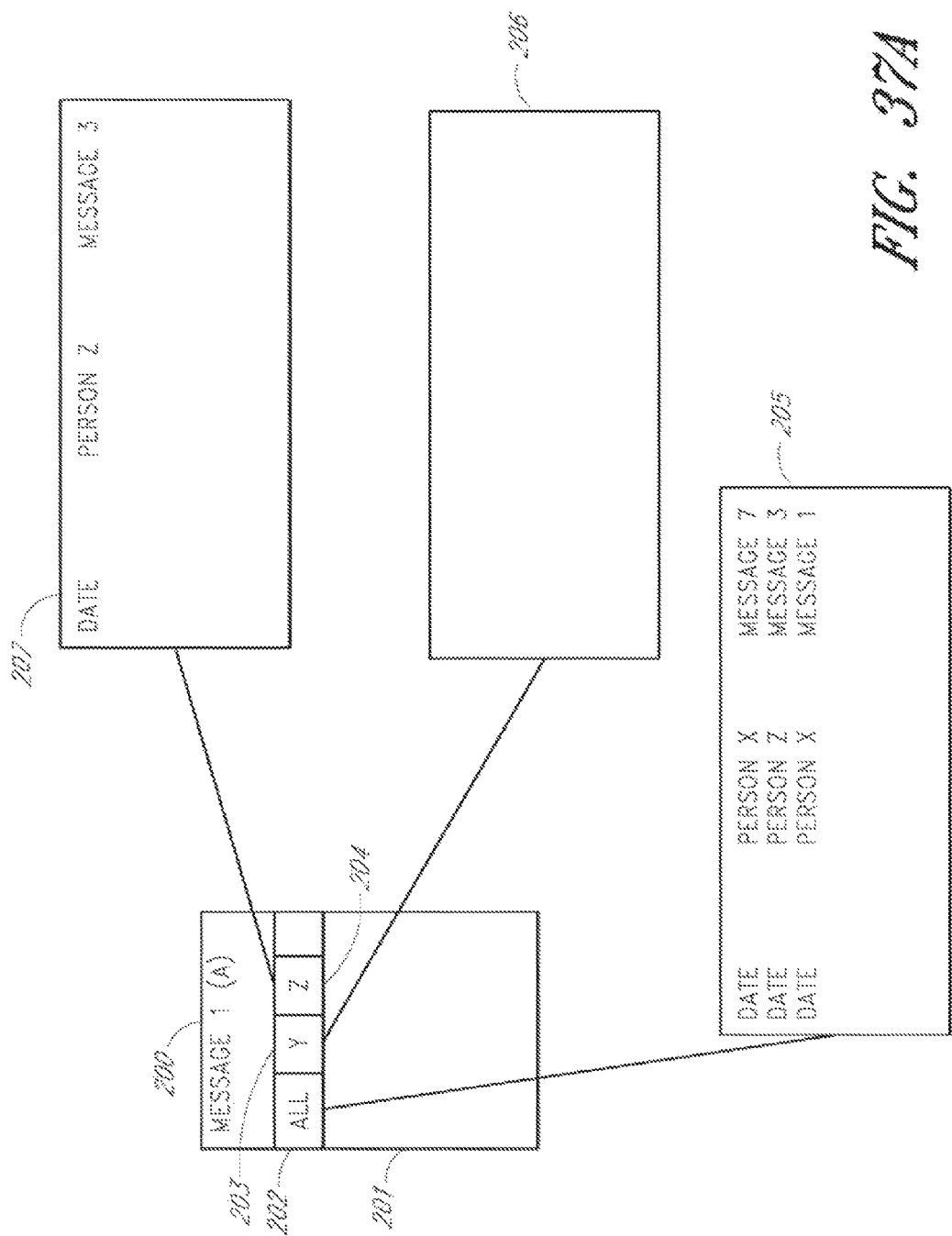
FIG. 37A is an example of a message reading interface and bookmark manager, displaying an eMail2 conversation with the logical threading method, for thread A.
Figure 37B:
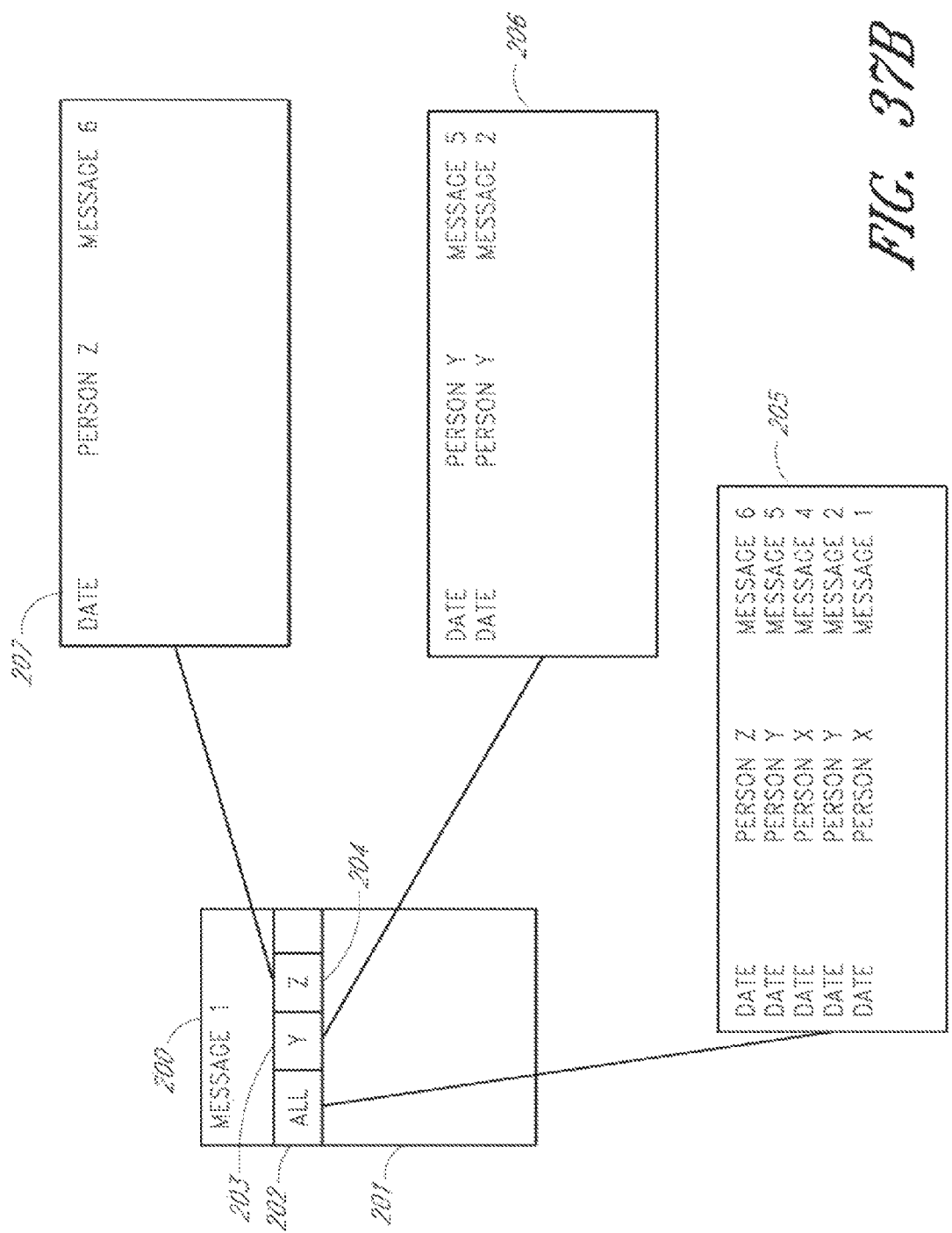
FIG. 37B is an example of a message reading interface and bookmark manager, displaying an eMail2 conversation with the logical threading method, for thread B.

FIGS. 37A and 37B illustrate another method, referred to as logical threading, that may be used to aggregate and display the e-mail messages of the conversation. In this example, the entire conversation of FIG. 35 is divided into two sub-conversations (FIGS. 37A and 37B) for purposes of display to Person X, the originator of the conversation. Sub-conversation 1 (FIG. 37A) consists of messages 1, 3 and 7. Sub-conversation 2 (FIG. 37B) consists of messages 1, 2, 4, 5, and 6. Each sub-conversation corresponds to one of the major branches in the tree shown in FIG. 35. Displaying the sub-conversations in this manner, as opposed to displaying the entire conversation chronologically, reduces the likelihood that Person X will lose the "train of thought" associated with each sub-conversation. Two separate inbox entries (one for each sub-conversation) are preferably presented to Person X for accessing these sub-conversations.

The sub-conversations are identified programmatically by, e.g., effectively traversing the tree structure shown in FIG. 35. For example, a separate sub-conversation may be generated for each reply to the original e-mail message, or for each branch emanating from the original (parent) e-mail message. Branches that include less than some threshold number of e-mail messages/transactions (e.g., three) may be excluded, or may be grouped with other branches to form sub-conversations.

As with the threaded display method of FIG. 36, the reading interface windows 200 of FIGS. 37A and 37B include a set of tabs 202, 203 and 204 for switching between all messages of the sub-conversation, those from Person Y, and those from Person Z. Under each such tab, the messages are again displayed chronologically, with the most recent message displayed at the top.

Threaded Reading Window

In all drawings, the reading interface window 200 can be viewed as analogous to FIG. 38. FIG. 38 is a possible representation of the tabbed reading interface window 200, though other representations can still exist without departing from the scope of the invention.

The task of generating the threaded displays as shown in FIGS. 36-38 is preferable performed by the eMail2 client plug-in 108 or the web client interface 127, but may alternatively be performed in-whole or in-part by the eMail2 service.

Alternative Embodiments

It should be recognized that these are simply two embodiments of the threaded display feature. The message threading functionality of eMail2 can be implemented in alternative embodiments without departing from the scope of the invention. As one example, in the case of logical threading, a separate tab may be provided viewing each sub-conversation. Further, it will be recognized that the threaded display features of the invention can be practiced with other e-mail systems, including those that do not provide any form of encryption or security.

Public/Private Messaging eMail2 supports public and private messaging within the context of a single e-mail window. For every recipient entered into the "TO:" (FIG. 8, 150), "CC:" 151, or "BCC:" 152 fields, a tab 154 can be added to the composition window of a standard e-mail client, either by default or by the request of the user. The user can command to the eMail2 client plug-in 108 that a tab be added for a specific user by a menu item selection, a button click, a drag and drop action, or any other usual method of supplying computers commands. A tab for "All" is also shown 153. Users have the option to enter text under a tab that is viewable only by the intended recipient, but the composition of both public and private messages preferably take place within the context of a single e-mail window. When a message is retrieved by a recipient, he or she preferably sees the public message, as well as any private messages, in the same tabbed interface. See FIGS. 8, 9 and 10 for examples of the tabbed interface.

If a user drags one tab onto another, a new tab is created for a specific "group." For example, if a user drags the tab for Recipient A onto the tab for Recipient B, a new tab is created for "Recipient A and B." See FIG. 8.

From a user's perspective, preferably it appears that portions of a single e-mail are visible only to specific recipients. From the design perspective, the text entered under private tabs is treated as separate e-mail messages. The eMail2 client plug-in 108 aggregates these separate messages and displays them in the tabbed interface 154, for both the sender and the recipient. The recipient is only able to retrieve the message portions that he or she has permissions to (e.g. User A retrieves messages for "All" and "User A," but is unable to retrieve messages for User B). The retrieval of separate messages, permissions, and tabbed display is transparent to the user. It appears to the user that he or she is simply retrieving one message with multiple tabs.

In some embodiments, both sender and recipients are able to use the "Bookmark Manager" to quickly jump to specific parts of the conversation. The Bookmark Manager is a feature of the system that allows for easy viewing of the messages in a conversation. Selecting name in one of the tabs displays the Bookmark Manager. With the Bookmark Manager, finding specific replies is simply a case of selecting the corresponding entry from the list in the dropdown menu (which displays the sender, date and time) and then having the client UI jump immediately to that location in the e-mail conversation, which has been conveniently aggregated. See FIG. 19 for an example of the Bookmark Manager.

The creation and sending process for sending private and public messages is the same as that for normal messages, except that separate messages may be entered in separate tabs.

Figure 21:
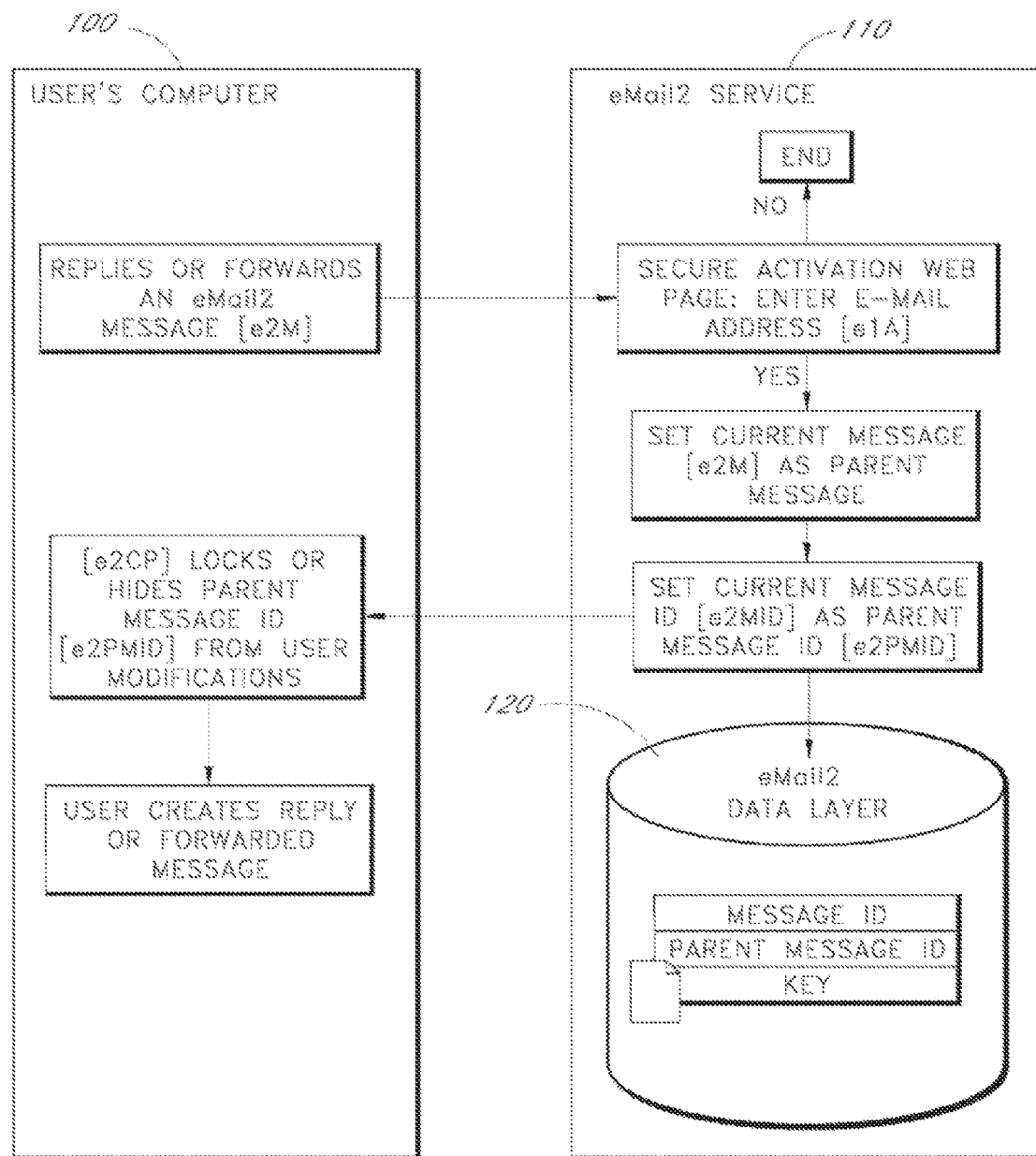
FIG. 21 is a workflow describing how a user replies to or forwards messages. It is related to FIG. 5 and FIG. 6, as all three describe sending processes in some form.

14. eMail2 Messaging Forwarding and Replying (FIG. 21)

The process flows for forwarding and replying are preferably similar to the flows previously described for new message sending and retrieval. FIG. 21 illustrates a typical workflow for this process.

Forwards

In the preferred embodiment, when an eMail2 message is forwarded, only the introductory message is sent to the new recipient. This introductory message preferably contains the same message key as the original message. As in the normal eMail2 retrieval process, this introductory message then gets converted to an access message by the recipient's eMail2 client plug-in (FIG. 1, 108).

The access message presented to the new recipients preferably shows both the sender and recipients of the original message and the sender and recipients of the forwarded message.

Replies

In the preferred embodiment, when a reply is sent to an eMail2 service, only the reply (new content) is transferred to the service. The original message does not need to be transferred because it already exists on the eMail2 service, and because the reply message contains the original message's Message ID as its Parent Message ID. When the sender of the original e-mail views a reply message, the sender's client plug-in 108 retrieves the original message from the eMail2 service, or alternatively, retrieves this message from its local storage. In either case, the eMail2 client plug-in aggregates the original message, the reply message, and any other related messages (e.g., other replies) for display in the active e-mail window of the e-mail client, such that all of these messages are displayed as part of the same logical e-mail message. (See FIGS. 36, 37a, 37b and 38) The task of combining the related messages for display could alternatively be performed by the eMail2 service (FIG. 1, 110). Because the related messages preferably share a common parent ID, aggregating the related messages does not require or involve any analysis of message content to identify related messages.

In some embodiments, when a user drafts a reply within his or her e-mail client, the original message content can be locked, hidden, or made un-editable. If the original message content is editable and the sender makes changes to the original message, it is considered to be part of the reply and is transmitted as "new content."

Figure 19:
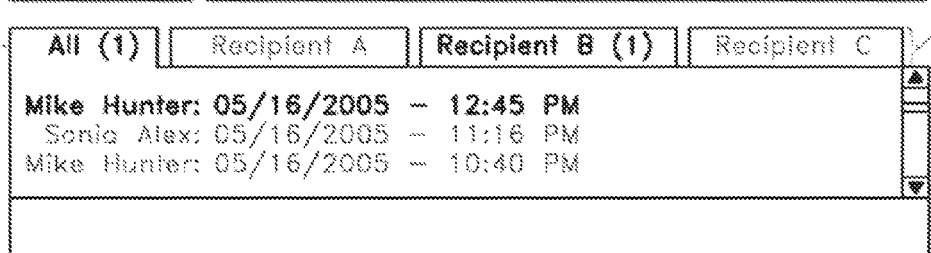
FIG. 19 describes the Bookmark Manager for a message with multiple sub-messages, replies or forwards.

When replies are retrieved and displayed in a user's e-mail client 101, each tab (for each private and public sub-message) displays the sender's name in bold text and the number of replies from that sender (illustrated in FIG. 19). Users may click on a tab to access the sender's reply. In one embodiment, clicking on the tab twice will launch a "bookmark manager." This manager displays bookmarks to all of the different replies from the same sender for each private message, and from all senders for the message to all.

Once a reply is read, the recipient can delete the message thread or place it in an e-mail folder. In some embodiments, if the message thread is deleted and additional replies are received later, the message thread becomes "active" again and reappears in the user's inbox. If the message was placed in a specific e-mail folder, the message remains in that folder but becomes active again (for example, highlighted as an "unread" message).

Blocking Forwards and Replies

In some embodiments of the system, forwarding and replying may be blocked by disabling the copy/paste functionality of the e-mail reading window. When a user attempts to copy text from a message that is protected under a "do not forward" or "do not reply" policy, the user will be unable to select the text, and a warning message may be displayed.

Blocking the user from selecting text may, for example, be achieved by implementing a custom form (window) to replace the e-mail client's 100 native reading window entirely.

Blocking the user from selecting text may also be achieved by displaying the message in a format that doesn't allow for text selection, e.g. PDF, GIF, or JPEG.

Forcing eMail2 on Reply/Forward

In the preferred embodiment, forwards of and replies to an eMail2 are automatically sent as eMail2 messages. Preferably, there is a service-level option regarding whether or not this policy is enforced.

If enforced, users are not able to reply to an eMail2 message with an e-mail1 message, nor are they able to forward an eMail2 message as an e-mail1 message. This can be achieved by, for example, having the 'eMail2' checkbox in the editing toolbar selected and disabled (FIG. 27C, 902), and having attempts to uncheck the box result in a message informing the user to the effect that "This conversation is eMail2 only. E-mail1 messages are not allowed."

If this policy is not enforced by the service, un-checking the 'eMail2' checkbox 902 will alert the user that he or she is about to reply/forward using e-mail1, and, therefore, all security and feature upgrades for the conversation will be lost. If the user confirms, the message will become an e-mail1 message and sent using email1 protocols and processes.

Figure 22:
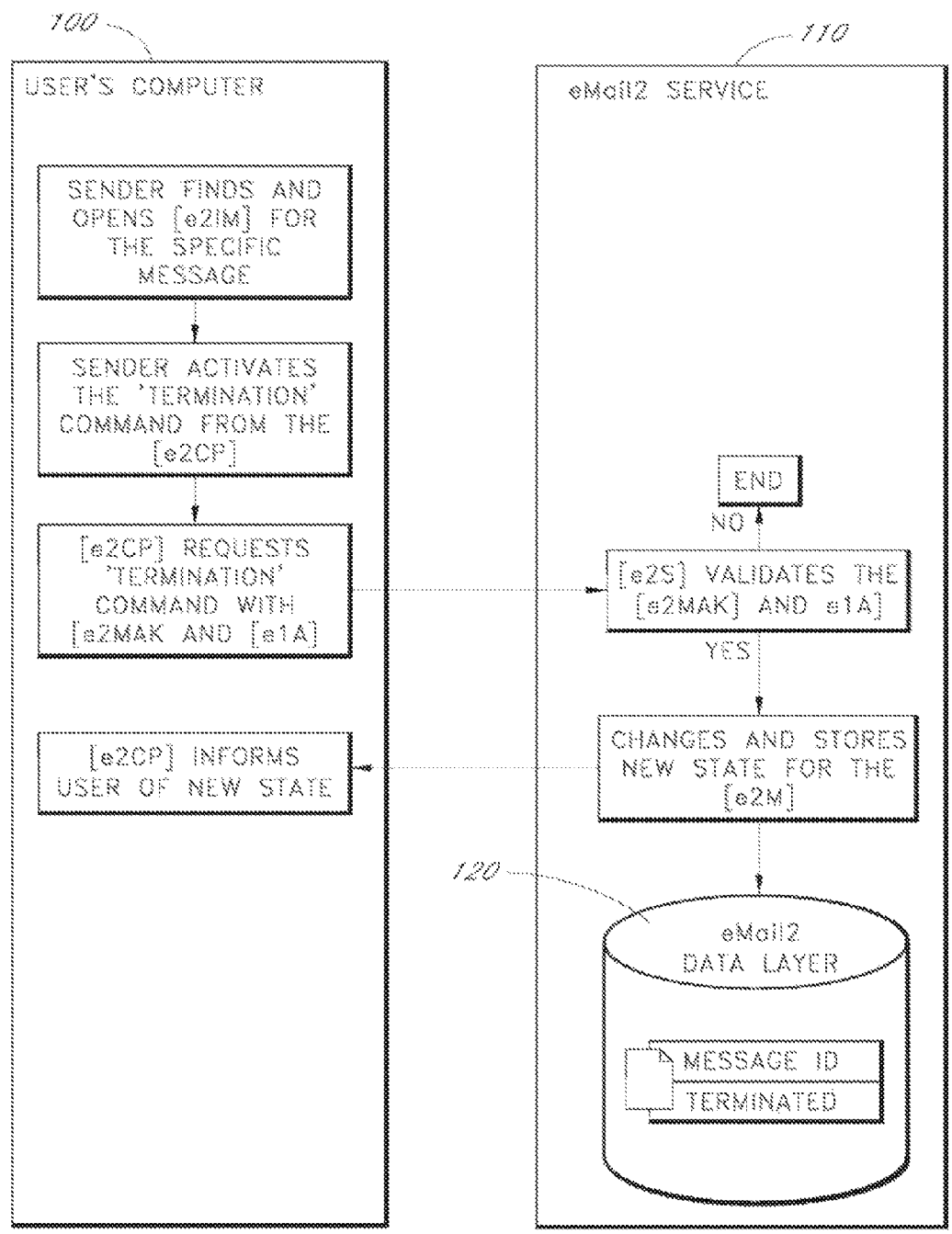
FIG. 22 is a workflow describing how a message is terminated by the sender.

15. eMail2 Message Control and Termination (FIG. 22)

Some embodiments of the eMail2 system allow for complete message control.

Because eMail2 messages are preferably stored only on the eMail2 service (FIG. 1, 110) that the sender selects, the sender can exert total control over the message until it is locally stored on the recipient's computer. This contrasts with the existing e-mail1 systems, where total message control generally is not possible due to a store-and-forward message management system which results in multiple copies of the message existing in various locations.

An example of message control is the optional termination feature of the eMail2 system. Since an eMail2 message is sent to an eMail2 service (FIG. 1, 110) rather than directly to the recipient, in some embodiments senders may have the ability to "terminate" the message/conversation and thus forbid recipients from further retrieving, replying to, or forwarding the message. There are at least two types of termination: soft termination and hard termination. When a message undergoes soft termination, recipients, including forwardees, that have already retrieved, replied or forwarded the terminated message are still able to view its contents and to re-retrieve it, but all further actions are blocked. When a message undergoes hard termination, all future actions, including re-retrieval, are blocked. Preferably, administrators and other authorized 3.sup.rd parties other than the sender are able to effect a termination. Both forms of termination apply to all eMail2 e-mail messages (e.g., replies, replies to replies, forwards, etc.) that are part of the conversation emanating from the terminated message.

Another example of complete message control, namely control of forwarding permissions, is described below. Of course, listing all complete message control options contemplated is not possible or practicable. In general, complete message control includes any functionality for placing conditions or restrictions on the receipt or redistribution of e-mail messages, at a time prior, contemporaneous with, or subsequent to sending. These include message termination, message forwarding controls, including the option for required recipients on forwards, message voting, virus scanning, or metadata requirements, limits on the number of recipients, time delays before the message may be retrieved, time- or recipient-based message expirations, limitations on local storage, requirements on the level of security at the recipient client machine 100, including recipient authentication for retrieval or redistribution, and so forth.

In some embodiments, if a user forwards a message, he or she can terminate the thread which begins with his or her forward, leaving the rest of the conversation active. Further, preferably, any message control functionality available to an original message is also available to a forward or reply message and a public or private sub-messages. Such functionality is possible due to the tree-like structure of Message and Parent IDs of public and private messages, forwards, and replies.

Message Termination Workflow

FIG. 22 illustrates one example of a process flow that may be used for hard- or soft-terminating an eMail2 message.

1. Sender opens the "sent" message in his or her e-mail client, which links to the eMail2 message stored on the eMail2 service 110.

2. Sender selects the "Termination" command.

3. The eMail2 client plug-in 108 sends a termination request to the eMail2 service 110 with the following information: (a) eMail2 message key; (b) Sender's e-mail address.

4. The eMail2 service 110 receives this request and (a) validates the message key and the e-mail address; and (b) changes a field in the data layer 120 to indicate that the eMail2 message has been hard- or soft-terminated. If the conversation has been terminated, the eMail2 system traverses the tree structure of an e-mail thread, collecting the message IDs of all child messages associated with the terminated conversation. This is possible because of the relational parent message IDs that are a part of every eMail2 message belonging to a conversation.

5. The sender's eMail2 plug-in 108 receives a confirmation of the eMail2 message's terminated state. This message may also indicate whether any recipients have already retrieved the message, and may identify these recipients.

6. Once terminated, further operations are limited (replying, forwarding, etc. are disallowed) for this message. If the message has been soft terminated, recipients may still retrieve the message. If the message is hard terminated, recipients may not retrieve the message. Preferably, recipient attempts at forbidden actions cause a warning message to be displayed or sent to the sender or administrators.

Message Forwarding Control

As another example of message control short of termination, the process for controlling forwarding permissions will be described. In some embodiments of the eMail2 system, senders are able to enforce a policy which will require all recipients to request permission before forwarding a message to a recipient not originally included in the distribution list. When a sender has set this policy, a recipient may attempt to forward a message in the usual manner, but will instead be met with a dialog informing him or her of the policy. He or she can then choose to "request permission" from the sender.

"Permission" can be obtained in several ways, including sending an eMail2 notification to the sender, from the service or sender, informing him or her that there are permission requests pending. The sender may then access the web client interface 127 and accept or reject the permission request. The requesting recipient may then be informed of the decision via an eMail2 message.

The actual process of forwarding may take place in at least two ways: The user may be prevented from forwarding the message at all until the permission has been granted, or, the user may be allowed to forward the message, but the recipient cannot retrieve it until permission has been granted. Either method produces the same overall effect.

Optionally, a whitelist/blacklist system could be integrated. The sender could set up a whitelist and/or a blacklist before sending the original message. When a recipient attempts to forward the message, before notifying the sender of the permission request, the eMail2 system checks the request against the whitelist and blacklist. If the forward address is on the whitelist, permission is automatically granted. If the forward address is on the blacklist, permission is automatically denied.

As described above, total message control preferably includes the ability to control the functionality of senders, 'recipients,' and services' ICEs (FIG. 26, 123).

Figure 28:
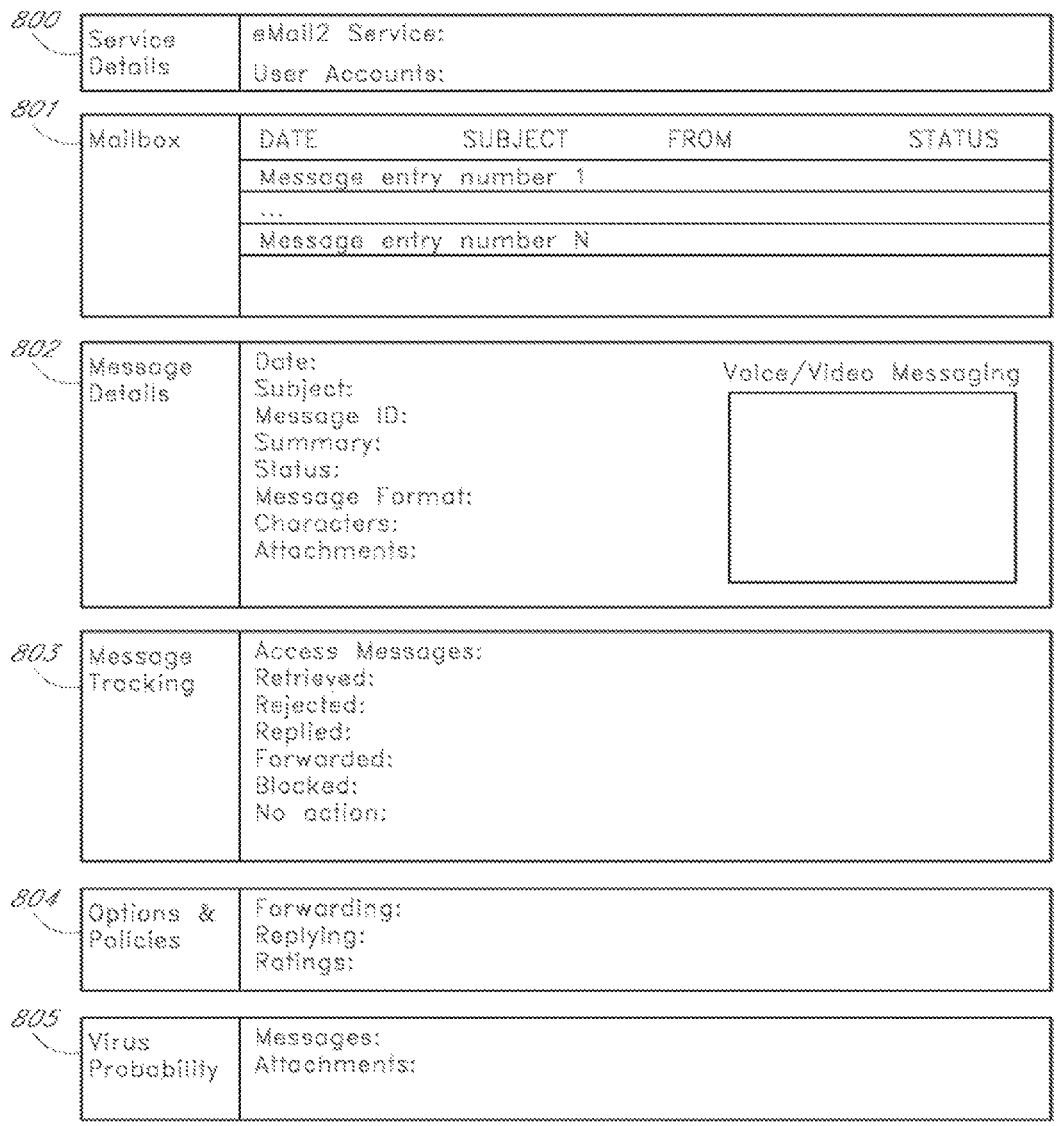
FIG. 28 is a representation of a delivery slip, as displayed in a web browser.

16. eMail2 Delivery Slip (FIG. 28)

The eMail2 delivery slip is displayed in a possible embodiment in FIG. 28. The elements in FIG. 28 are customizable by service (FIG. 1, 110) and users, preferably displayed through a secure web browser connection. The webpage itself is hosted by the specific service 110 that is being used.

The eMail2 delivery slip (FIG. 30, 806) is an aspect of the web client interface (FIG. 1, 127), used primarily to display eMail2 metadata in a dynamic fashion. However, the delivery slip is also integral to the message option system described further infra.

In FIG. 28, element 800 "Service Details" displays details about the specific service that is being used for the message that the delivery slip is displaying metadata for. This includes the service name, as well as any accounts that a user has on the service. Accounts can be denoted by e-mail1 addresses, or any other unique identifying information.

Element 801 "Mailbox" displays all of the messages that a specific user has on the specified services. The messages are displayed as message entries containing at least the following metadata fields per message: date, subject, from, status. Selecting a message with the mouse refreshes the information below the mailbox to pertain to the selected message.

Element 802 "Message Details" displays various metadata pertaining to a specific message. The message details can include (but are not limited to): the date that the message was sent, the subject line of the message, the message ID assigned by the service, the status of the message, the format that the message is in, the number of characters in the message, and details about attachments. If the sender has recorded an eMail2 Voice or Video message, it is displayed in the message details.

Element 803 "Message Tracking" displays metadata pertaining to the tracking of a specific message. The following metadata fields may be displayed:

Access Messages: Status of access message retrieval (e.g. "2/3 Access Messages retrieved")

Retrieved: Status of message retrieval (e.g. "1/3 Messages retrieved")

Rejected: Status of message rejection (e.g. "0/3 Messages rejected")

Replied: Status of message replies (e.g. "1/3 Messages replied")

Forwarded: Status of message forwards (e.g. "0/3 Messages forwarded")

Blocked: Status of message blocking (e.g. "1/3 Messages blocked")

If any of these fields contain a value greater than 0, the e-mail addresses associated with the data can optionally be displayed (e.g. "1/3 Messages retrieved: joe@e2service.com"). These tracking fields are meant to be illustrative.

Element 804 "Options and Policies" exists in three forms, depending on the context. If the delivery slip is being viewed after the message has been sent, the options and policies element displays the settings that have been chosen by the sender. If the delivery slip is being viewed in its pre-send state (before the message has been sent by the sender), the sender is allowed to modify all of the options and policies. If the delivery slip is being viewed by the sender after a message has been sent, options and policies may be changed. For example, if the sender accesses a delivery slip for a message that he or she sent last week with a "no-reply" stipulation, he or she may change that policy and allow replies from that point on. Options and policies may include (but are not limited to): whether or not the message can be forwarded, whether or not the message allows replies, whether or not the message has an expiry time (and what the time is) and whether or not ratings and surveys are enabled for the message.

Element 805 "Virus Probability" displays various types of virus metadata, including scans that occur on the sender's local machine, the server's local environment, through an external virus scan API, etc. The delivery slip can optionally aggregate the scan results and display them as a probability value (i.e. the probability that a message contains a virus, or an attachment is infected). Alternatively, the exact results of all scans can be displayed.

Elements 800-805 are intended to be illustrative, not definitive. Sections on the delivery slip are highly customizable, and the sections themselves, as well as the information that they contain, can be defined on a per service (or even a per-user) basis. An eMail2 delivery slip can display more or less information than is illustrated in FIG. 28.

Figure 27A:
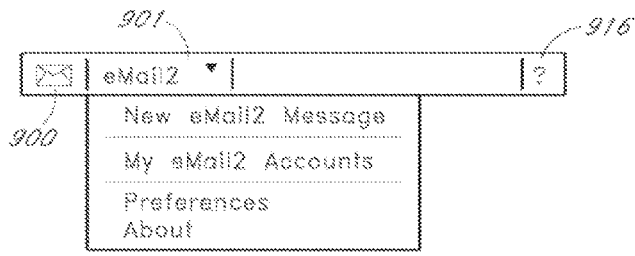
FIG. 27A is a representation of the main toolbar that supplements an e-mail client after the plug-in (described in FIG. 1 and FIG. 2) is installed.
Figure 27B:
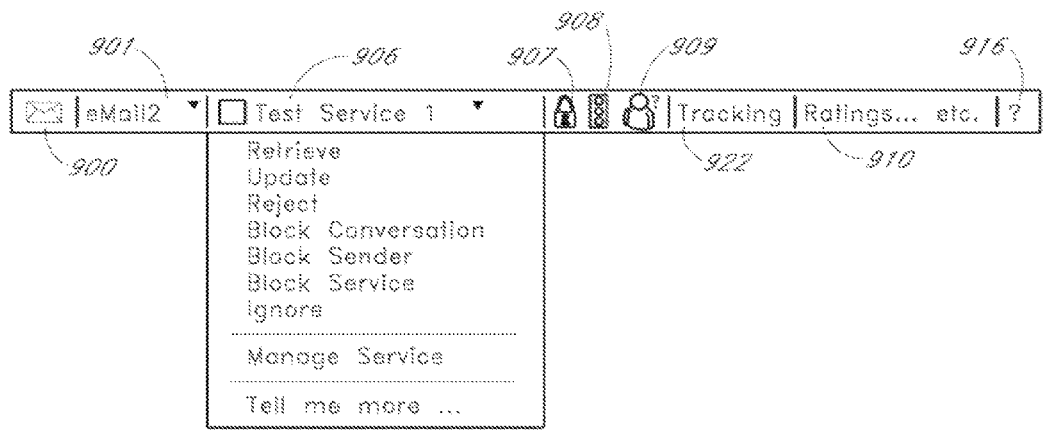
FIG. 27B is a representation of the reading toolbar that supplements an e-mail client after the plug-in (described in FIG. 1 and FIG. 2) is installed, and an eMail2 message is selected or opened.

17. eMail2 Toolbars (FIGS. 27A, B, & C)

In one embodiment, the eMail2 system functions on the client side through the aid of three custom toolbars added to a user's e-mail client. The toolbars described below are specifically implemented through MS Outlook, but may be implemented through different e-mail clients. Sample eMail2 toolbar schematics are provided in FIGS. 27A, B, and C.

Main Toolbar (FIG. 27A)

This toolbar is visible from the main window of the e-mail client. Each of the buttons and menu options fulfill specific functions:

1. Pressing the logo button 900 opens a browser window pointed to the product website.

2. Dropdown menu 901 allows access to menu items, including the following:

Menu item "New eMail2 Message" allows the user to create a new eMail2 message.

Menu item "My eMail2 Accounts" displays a list of all the user's relationships with different eMail2 accounts. There is a list entry for every e-mail address/server combination. For instance, if a user has two e-mail addresses registered and activated with two services each, the list would have four entries.

Menu item "Preferences" allows access to the eMail2 client side options ("Incoming Messages" for example).

Menu item "About" displays version and company information for the specific instance of the eMail2 client plug-in installed.

3. Icon 916 "Help" opens a browser window pointed to the help section of the product website.

Reading Toolbar (FIG. 27b)

This toolbar is visible whenever a user is reading an eMail2 message.

1. Pressing the logo button 900 opens a browser window pointed to the product website.

2. Dropdown menu 901 allows access to menu items.

3. Dropdown menu 906 allows access to specific commands that are executed within the context of reading an e-mail message. These include the following:

[0545] Menu item "Retrieve" allows the user to retrieve an access message (if the selected message is an eMail2 introductory message), or to retrieve an eMail2 message (if the selected message is an eMail2 access message). [0546] Menu item "Update" refreshes (or re-retrieves) the content of an eMail2 access message. [0547] Menu item "Reject" blocks the message and removes the user from the message's distribution list. It is possible to do undo a rejection, but embodiments may preferably choose not to allow revocations of rejections. [0548] Menu item "Block Conversation" prevents a user from getting any further messages from the selected conversation. At a later date, a user may still un-block the conversation and retrieve everything that he or she may have missed. [0549] Menu item "Block Sender" blocks all future messages from the sender of the selected message. Can be un-blocked later. [0550] Menu item "Block Service" blocks all future message from the service that the selected message is associated with. Can be un-blocked later. [0551] Menu item "Ignore" flags the message as ignored, so until the flag is removed, actions (for example, "retrieve all messages") will not affect it. [0552] Menu item "Manage Service" allows the user to set preferences or options specific to the service. It may also allow for active registration. [0553] Menu item "Tell me more . . . " opens a browser that is pointed to the service's homepage.

4. Icon 907 "Security" denotes that this message was sent using a secure eMail2 service.

5. Icon 908 "Certification Level" denotes whether a service is certified, uncertified or trusted. The icon is a standard green/yellow/red light traffic light. A green light means that the user has explicitly chosen to trust the service. A yellow light means that the service has been certified by the eMail2 certification authority. A red light means that the service has not been certified by the eMail2 certification authority, nor is it explicitly trusted by the user.

6. Icon 909 "Sender" denotes whether the message's sender is trusted, not trusted or unknown. A checkmark denotes explicitly trusted senders, an 'x' denotes not trusted senders, and a question mark (?) denotes unknown senders.

7. Extension area 910 is for metadata extensions, e.g. ratings and surveys. This section is dependant on the service that the message uses.

8. Icon 916 "Help" opens a browser window pointed to the help section of the product website.

9. Icon 922 "Tracking" opens a browser window pointed to the Delivery Slip for the specific message. Optionally, other icons may be included (e.g. "Message Details") that open a browser window pointed towards different aspects of the Delivery Slip.

Figure 27C:
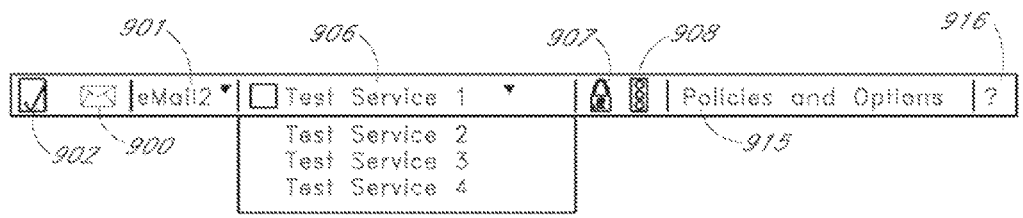
FIG. 27C is a representation of the editing toolbar that supplements an e-mail client after the plug-in (described in FIG. 1 and FIG. 2) is installed, and en eMail2 message is being created, replied to or forwarded.

Editing Toolbar (FIG. 27*c*)

The editing toolbar is visible whenever a user is composing a new eMail2 message.

1. Pressing the logo button 900 opens a browser window pointed to the product website.

2. Checkbox 902 allows the user to spontaneously decide whether or not the message is an eMail2 message. Checking the box enables eMail2 functionality. Un-checking the box disables eMail2 functionality.

3. Dropdown menu 901 allows access to menu items.

4. Dropdown menu 906 allows access to a list of services that the user can choose to send this eMail2 message with. The current service is displayed on the eMail2 editing toolbar.

5. Icon 907 "Security" denotes that this message will be sent using a secure eMail2 service.

6. Icon 908 "Certification Level" denotes whether a service is certified, uncertified or trusted. The icon is a standard green/yellow/red light traffic light. A green light means that the user has explicitly chosen to trust the service. A yellow light means that the service has been certified by the eMail2 certification authority. A red light means that the service has not been certified by the eMail2 certification authority, nor is it explicitly trusted by the user.

7. Button 915 "Policies and Options" allows a sender to set certain options and policies for the message that he or she is composing. This includes whether or not people can directly reply, whether tracking is enabled, and limitless other message options and policies.

8. Icon 916 "Help" opens a browser window pointed to the help section of the product website.

The menu items and icons listed above, for all toolbars, are meant to be illustrative but not definitive. It should be recognized that options, icons and menus may be added and removed from the eMail2 toolbars without leaving the scope of the invention, and that toolbars may be omitted entirely in some embodiments. Additionally, certain services 110 will have different options available, and the eMail2 toolbars will reflect this by displaying the options for a specific service 110, whether this entails displaying more options or less.

18. eMail2 Metadata Extensions

In the eMail2 system, 'metadata' refers to any storable information that is associated with an eMail2 message. Metadata is typically displayed to the user through the delivery slip (FIG. 30, 806) (part of the web client interface (FIG. 1, 127)), introductory message and access message, but other ways of displaying metadata are possible.

With the eMail2 system, the metadata collected and displayed to the users, administrators, and third parties is completely customizable. It is possible for eMail2 metadata to be virtually any information that a company, organization or individual would like to collect. A specific list of some current metadata can be found below.

Service Details: Service Name, Service GUID (e2SGUID), and Service URL.

Conversation Details: Date started, Conversation originator, Members to date, Policies enforced, Service ownership.

Message Details: Date, Sender, Recipient(s), Subject, Message ID, Summary, Status, Message Format, Character count, Attachments, Message body.

Tracking metadata: (a) Whether recipients have retrieved the access message, (and if so, the e-mail address of the recipients who have done so); (b) Whether recipients have retrieved/rejected/ignored the eMail2 message, (and if so, the e-mail address of the recipients who have done so); (c) Whether recipients have replied or forwarded the eMail2 message, (and if so, the e-mail address of the recipients who have done so).

Options and Policies metadata: Whether replying is enabled; Whether forwarding is enabled; Whether ratings are enabled; Virus metadata; Infection data regarding messages; Infection data regarding attachments.

In some embodiments, in order to make full use of the metadata extensibility, metadata extension modules can be developed by third parties. An example for a possible metadata extension module is disclosed below.

Incident Management

In large organizations, where incidents are reported and archived in a database system, an "Incident Management" metadata extension module could be developed or existing ones could be extended to work with eMail2. This module would allow employees to file incident reports electronically and securely. A workflow for such a module is described below.

Figure 32:
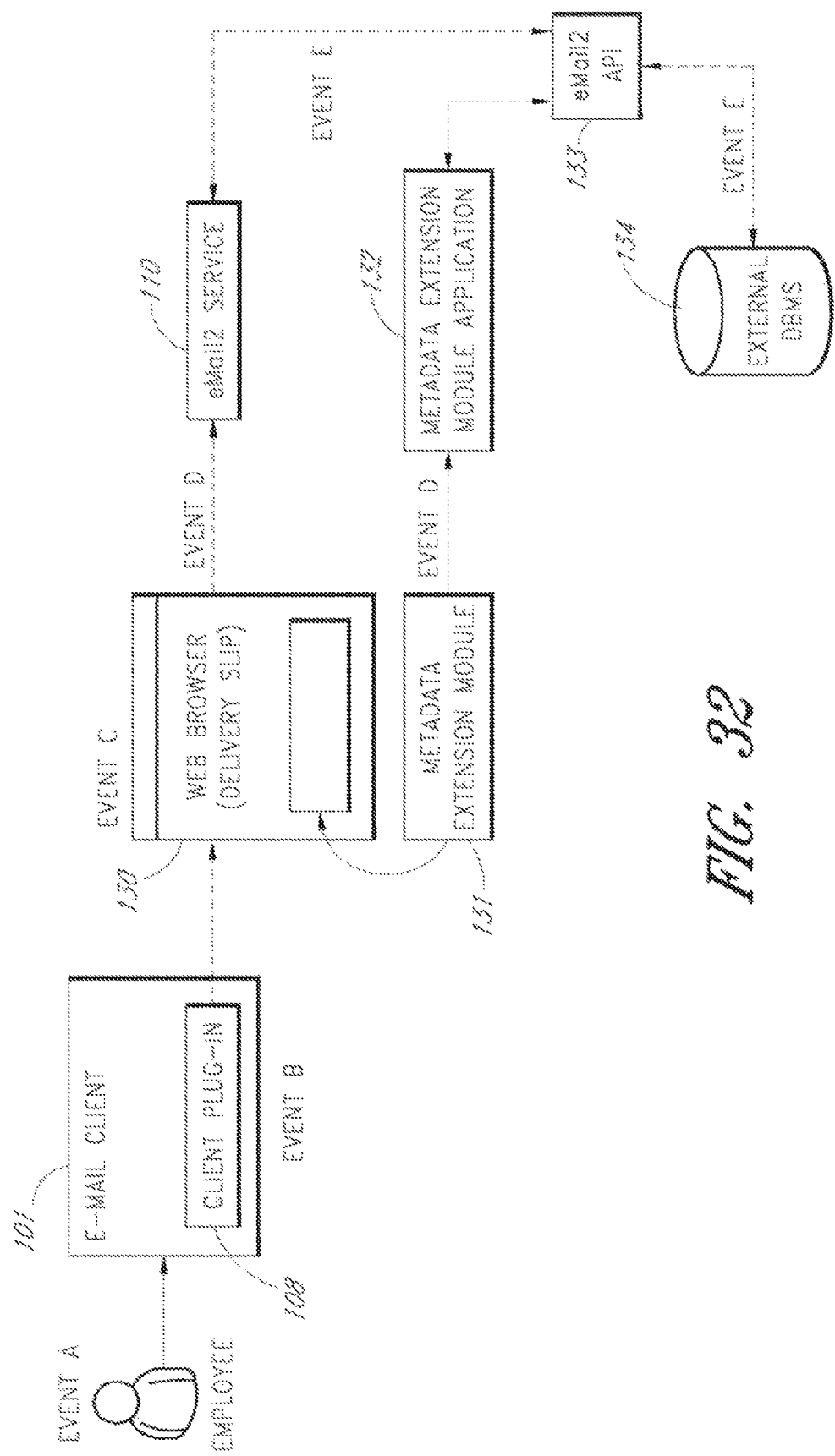
FIG. 32 is a process flow for a metadata extension module generating, displaying and exchanging information.

Metadata Extension Module Workflow (FIG. 31 and FIG. 32)

Event A: An employee is involved in an incident that is normally reported to specific parties and filed in an electronic "incident database" (external database 134).

Event B: The employee composes an e-mail message to a distribution list or alias (e.g. incident-reportgsys-national.com) using his or her e-mail client 101 and the eMail2 client plug-in 108.

Event C: Upon clicking the send button, the employee is informed that certain metadata fields are incomplete. A secure browser window 130 is opened and the user is taken to a pre-send state of the delivery slip where a custom metadata extension module 131 is awaiting completion (FIG. 31). Custom fields, such as "Time of incident", "Location of incident", "Employees involved", etc. must be completed before the user is able to send the message.

Event D: Once the metadata extension module is filled-out, the user sends his or her message. The standard message metadata is sent to the eMail2 service 110 and the data collected in the metadata extension module 131 is sent to the third party metadata extension module application 132. Alternatively, all data is sent and stored at the eMail2 service 110.

Event E: The proper parties all receive the eMail2 message informing them of the incident. Using the existing multi-threading functionality of the eMail2 system, private messages may be sent to various concerned parties. For example, the information received by the manager, compliance department and human resources management may differ in amount and depth. On the delivery slip for each message, recipients can view the completed incident report, filed by the sender. If private sub-messaging occurs, it is possible that only certain pieces of information are visible to certain recipients. Following this, the recipients can take the proper action for whatever the incident might have been.

At the same time, the organization's incident management database (external database 134) interfaces with the metadata extension module application 132, using an eMail2 API 133. The pertinent metadata is exported from the metadata extension module application 132 and integrated into the existing organization incident database 134.

This system could alternatively be implemented so that the metadata extension module application communicates through the eMail2 service 110 and not independently of it.

Metadata Export

In embodiments that allow metadata export, data is preferably transferred securely between an external database 134 and the eMail2 service 110/metadata extension module application 132. These transfers preferably occur over an SSL connection, but may make use of any channel-securing technology available.

The eMail2 Application Programming Interface (API) 133 allows the two storage objects to interface with each other. The external database 134 gives the API 133 instructions requesting the information from certain fields, in a certain format. The eMail2 service 110/metadata extension module application 132 receive these requests and send the specified data, formatted correctly, to the external database 134.

In other words, the eMail2 API 133 acts as a translator or mediator, allowing the two otherwise incompatible storage objects to exchange data.

Displaying External Data with the eMail2 API

The eMail2 API 133 can also be used to display data stored in an external database 134 as a module 131 on the eMail2 delivery slip (FIG. 30, 806). In this case, typically the process follows a similar workflow to the one above, but in reverse: (1) The metadata extension module application (FIG. 32, 132) sends a request to the external database 134 (through the eMail2 API 133), asking for the data from specific fields in a specific format. (2) The external database 134 receives the request and sends the data securely to the metadata extension module application 132. (3) The metadata extension module application 132 displays the data as a module 131 on the eMail2 delivery slip (FIG. 30, 806).

In this case, the eMail2 API (FIG. 32, 133) is still acting like a translator or mediator, allowing the two otherwise incompatible storage objects to exchange data.

eMail2 Metadata, XML and the eMail2 API

Metadata extension modules 131 are typically displayed to the user through the web based delivery slip (FIG. 30, 806), which is part of the eMail2 web client interface (FIG. 1, 127). The delivery slip preferably formats and defines metadata using XML, a standard extensible markup language. XML code is raw text, and interpreted by the web browser 130 to display the metadata in the desired manner on the delivery slip (FIG. 30, 806).

Interfacing between different external database systems (FIG. 32, 134) and the delivery slip XML is performed by the eMail2 API 133.

Other Uses

The extensible model for metadata extension modules 131 allows for the collection, integration and display of nearly any type of data. Metadata extension modules 131 could be developed for the following areas:

Customer Service—Collecting client information and displaying it to the appropriate customer service representative.

Technical Support—Collecting system and problem information and displaying it to the appropriate support worker.

Contract Management—Collecting and displaying information regarding projects, deadlines and agreements.

Medical Companies—Collecting patient information and displaying it to doctors and nurses.

Retail Industry-Displaying popular items and purchasing trends.

Any area that deals with (or could be benefited by) records keeping and/or database management.

E-mail Management

Because of the extractable metadata stored with every eMail2 message, precise and intelligent routing of eMail2 messages is possible. For example, for a large technical support firm, metadata regarding the type of problem clients have may be collected. The eMail2 system can extract this information and route the eMail2 message to the appropriate support department.

eMail2 relies on unique Message IDs as well as service definable and customizable metadata fields, which ensures that the messages are routed correctly, regardless of the subject line.

19. Event and Transaction-Based Tracking (Workflow Enablement)

The client (eMail2 client plug-in (FIG. 1, 108)) and server (eMail2 service 110) components of the eMail2 system work in tandem to track various attributes of an eMail2 message throughout its lifecycle and propagate that data to interested parties (such as the sender and recipients). This feature is termed "workflow enablement."

The eMail2 system can track both event-based and transaction-based data. For example, event-based data includes virus scanning results and user ratings. Transaction-based data includes the time a message was sent, and the number of recipients that have retrieved it.

The eMail2 service 110 records, on a per message basis, all communications and transactions with eMail2 client plug-ins 108. In addition, the eMail2 client plug-in 108 actively monitors the e-mail client 101 for any "trackable" client-side actions and automatically relays that information to the eMail2 service 110 for storage.

From the user's perspective, this feature may be manifested through a workflow toolbar (FIGS. 27A, 27B and 27C) that appears in the e-mail client. Alternatively, these options may be directly integrated into the menu structure of an e-mail client 101.

As shown in FIGS. 27A, 27B and 27C, the workflow toolbar may allow the user to retrieve a message, view various attributes such as message ratings, and update those attributes with the latest values from the eMail2 service (FIG. 1, 110). The types of metadata that are tracked and displayed to the user may differ from one eMail2 service 110 to another. eMail2 services 110 are able to implement metadata extensions, offering display of new types of metadata to users. Metadata extensions may be developed by a third party, or may be enabled by new versions of the eMail2 software.

The section below discusses some of the actions and data that may be available to a user through the workflow enablement feature. However, note that the eMail2 architecture can track and display any type of message metadata.

Synchronize Drafts Between Clients and the Web Client Interface

In some embodiments of the invention, there may be an option to save drafts to the service 110: a user begins composing an eMail2 message in one e-mail client 101, saves it as an eMail2 draft, which in turn saves it to the eMail2 service 110. The drafts that are stored server-side may be accessed from another e-mail client 101 at a later time. Essentially, this process synchronizes saved drafts across multiple e-mail clients 101 and platforms.

This feature enables productivity gains: by synchronizing eMail2 drafts across e-mail clients 101 and platforms, users are able to begin composing an eMail2 message in one e-mail client 101, e.g. Microsoft Outlook at work, and seamlessly finish composing it in another client 101, e.g. Mozilla Thunderbird at home, at a later time. Preferably, the user is able to interact with the saved draft, e.g. finish it, send it, delete it, from the web client interface 127 as well. This feature would be useful, for example, at internet cafes or on shared computers.

Saving an eMail2 draft to the service 110 is preferably accomplished by an optional command on the editing toolbar (FIG. 27C).

Synchronizing drafts from a service (FIG. 1, 110) to a client 101 is preferably done automatically by the eMail2 client plug-in 108 in the following manner: When the client plug-in 108 initializes on start-up, it checks all services 110 that the user is activated/registered with to see if there are any eMail2 drafts on the service 110 that are not present at the client side. If there is a discrepancy, the two sides are synchronized. Additionally, in some embodiments, there could be a button on the main toolbar (FIG. 27A) to force performance of the check. Additionally, eMail2 client plug-ins (FIG. 1, 108) could check services 110 at staggered, pre-defined time intervals.

Multimedia Messaging

The eMail2 system allows for secure video and voice messaging, preferably with multimedia files created and encoded "on-the-fly" and then stored securely on an eMail2 service 110. In some embodiments, when creating an eMail2 message, a user can add a video or voice message by recording one through the web client interface 127.

In some embodiments, accessing the "Voice/Video Messaging" portion of the pre-send delivery slip (FIG. 30, 806), preferably through the eMail2 toolbar button or directly from the web client interface (FIG. 1, 127) itself, allows the user to create a voice or video message that is associated with the eMail2 message that he or she is composing.

When a recipient receives a message with an associated voice or video message, he or she is preferably notified of its receipt, preferably by an icon displayed on the reading toolbar (FIG. 27B). Utilizing the "Voice/Video Messaging" button or icon takes the user to the portion of the web client interface (FIG. 1, 127) where he or she can view video messages or listen to voice messages.

Figure 34:
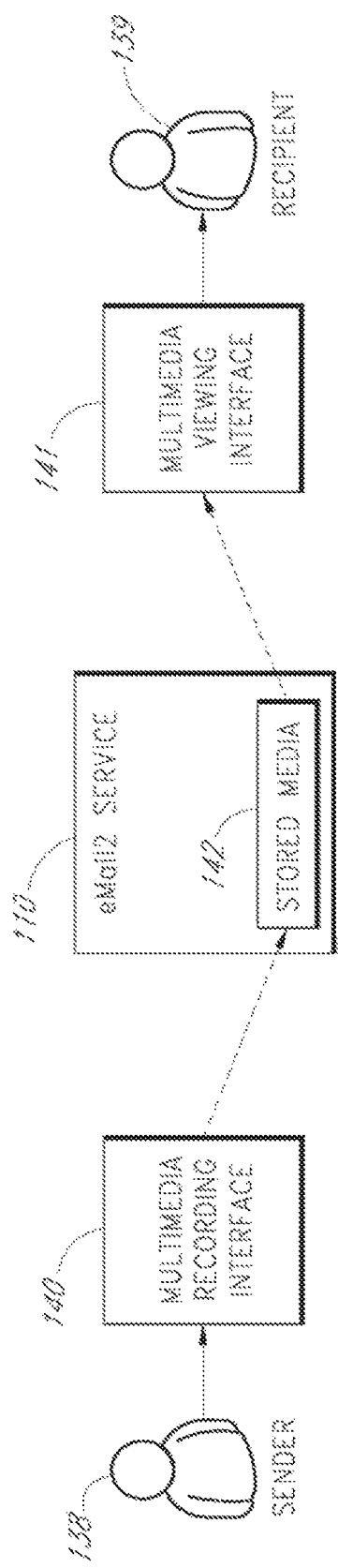
FIG. 34 describes the process for securely streaming and securely storing multimedia messages.

Media Recording and Service Side Storage (FIG. 34)

In embodiments that include multimedia messaging support, media may be captured on-the-fly by an embedded web component (the multimedia recording interface 140) in the delivery slip. In the preferred embodiment, the multimedia recording interface 140 is a flash component, or, more generally, any type of web component.

Recorded media is preferably captured as a stream by the multimedia recording interface 140 and stored directly on a server controlled by the eMail2 service 110. This multimedia data can optionally be encrypted by the eMail2 ICE (FIG. 26, 123), or another form of multimedia encryption. Stored media 142 is preferably associated with a specific message ID.

Sample Workflow for a Preferred Embodiment (FIG. 34)

1. A user 138 creates a new eMail2 message and types whatever message he or she would like to send in a normal e-mail.

2. Before sending the message, the user presses the "Voice/Video Messaging" button and is taken to the multimedia recording interface 140, an interface for recording video and voice messages. The multimedia recording interface 140 is a part of the web client interface 127. He or she is able to record a video or voice message (depending on preferences and available hardware).

3. The recorded data is streamed directly to the eMail2 service 110 and stored as stored media 142. Stored media 142 may be encrypted during storage.

Upon sending the eMail2 message, the video or voice message is associated with the eMail2 message and is available for viewing or listening by the intended recipients of the eMail2 message.

Multimedia Retrieval

In some embodiments, multimedia data that is intended for a recipient may be retrieved through the multimedia viewing interface 141, a part of the web client interface (FIG. 1, 127). The recipient may access this section of the web client interface 127 by pressing a "Voice/Video Message" button or icon on the reading toolbar (FIG. 27B) or directly from the web client interface (FIG. 1, 127), or any other suitable means.

The multimedia player is embedded into a section of the delivery slip (the multimedia viewing interface 141), and once the user has legitimately accessed the delivery slip (FIG. 30, 806), he or she is able to play the media file using the controls on the multimedia viewing interface (FIG. 34, 141).

Viewing/Listening Workflow (FIG. 34)

1. A user 139 receives a new eMail2 message and is informed that it contains an associated voice or video message.

2. After reading the normal message content, the user presses the "Voice/Video Messaging" button and is taken to the delivery slip containing an embedded multimedia player (multimedia viewing interface 141).

The user is able to watch or listen to the media file directly from the delivery slip. Stored media 142 is streamed from service 110 to the multimedia viewing interface 141. Recipient 139 can view this media using the embedded multimedia player, the multimedia viewing interface (FIG. 34, 141).

Multimedia Security

Multimedia data may be stored encrypted on the eMail2 service (FIG. 1, 110) that it is hosted on. This encryption can be performed via the ICE (FIG. 26, 123), or with any other available encryption system. Media can be protected during transit by streaming it across an SSL connection (such as HTTPS).

As an added measure of security, senders may encrypt multimedia messages using a specific password that is independent of the eMail2 system. The sender may then use an alternative method of communication, such telephone, face-to-face, etc., to deliver the password to the recipient before the recipient may access the protected video message.

Attachment vs. Association

In preferred embodiments, the media file is associated but not attached to the eMail2 message. Attachment refers to the process of attaching a separate file to an e-mail1 or eMail2 message and sending it to a recipient along with the message (or allowing the recipient to retrieve it along with the message, in the case of eMail2). In some implementations, media files are associated with eMail2 messages. Association refers to the process of storing the file on the eMail2 service (FIG. 1, 110) and linking the file to the eMail2 messages using the eMail2 message ID.

Benefits of Streaming Media

In preferred embodiments, media is not retrieved to a user's local environment. Rather, media is provided to the recipient by means of a streaming media player (multimedia viewing interface 141). Because of this, users do not need to concern themselves with downloading the proper player software, securely storing multimedia files or decoding special formats. There is one format and one player, both defined by the eMail2 service (FIG. 1, 110), and both seamlessly integrated into the web client interface 127. The processes of encoding, decoding, formatting, etc., are completely transparent to the user.

Retrieve, Reject, Ignore, Block

The "Retrieve," 'Reject," "Ignore" and "Block" options are available to the user in the context of an access message. On "Retrieve", the eMail2 client plug-in (FIG. 1, 108) preferably first triggers an "Update" to ensure that the latest version of the access message is displayed to the user. If the updated access message contains critical information that the recipient should be made aware of, a warning message preferably is displayed. If the updated access message contains no critical information, the eMail2 plug-in 108 then proceeds to retrieve the message(s).

Recipients may choose to retrieve, reject, or ignore parts of an eMail2 message including, but not limited to, the following:

1. The entire eMail2 message
2. Only the public message
3. Only the private messages
4. All of the attachments
5. Only the public attachments
6. Only the private attachments For example, upon reviewing an access message, a recipient may choose to initially retrieve the public and any private messages, but not the attachments. After reviewing the message content, the recipient may then choose to retrieve the attachments, or may close or delete the e-mail without ever retrieving the attachments.

Recipients may choose to block components of the eMail2 system including, but not limited to, the following:

1. The sender of the message
2. The e-mail2 service 110
3. The conversation

Each of the above actions is tracked and recorded by the eMail2 service 110.

Blocking the sender and service 110 are both self explanatory, but blocking the conversation is more complex of an action.

Blocking conversations is preferably performed by recording the originating message ID, and traversing down the tree of message IDs and parent message IDs, determining all related messages and blocking each of them. From the perspective of the eMail2 system, this process essentially blocks all new messages depending on their relationship to an undesired thread. From a user perspective, this process is transparent and blocking a conversation is a single logical action. Traversal for blocking purposes may be accomplished by the email2 client plug-in 108 or the email2 service 110.

If a message is sent as HTML and the recipient is unsure about its content, eMail2's optional "Retrieve text scan only" can automatically scan the HTML body of the message and retrieve only the text portions (ignoring images, code, etc.). Generally, if the message is sent in any non-plaintext form, the eMail2 system allows for retrieval of either a text-only version or an image-format representation.

Update

In some embodiments, the "Update" option is available to a user in the context of an access message or a sent/retrieved eMail2 message. It updates on the client-side all of the message metadata tracked by the eMail2 service 110. The command can also be used to retrieve replies and comments to the eMail2 message. Preferably, "Update" is automatically called by the eMail2 plug-in 108 whenever an eMail2 message window is opened by the user or before any Retrieve/Reject command is performed.

As an example, a user may use the "Update" option to refresh, over a period of time, the virus scan results displayed in a particular access message. If the results indicate that a number of other recipients' computing devices have scanned the e-mail message associated with the access message and found no virus, the user may then decide to retrieve the e-mail message.

Tracking

Figure 23:
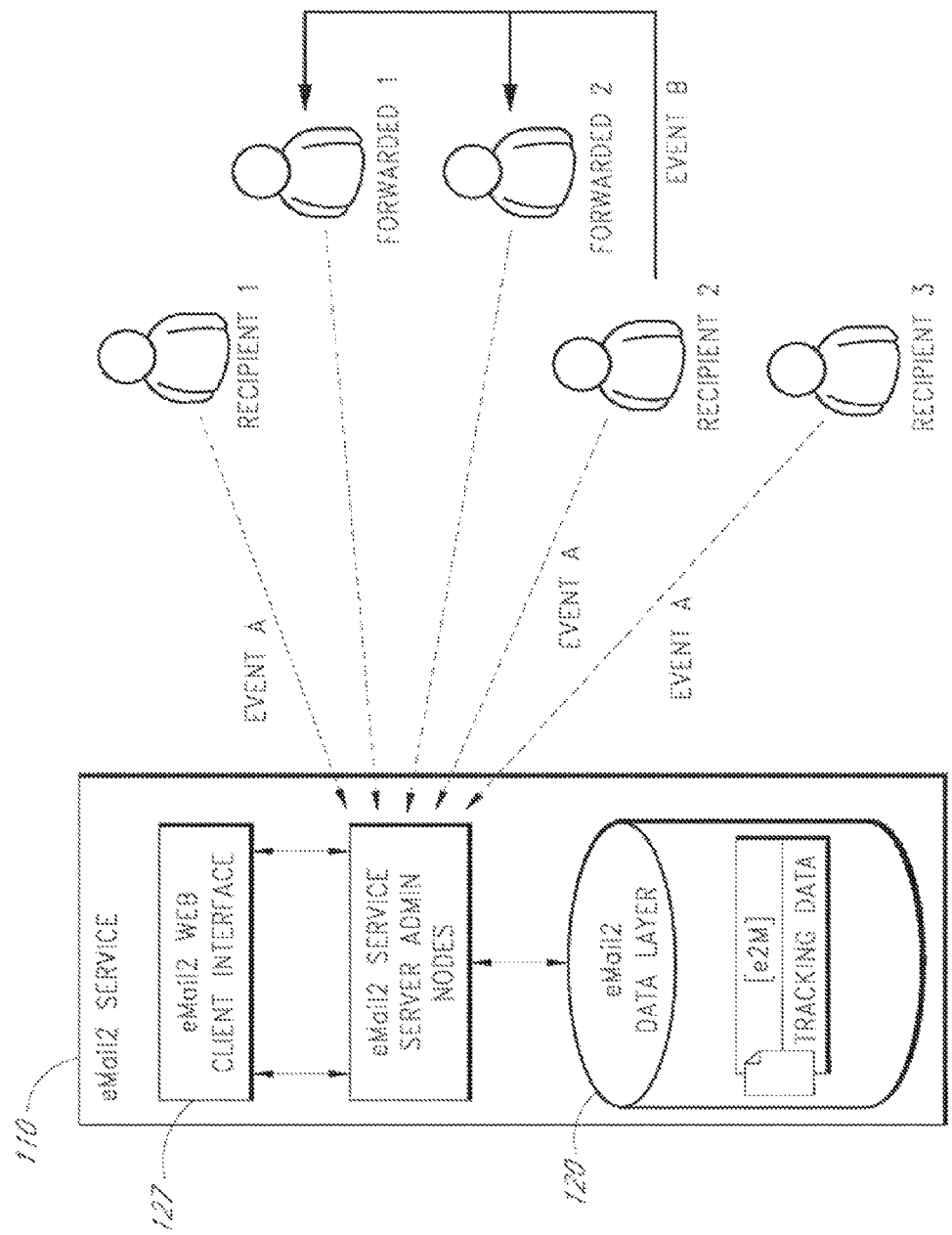
FIG. 23 is a workflow describing how message tracking data is collected.

In some embodiments, the "Tracking" option is available to a user in the context of an access message or a sent/retrieved eMail2 message. It displays message transaction data that is collected by the eMail2 service (FIG. 23, 110) and stored in the data layer 120 (see FIG. 23). Events A and B refer to the same named events in FIG. 23.

Event A: All the activity related to either an access message or an eMail2 message is tracked in real time by the eMail2 service 110 and the results are stored in the data layer 120. They are available to both the sender and the recipient(s), depending on the outgoing options set by the sender. Such tracked activity includes the 'Retrieve', 'Reject', 'Forward' commands, etc.

Event B: The original message can be forwarded by any recipient to any other recipients (depending on the outgoing options set by the original sender) and all their activity is also tracked by the service 110.

Tracking information is preferably displayed to the user through web services, as a web based delivery slip (FIG. 30, 806) in the web client interface (FIG. 1, 127) that is customizable in appearance. See FIG. 28 for a visual representation of the delivery slip.

In one embodiment, "tracking" may be disabled for a specific eMail2 message. In this case, the eMail2 service 110 preferably still logs all transaction activity but the results are not available for display to the users.

The transaction data can include, but is not limited to, the following:

1. When the eMail2 message was created/sent/received by the eMail2 service.
2. To whom the eMail2 message was sent.
3. When the eMail2 message was retrieved/rejected/deleted/ignored by each recipient, and what parts of the message were retrieved (public, private, attachments, etc.).
4. When the different recipients replied to the eMail2 message and to whom they replied.
5. When the different recipients forwarded the eMail2 message and to whom they forwarded, as well as all tracking activity for the forwarded messages.
6. Recipients' IP addresses and other network information.
7. Digital signatures for each user (if used).

For threaded messages, transaction data may be displayed on a per-item basis, or different levels of summaries may be provided (e.g., a summary for an entire conversation, a summary for different combinations of messages, a summary beginning and ending at specific dates, etc).

Authenticated external applications can use eMail2's XML web services to perform the same tracking tasks via an API that may include (but is not limited to) the following calls:

1. GetTrackingInformationForE2M (Parameters: E2K, E2S);
2. GetTrackingInformationForE2U (Parameters: E1A, E1S, E2S)

P2P Event-Based and Transactional Data: Ratings and Surveys

In some embodiments, eMail2 provides P2P (peer-to-peer) event-based and transactional functions that link the users with a unique message ID and a series of 'user to action' based functions. These event-based functions are preferably available to a user in the context of an access message or a sent/retrieved eMail2 message. Such functions include rating and survey systems for e-mails where recipients can, prior to retrieving a given message, see if other recipients found the message valuable. Preferably, every operation of these features and information summaries sends a request to the eMail2 service and opens either within the eMail2 client plug-in (FIG. 1, 108) or in a new browser window through a specific, hidden URL call (secure web site hosted by the eMail2 service provider), unique to the current eMail2 user to view the results.

As an example, the ratings feature allows message recipients to rate an eMail2 message based on any desired criteria, and view the ratings assigned to the message by other recipients. In the preferred embodiment, a recipient may view the aggregated rating for an eMail2 message within the context of a access message, but may not enter a rating if he or she has not yet retrieved the message. A recipient may both view the aggregated rating and enter a rating for a retrieved message. A sender may view the aggregated rating for a sent message, but may not enter a rating. In some embodiments and scenarios, a sender or recipient may be blocked from viewing all rating information for an access message or message.

The eMail2 system may track any type of data as a "rating." In one embodiment, the rating may be a numerical value. In another embodiment, the rating may be a value from a predefined list of values (e.g. "highly useful," "useful," "not useful"). These predefined values may be presented as a set of buttons, icons, or other user interface elements for purposes of allowing recipients to rate the emails they retrieve. In yet another embodiment, the rating may include free-form text comments entered by a user. When a recipient rates an e-mail message, the eMail2 client plug-in 108 of the recipient transmits the rating to the eMail2 service 110 on which the e-mail message is stored together with message ID of the e-mail message, allowing the eMail2 service 110 to store the rating data in association with the e-mail message.

In the preferred embodiment, the eMail2 system allows users to view ratings within the context of a single message (e.g. the e-mail message window) and multiple messages (e.g. the "inbox" view of an e-mail client 101). In the case of displaying ratings of multiple messages, the rating may appear next to or as part of the subject line so that users need not open each message/access message to get this information. The eMail2 system may also allow users to view the number of recipients that have rated the message (e.g. "3 out of 4 recipients rated this message as useful," or "average rating=3.5 on a scale of 1 to 5 (rated by 6 people)"), and/or separately view the rating given by each individual recipient.

In addition to assisting users in avoiding having to read e-mail messages of little value, the ratings feature enhances the security of the eMail2 system by providing users with additional information about whether a message should be retrieved. For example, if a recipient discovers that the message contains a newly discovered virus, he or she can rate the message accordingly to alert recipients even before anti-virus clients are updated to identify the virus. A "do not open" or "virus detected" rating button may be provided in the e-mail viewing window for this purpose.

The rating feature may be provided by the eMail2 service provider through the use of third party applications (FIG. 30, 129). Alternatively, it may be implemented directly within the eMail2 system.

Implementation of third party applications can be done securely via eMail2 web services, using a web API. The following workflow corresponds with FIG. 30 and illustrates a typical secure communication with a third-party application 129:

Event A: The eMail2 client plug-in 108 contacts the eMail2 service 110 with a request for a security token (T.sub.K).

Event B: The eMail2 service 110 receives the request, and because there is a third party application 129 associated with the service 110, the third party application 129 sends a separate security token (T.sub.K2) to the eMail2 service 110.

Event C: The eMail2 service 110 sends both the security token (T.sub.K) and the security token (T.sub.K2) to the client plug-in 108.

Event D: The eMail2 client plug-in 108 sends both the security token (T.sub.K) and the security token (T.sub.K2) to a web browser 130.

Event E: The web browser 130 consumes the security token (T.sub.K) and opens a secure connection between the browser 130 and the eMail2 service 110, displaying metadata in the delivery slip 806. The web browser 130 consumes the security token (T.sub.K2) and opens a secure connections between the browser 130 and the third party application 129, displaying the custom information in the third party extension 807, in the delivery slip 806.

The system may also be implemented in such a way that the third party application 129 communicates directly with the service 110 so that during Event E, there is only one secure communication channel necessary (between the browser 130 and the service 110.

Web services may also be implemented so that an eMail2 service 110 can also link different third party applications 129 with the unique eMail2 message IDs and the e-mail addresses of the sender and recipients involved. In this way, rating and survey engines can be configured through the eMail2 service 110 and eMail2 plug-in 108 and return summary or detailed information about each user's input on a specific eMail2 message. This feature of eMail2 can also be described as a "link user to action" process where third party applications 129 can send requests via eMail2 methods and thus track the activity of each user. This feature of eMail2 can also be responsible for linking into Social Networking applications whereby eMail2 messages considered of value can be forwarded to a user's trusted recipient list. Data export may be performed by means of an XML feed over a secure connection, or any other standard method of data streaming over a secure connection.

Security between third party applications 129 and an eMail2 service 110 may be guaranteed by way of a certificate system implemented by the eMail2 service 110. However, the eMail2 system preferably does not inherently implement certificate systems between services 110 and third party applications 129. Ensuring that the third party applications 129 themselves are secure is also a responsibility of the service 110 employing them.

Status & Virus

In some embodiments, the "Status" and "Virus" actions are available to a user in the context of an access message or a sent/retrieved eMail2 message. They display the aggregated results of anti-spam and anti-virus scanning that is performed on an eMail2 message.

For example, such scanning may occur on the sender's computer (FIG. 1, 100) before the message is sent, on the eMail2 service 110, and on recipients' computer 100. The results of all of these scans are tracked by the eMail2 service 110 and displayed through these attributes. With this data, recipients can hold on to an access message and monitor the scanning status of the message using the "Update" command before retrieving the actual message content or attachments.

Like the ratings attribute, the "status" and "virus" attributes may be displayed within the context of a single message (e.g. the e-mail message window) and multiple messages (e.g. the "inbox" view of an e-mail client)

The "Virus" and "Status" values may be calculated differently by each eMail2 service 110 depending on the programs used to perform the scanning. For example, the following results can be displayed:

1. If the value of "Virus" sent by the eMail2 service is "true", then the title for the "Virus" tab is shown with a warning message.
2. If the value of "Status" sent by the eMail2 service is "SpamTrue", the title for the "Status" tab is shown as "Status: Spam" with a warning message.

The Status command can calculate an average by combining a number of factors, such as the number of people that retrieved the message, rating results, and virus probability. The virus probability may be weighted according to the results of anti-virus programs that offer virus probability functions.

The eMail2 system may also include a virus scanning method that uses APIs from large virus scanning companies. The implementation of this API system would allow programs (such as the eMail2 client plug-in 108 or the eMail2 service 110 software) to send files for virus scans at external virus scan websites. After the files are verified as "clean," a certificate is returned to the eMail2 application. eMail2 is able to take advantage of this and use the infrastructure of external sites (i.e. virus scanning sites) to verify the integrity of messages and attachments.

Metadata Export

In some embodiments, through the use of a web services API, the eMail2 system can export all forms of eMail2 metadata to third party programs 129. This is commonly done in the form of an XML feed, but other processes for achieving the same result are possible.

As an example, an advertising company may wish to export large amounts of message retrieval metadata and aggregate it so that they can see the number or percentage of e-mail messages that have been retrieved over the entire course of an e-mail campaign.

Metadata Export Workflow

In preferred embodiments, data is generally transferred between the eMail2 service and the user via XML feeds over secure network connections. Therefore, the workflows for all metadata extensions should be very similar. A possible workflow for a survey engine developed by a third party is provided as an example:

1. A user receives an eMail2 message containing a survey.
2. Accessing the survey via a custom "Survey" button on the eMail2 reading toolbar (FIG. 27B) directs the user to the delivery slip, specifically pointed at the survey section.
3. A series of questions or items are provided within the context of the delivery slip. The user answers the questions and submits them using a submission button the delivery slip.
4. The data is sent to the third party survey application (an example of FIG. 30, 129) as an XML feed where it is integrated into an existing database.
5. If the survey is private, the survey section of the delivery slip is replaced by a message thanking the user for his or her participation, as well as anything else the survey company wishes to display (a link to their website, for example).
6. If the survey is public, the third party survey application 129 could send back averages/popular responses/statistics and display them in the survey pane of the delivery slip.

20. Client Side eMail2 Configuration Options

The configurable options for the client side of the eMail2 system can be divided into at least two logical sections: Incoming Message Options and Outgoing Message Options. Additional sections, such as signature preferences, are contemplated herein.

Incoming Message Options

The "Incoming Message Options" deal with all aspects of incoming messaging. They are defined by the user from the eMail2 client plug-in Options or Preferences menu, and affect the local security and preferences for a single installation of the eMail2 client plug-in (FIG. 1, 108). Options may include but are not limited to the following (FIG. 24):

1. Auto retrieve e2AMs [checkbox]
2. Auto retrieve e2Ms according to the following filters: [checkbox]
   a. Services
      i. All services [radio button]
      ii. Trusted services [radio button]
   b. Members
      i. All members [radio button]
      ii. Trusted members [radio button]
   c. Message Format
      i. All messages [radio button]
      ii. Text only messages [radio button]
   d. Attachments
      i. All messages [radio button]
      ii. Messages with no attachments [radio button]
3. Auto activate with:
   a. All services [radio button]
   b. Certified services [radio button]
   c. No services [radio button]
   d. Auto-trust services I activate with [checkbox]

The above set of options is represented in a visual form by FIG. 24.

Outgoing Message Options

The "Outgoing Message Options" deal with the user's preferences for outbound messaging. They are typically set in the pre-send state of the delivery slip (FIG. 30, 806) through the web client interface (FIG. 1, 127), and are preferably not stored locally on a client 101 or client plug-in 108. Accessing the pre-send delivery slip requires a user to initialize a message (open a composition interface for a new eMail2 message) and then select either "tracking" or "message options." This opens a secure browser connection for a delivery slip (FIG. 30, 806) that is specific to the message that the user is creating. The user may then change options pertaining to the message. The message options may include but are not limited to the following:

1. Access Message
   a. Disclose Recipients [checkbox]
   b. Include Subject line [checkbox]
   c. Include message summary [checkbox]
   d. Include virus scan results [checkbox]
   e. Include number of characters [checkbox]
   f. Include status [checkbox]
2. Tracking
   a. Allow tracking [checkbox]

3. Expiry Times
   a. set expiry date and time for message [checkbox] [textbox]
   b. set expiry date and time for attachments [checkbox] [textbox]
4. Force Format on Retrieval
   a. Only allow recipients to retrieve text only versions [radio button]
   b. Only allow recipients to retrieve messages in the format that I send them in [radio button]
   c. Allow recipients to choose message format [radio button]
5. Ratings & Surveys
   a. Enable Ratings [checkbox]

Signature Preferences eMail2 supports existing signature systems. The eMail2 signature preferences contain at least (but not limited to) the following options:
1. Signature
   a. Include VCard with each message [checkbox]
   b. Text/HTML Signature [checkbox]
   c. URL [checkbox]

In the preferred embodiment, although the signature preferences are embedded within the e-mail client (FIG. 1, 101), the sender's signature does not need to be included within the body of each message. Rather, the signature may be uploaded to the eMail2 service 110 and available for download by a recipient at any time. In some embodiments, the "Text/HTML Signature" is a function offered by the eMail2 service 110 whereby a networked storage location is available to create different signature types using various third party programs (FIG. 30, 129). Finally, in some embodiments, the "URL" signature option points recipients to a web address where they may access the profile for the sender.

21. eMail2 Administration and Service Configuration Options eMail2 Administration Service configuration options are set by administrators. In the eMail2 system, there are two types of administrators: Super administrators and service administrators (FIG. 25, 128). There is a hierarchical relationship between super administrators, service administrators and users (with super administrators occupying the highest level of the hierarchy).

Service administrators control a specific eMail2 service (FIG. 1, 110). Service administrators have administrative privileges for all configuration options that fall under the realm of a service 110.

Super administrators control service providers, hosting companies that may or may not be corporately affiliated with the services 110 that they are hosting. Super administrators hold full administrative privileges for all the configuration options of all of the services 110 hosted on a service provider.

The eMail2 service configuration options are set by an eMail2 service administrator through a secure service administration web interface. An example of the service administration web interface can be seen in FIG. 29.

Preferably, the administration web interface is viewed as two sets of tabs (157 and 158) and one dropdown menu 159. Super administrators have access to all levels of the tabs. Service administrators have access to all of the second level tabs under "services," for their specific service 158. If a single individual is a service administrator for two or more services that are hosted on one service provider, he or she preferably will have access to all of the second level tabs under "services" for each service that he or she administrates.

The top level tabs 157 include: Home, Services, Users, Skins and Settings. The second level tabs are different depending on the top level tab selected. The dropdown menu 159 is different depending on the second level tab selected. A more complete architecture for the service administration web interface is described at the end of this section.

eMail2 Service Configuration Options

Possible configuration settings for specific services (FIG. 1, 110) include but are not limited to, the following:

1. The default text to be included with each introductory message. This is configured by means of an "IM Template" in the service admin options. The IM template is a text entry that provides the default introductory message format. Placeholders are used for variables, such as names, dates, message IDs, summaries, etc. For example, if an admin wanted to set the introductory message to display the Message ID, he or she might include the text "-ID:%int-msgid%" in the TM template. All of the metadata that can be displayed within an eMail2 introductory message has a placeholder associated with it. For certain services 110, individual users may be able to override the default TM template.
2. The default text to be included with each access message. This is configured by means of an "TM Template" in the service admin options. The AM template is a text entry that provides the default access message format. Placeholders are used for variables, such as names, dates, message IDs, summaries, etc. For example, if an admin wanted to set the access message to display the number of characters in a message, he or she might include the text "-Number of characters: %int-bodycount%" in the IM template. All of the metadata that can be displayed within an eMail2 access message has a placeholder associated with it. For certain services 110, individual users may be able to override the default AM template.
3. The default message options (e.g. Allow Tracking, Allow Forwarding, Allow Replying). These message options can, if the service 110 allows it, be modified by users on a per-message basis. An example of the interface for determining service options, default values and over ride rights is visually represented in FIG. 40.
4. The length of time eMail2 messages are stored on the eMail2 service 110, (this can be overridden for specific users or groups of users).
5. The DNS string or IP address to be included with each message (so eMail2 client plug-ins 108 can determine which service to use). There are preferably two DNS strings or IP addresses: one for the Service URL and one for the dynamic web-based Delivery Slip URL.
6. Whether to allow users to use the eMail2 service's 110 SMTP server to send outgoing introductory messages, as well as whether this option is enabled by default. Additionally, administrators are able to set the address of the SMTP server that the eMail2 service 110 uses for e-mail1 communications.
7. Whether recipients of an eMail2 message are required to register with the service 110 before they can retrieve/reply/forward using it. An example of an interface for determining such security settings is visually represented in the security matrix of FIG. 39.
8. Whether certain domains are blocked from registering with the service 110. Alternatively, whether ONLY certain domains may register with the service 110.

9. The ability to define new administrator accounts.
10. Skin Captions. Customized graphical and textual elements for companies that are displaying web-pages integral to the eMail2 system. Service administrators are able to customize the appearance of all web interfaces pertaining to a specific service 110 by using the skin captions.
11. In the case of registered e-mail, service administrators may optionally be able to retrieve archived messages from the eMail2 service 110, for use in disputes. In the preferred embodiment, this action alerts users that their e-mail conversation has been audited, and that it has been retrieved by service administrators.
12. The encryption system for the service 110 (possibly configured through use of the ICE (FIG. 26. 123)).

If two companies exchange eMail2 messages and each runs its own eMail2 service (FIG. 1, 110), they can link their services using the eMail2 web services API. This would allow the services to share the tracking information stored on each service 110.

These options above, as well as the architecture below, are meant to be illustrative and not definitive. It should be recognized that options and interface architecture may be added at a later date without going beyond the scope of the invention.

eMail2 Service Administration Web Interface Architecture

Figure 29:
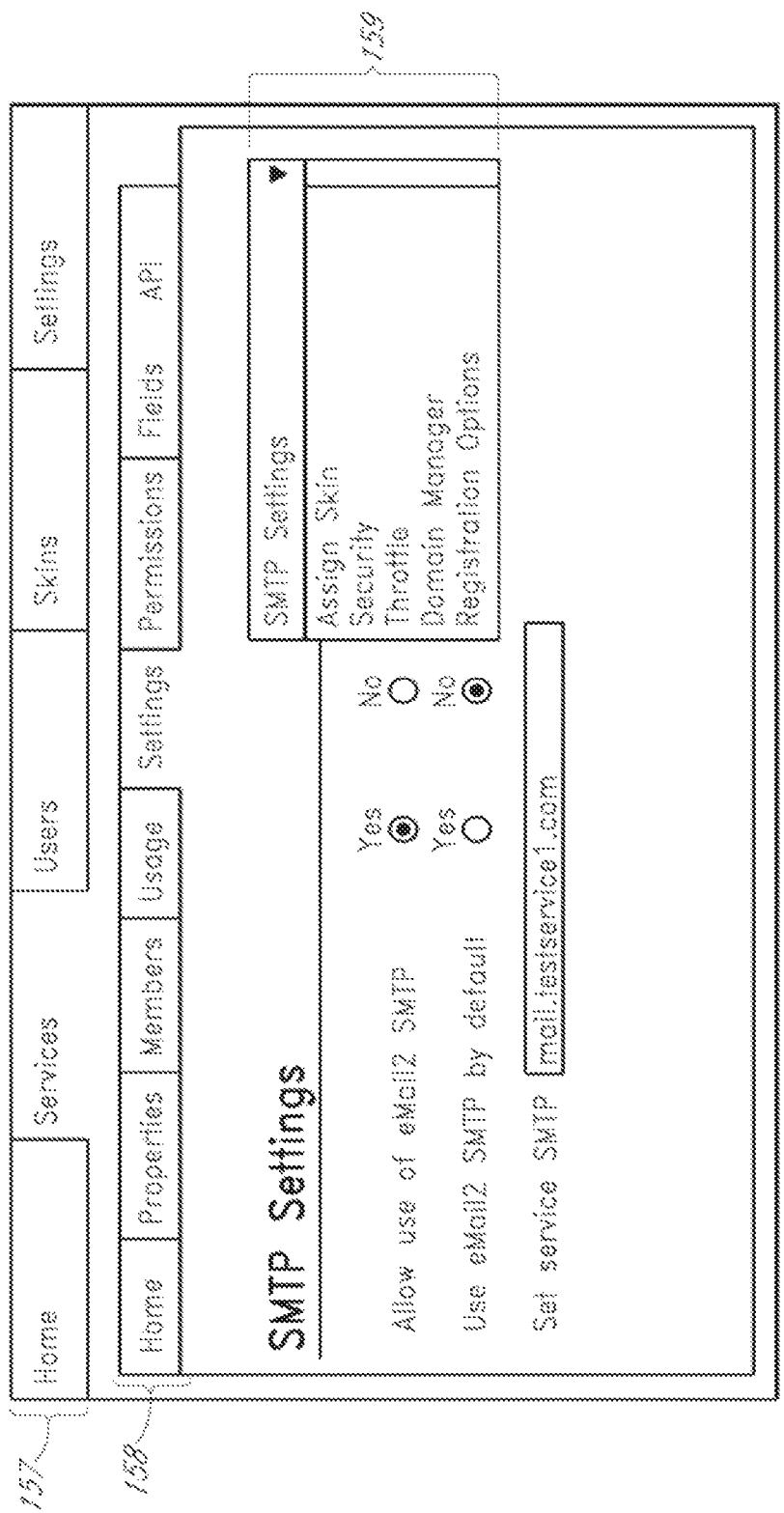
FIG. 29 is an example of a service administration web interface, where service administrators can configure various options and exercise a degree of control over the service (described in FIG. 1 and FIG. 2).

The following is one possible menu system for the interface described in FIG. 29.
 1. Home
  1.1. Dashboard
  1.2. Search
  1.3. Advanced Search
  1.4. Usage Statistics
 2. Services
  2.1. Services Directory
   2.1.1. Home
   2.1.2. Properties
   2.1.3. Members
   2.1.4. Usage Statistics
   2.1.5. Settings
    2.1.5.1. Assign Skin
    2.1.5.2. Security
    2.1.5.3. Throttle
    2.1.5.4. Domain Manager
    2.1.5.5. Registration Options
    2.1.5.6. SMTP
   2.1.6. Permissions
   2.1.7. Fields
   2.1.8. API
    2.1.8.1. Data Export
    2.1.8.2. Crypto
    2.1.8.3. LDAP
 3. User
  3.1. Properties
  3.2. Permissions
 4. Skins
  4.1. Skin Directory
   4.1.1. Properties
   4.1.2. Permissions
  4.2. Caption Sets Directory
   4.2.1. Edit
   4.2.2. Permissions
  4.3. Image Sets Directory
   4.3.1. Edit
   4.3.2. Properties
 5. Settings
  5.1. Hardware Configuration
  5.2. User Settings
  5.3. Update Manager
  5.4. An example of a Security Matrix
22. Registered Electronic Mail The end-to-end encryption, message storage, and message tracking features of eMail2 enable "Registered Electronic Mail" for systems in which these features are embodied. Registered electronic mail is based on the same architecture and feature set as plain eMail2. The primary workflow difference is that recipients may be required to register with the eMail2 service (FIG. 25, 110) chosen by the sender before being able to retrieve their messages.

The typical process for registered electronic mail is described, with reference to FIG. 25, below:

Equipped with a unique Message Access Key, authorized parties (such as service administrator 128) can access the archived eMail2 messages stored in the service data layer 120 and preferably find them in their original state, encrypted and available for later consultation. Certified copies of messages and attachments can be made available as images, PDF or any other format over the web. Alternatively, registered electronic mail services 110 can also forward certified paper copies to solve any disputes between the parties involved.

Because the messages are encrypted and stored on the secure eMail2 service 110, the content and attachments of the messages cannot be tampered with by users for their entire lifecycle.

23. Conclusion

The various features and functions described above may be implemented in code modules that are executed by general purpose computing devices. The code modules may be stored on any appropriate type of computer storage device or memory.

As will be apparent, numerous modifications can be made to the system and methods described above without departing from the scope of the invention. The invention is defined only by the following claims.

The invention claimed is:

1. A secure email system comprising:
a server system that implements a secure e-mail service; and
a sender computing device;
wherein the secure email system is configured to:
intercept an e-mail message on the sender computing device when the e-mail message is composed and sent by a sender on the sender computing device;
send the intercepted e-mail message in unencrypted form over a secure channel to the server system;
receive the e-mail message in unencrypted form at the server system, the e-mail message being from the sender, the sender having an account with the secure e-mail service, and being addressed to a recipient that does not have an account with the secure e-mail service;
store the e-mail message in encrypted form on the server system;
generate, or cause a generation of, an introductory message after receiving of the e-mail message at the server system;
transmit, or cause a transmission of, the introductory message to the recipient in unencrypted form via an SMTP protocol, said introductory message lacking at least some message content of the e-mail message, and including a link to a web client interface that provides functionality to authenticate the recipient and to securely retrieve the e-mail message from the server system and further including a message access key including a message identifier identifying the e-mail message and a service host identifier indicating to the recipient a network accessible address of the server system at which the e-mail message is stored, wherein the message access key does not serve as an encryption or decryption key;

upon access of the introductory message by the recipient, programmatically receive recipient data including the message access key and a recipient e-mail address from the recipient;

register the recipient with the secure e-mail service by validating the message access key and the recipient e-mail address; and transmit the e-mail message in unencrypted form to the recipient via a secure communications protocol, based on the recipient data.

2. The secure email system of claim 1, wherein the link to the web client interface points to a web site that provides functionality for accessing the e-mail message via a web-based interface.

3. The secure email system of claim 1, where the receiving includes receiving the e-mail message from the sender via an e-mail client plug-in running on the sender computing device, and where the transmitting of the e-mail message in unencrypted form to the recipient occurs after the transmitting of the introductory message.

4. A secure email system comprising:
a server system which provides a secure e-mail service;
a sender computing device running an e-mail client; and
a recipient computing device associated with a recipient e-mail address of a recipient;
wherein the secure email system is configured to:
intercept an e-mail message composed and sent by a sender via the e-mail client running on the sender computing device with an e-mail client plug-in running on the sender computing device, such that an ordinary transmission of the e-mail message to the recipient e-mail address is blocked;
send the e-mail message in unencrypted form via a secure communications protocol from the sender computing device to the server system for storage thereon in encrypted form;
send an introductory message in unencrypted form via an SMTP protocol to the recipient computing device, said introductory message including a key for retrieving the e-mail message from the server system in unencrypted form via the secure communications protocol, the key including a message identifier identifying the e-mail message and a service host identifier indicating to the recipient a network accessible address of the server system at which the e-mail message is stored, wherein the key does not serve as an encryption or decryption key, the key being further usable with the recipient e-mail address to programmatically register the recipient with the secure e-mail service upon access of the introductory message by the recipient, wherein the introductory message lacks at least some message content of the e-mail message.

5. The secure email system of claim 4, further configured to communicate the e-mail message in unencrypted form from the sender computing device to the recipient via the secure e-mail service without using a store-and-forward model.

6. The secure email system of claim 4, wherein the server system implements multiple different secure e-mail services from which the sender can select, at least some of which use different e-mail encryption methods than others, and wherein the step of encrypting the e-mail message at the server system comprises using an encryption method that corresponds to a secure e-mail service selected by the sender.

7. The secure email system of claim 4, wherein the introductory message is a text-only message.

8. The secure email system of claim 4, wherein the introductory message is initially sent from the server system to the sender computing device, and then from the sender computing device to the recipient e-mail address, such that the introductory message appears to the recipient to come from the sender.

9. The secure email system of claim 4, wherein the introductory message further includes an Internet address for downloading an e-mail client plug-in that provides functionality for the recipient to retrieve the e-mail message from the server system.

10. The secure email system of claim 4, wherein the introductory message further includes a link to a web client interface that provides functionality for authenticating the recipient based on recipient data and for retrieving the e-mail message in unencrypted form via the secure communications protocol from the server system based on the authentication of the recipient.

11. The secure email system of claim 4, wherein the e-mail message is sent in unencrypted form from the sender computing device to the server system without use of an SMTP protocol.

12. The secure email system of claim 4, further configured to send, via the e-mail client plug-in, authentication information from the sender computing device to the server system to enable the server system to authenticate the sender computing device prior to receiving the e-mail message.

13. The secure email system of claim 12, wherein the authentication information is sent from the sender computing device to the server system using the secure communications protocol.

14. The secure email system of claim 13, wherein the secure communications protocol is an HTTPS protocol.

15. The secure email system of claim 4, further configured to, on the recipient computing device, use the key to retrieve additional information about the e-mail message from the server system prior to retrieving the e-mail message.

16. The secure email system of claim 15, wherein the additional information about the e-mail message includes information about how one or more recipients of the e-mail message have rated the e-mail message.

17. The secure email system of claim 15, wherein the additional information about the e-mail message includes a result of at least one virus scan of the e-mail message.

18. The secure email system of claim 4, wherein the step of sending the introductory message to the recipient computing device associated with the recipient e-mail address is performed by the sender computing system via execution of the e-mail client plug-in.

19. The secure email system of claim 4, wherein the step of sending the introductory message to the recipient computing device associated with the recipient e-mail address is performed by the server system.

20. The secure email system of claim 4, further configured to receive, at said server system, a termination request sent from the sender computing device, and in response to the termination request, block the recipient from forwarding or replying to the e-mail message, but continue to provide the recipient access to the e-mail message.

21. The secure email system of claim 4, further configured to, after the recipient has retrieved the e-mail message ("parent e-mail message") from the server system, and has forwarded the parent e-mail message to a second recipient to generate a child e-mail message: (a) receive a request from the sender to terminate an e-mail conversation associated with the parent e-mail message, (b) in response to the request, block the recipient from forwarding and replying to the parent e-mail message, and (c) block the second recipient from forwarding and replying to the child e-mail message.

\* \* \* \* \*